United States Patent
Harvey et al.

(10) Patent No.: US 10,912,321 B2
(45) Date of Patent: Feb. 9, 2021

(54) METHODS OF USING PERACETIC ACID TO TREAT POULTRY IN A CHILL TANK DURING PROCESSING

(75) Inventors: Michael S. Harvey, Modesto, CA (US); Jonathan N. Howarth, Modesto, CA (US)

(73) Assignee: Enviro Tech Chemical Services, Inc., Modesto, CA (US)

( * ) Notice: Subject to any disclaimer, the term of this patent is extended or adjusted under 35 U.S.C. 154(b) by 1074 days.

(21) Appl. No.: 13/199,029

(22) Filed: Aug. 16, 2011

(65) Prior Publication Data
US 2012/0244261 A1   Sep. 27, 2012

Related U.S. Application Data

(63) Continuation-in-part of application No. 13/065,553, filed on Mar. 24, 2011, now Pat. No. 8,546,449.

(51) Int. Cl.
A23B 4/12 (2006.01)
A23L 13/50 (2016.01)
A23B 4/20 (2006.01)
A23B 4/26 (2006.01)

(52) U.S. Cl.
CPC .............. *A23L 13/55* (2016.08); *A23B 4/12* (2013.01); *A23B 4/20* (2013.01); *A23B 4/26* (2013.01)

(58) Field of Classification Search
CPC .... A01N 37/16; A01N 59/00; A01N 2300/00; A01N 37/02; A01N 43/50; A23B 4/20; A23B 4/30; A23B 4/00; A61L 2/186; A61L 2/0082; A61L 2/0088; A61L 2/16; A23L 1/0011
USPC ............... 426/332, 335, 532, 310, 331, 321; 424/616; 452/173
See application file for complete search history.

(56) References Cited

U.S. PATENT DOCUMENTS

| | | | |
|---|---|---|---|
| 3,104,170 A | | 9/1963 | Mahon et al. |
| 3,104,978 A | | 9/1963 | Elder |
| 3,689,283 A | | 9/1972 | May et al. |
| 4,675,947 A | | 6/1987 | Clatfelter et al. |
| 5,139,788 A | * | 8/1992 | Schmidt ........... A01N 59/00 424/616 |
| 5,208,057 A | | 5/1993 | Greenley |
| 5,632,676 A | * | 5/1997 | Kurschner et al. ........ 452/173 |
| 6,455,086 B1 | * | 9/2002 | Trinh ................. C11D 3/044 426/321 |
| 6,534,075 B1 | † | 3/2003 | Hei |
| 6,605,253 B1 | | 8/2003 | Perkins |
| 6,627,657 B1 | † | 9/2003 | Hilgren |
| 8,057,812 B2 | † | 11/2011 | Man |
| 2003/0148727 A1 | † | 8/2003 | Hilgren |
| 2010/0021557 A1 | † | 1/2010 | Li |
| 2010/0227000 A1 | † | 9/2010 | Ames |
| 2011/0274766 A1 | † | 11/2011 | Allen |
| 2012/0322872 A1 | † | 12/2012 | Krauss |

FOREIGN PATENT DOCUMENTS

WO   WO 2007/092087 A2   8/2007

OTHER PUBLICATIONS

Russia Agrees to Lift Ban on U.S. Poultry Imports by Helena Bottemiller Jun. 25, 2010 https://www.foodsafetynews.com/2010/06/russia-agrees-to-lift-ban-on-us-poultry-imports/.*
Xiong; Phosphate-Mediated Water Uptake, Swelling . . . Architecture; Quality Attributes of Muscle Foods; 1999, pp. 319-334; Plenum Publishers, New York.
Young, et al.; Moisture Retention . . . Operations; 2004, pp. 119-122 Poultry Science Assocation, Inc.
Zheng, et al.; Tenderness . . . of Marinade; Journal of the Science of Food and Agriculture; 81: pp. 82-87; 2000, Society of Chemical Industry.
Hamm; Biochemistry of Meat Hydration; pp. 355-463; Institut fur Chemic and Physik . . . ; Germany.
May; Effect of Phosphate Treatment . . . Chicken; 1962, pp. 24-32; University of Georgia, and Market Quality Research Division, AMS, USDA Georgia.
Third Party Submission Under 37 CFR 1.290; Mar. 25, 2013.
Letter from D. Wallace to Audrey A. Millemann dated Apr. 18, 2017.
Letter from D. Wallace to Audrey A. Millemann dated Sep. 30, 2016.
Russell, Scott M. "Solving the Yield/Pathogen Reduction Dilemma", pp. 30-34, Oct. 2007, Watt 290 Poultry USA.†
Bauermeister et al, "Validating the Efficacy of Perceatic Acid Mixture as an Antimicrobial in Poultry Chilers," pp. 1119-1122, Feb. 3, 2008, Journal of Food Protection, vol. 7, No. 6, 2008.†
Carciofi, Bruno AM, and João Borges Laurindo. "Water uptake by poultry carcasses during cooling by water immersion." pp. 444-450, 2007, Chemical Engineering and Processing: Process Intensification 46, No. 5 (2007).†

\* cited by examiner
† cited by third party

*Primary Examiner* — Vera Stulii
(74) *Attorney, Agent, or Firm* — Audrey A. Millemann; Weintraub Tobin

(57) ABSTRACT

Methods for treating poultry during processing for increasing the weight of the poultry are disclosed. The methods may be performed in a chill tank or other reservoir and utilize either equilibrium peracetic acid or non-equilibrium peracetic acid. The non-equilibrium peracetic acid may be prepared from hydrogen peroxide and a liquid acetyl precursor, such as triacetin. The methods comprise contacting a poultry carcass with peracetic acid-containing water at a pH of about 6 to about 9. The methods result in an increase in the weight of the processed products and an increase in a processing plant's percent yield of the processed products.

33 Claims, 5 Drawing Sheets

METHODS OF USING PERACETIC ACID TO TREAT POULTRY IN A CHILL TANK DURING PROCESSING

CROSS-REFERENCE TO RELATED APPLICATION

Pursuant to 35 U.S.C. §120, this application is a continuation-in-part of and claims priority to U.S. patent application Ser. No. 13/065,553 filed on Mar. 24, 2011, now U.S. Pat. No. 8,546,449 the entire disclosure of which is incorporated herein by reference.

FIELD OF THE INVENTION

The invention relates to methods of using peracetic acid to treat poultry during processing for increasing the weight of the poultry, resulting in an increased yield of processed products.

BACKGROUND OF THE INVENTION

A. Liquid PAA Disinfectants and Sanitizers

Disinfectants and sanitizers based on peroxyacetic acid (PAA), also commonly known as peracetic acid, are used in the dairy, food and beverage processing industries for clean-in-place pipeline and equipment disinfecting and cleaning, for fruit and vegetable washing, and in the treatment of meat, poultry and seafood products. Peroxyacetic acid disinfectants are also used in the treatment of cooling water, process water, and municipal wastewater. Other uses include slime and biofilm removal in papermaking processes.

Peroxyacetic acid products are supplied as stable equilibrium ternary aqueous solutions of peroxyacetic acid, acetic acid, and hydrogen peroxide. They are prepared in advance of delivery, typically by reacting hydrogen peroxide with acetic acid in the presence of a mineral acid catalyst. Although some PAA is formed immediately, the PAA does not reach its maximum concentration until after several days. A metal chelating agent, such as hydroxyethylidene diphosphonic acid (HEDP) or dipicolinic acid, is also introduced to suppress the transition metal cation catalyzed decomposition of peroxygen compounds. The PAA product is then placed in containers, such as totes, drums and pails, in preparation for shipment to the end user. Typical commercial products have concentrations of PAA of about 1-15% w/w, although a concentration of up to 30% is possible. However, the latter concentration product only finds captive use because of its extremely hazardous and explosive properties.

There are several problems with the use of equilibrium solutions of PAA. First, the low concentration of PAA (1-15%) means that most of the weight (85-99%) of the products consists of substantial amounts of inert ingredients, such as water, acetic acid, and hydrogen peroxide. This results in the need for larger product storage areas and causes increased transportation and handling costs. Second, the products are inefficient in the utilization of both hydrogen peroxide and acetic acid (AA). This is because, in order to maintain adequate storage stability of the PAA, either hydrogen peroxide or AA must be present at a level on a weight percentage basis that is greater than the level of PAA, which increases raw material costs. Third, the presence of the HEDP or dipicolinic acid stabilizer limits the amount of PAA that can be applied to certain foodstuffs because the amount of HEDP or dipicolinic acid is regulated by the Food and Drug Administration (FDA). Fourth, the reaction between hydrogen peroxide and AA is quite slow in some cases, and typically requires several days' time before the PAA product can be tested for quality confirmation. Therefore, manufacturers of these products must store large inventories of the PAA product before it can be shipped to the end user. Fifth, for transportation purposes, equilibrium solutions that are greater than 6% PAA are considered to be dangerous products and must be labeled with the DOT marking "Organic Peroxide", Hazard Class 5.2, 8 (oxidizer, corrosive). If producers and end-users exceed the yearly threshold amount of just 6,666 lbs. of 15% PAA, they must file Risk Management Plans with both federal EPA and state authorities. This is an arduous and time-consuming process. In addition, producers of equilibrium solutions of PAA that are over 6% PAA must obtain permitting by the local fire department and pay an extra hazardous material shipping fee when the product is shipped from their facility. On the other hand, there are much less stringent requirements for products that contain hydrogen peroxide, and all reporting, permitting and shipping restrictions are lifted for products that contain less than 27% hydrogen peroxide.

As a result of these problems, there have been various attempts to make non-equilibrium solutions of PAA on site, at the point-of-use. For example, U.S. Pat. No. 7,012,154 discloses a system in which AA, hydrogen peroxide, water, and sulfuric acid are fed to a jacketed reactor for the production of PAA. A wiped-film distillation column attached to the reactor condenses and isolates the pure PAA from the gas phase and immediately introduces it to the receiving water. This system suffers from a number of drawbacks. First, it is extremely capital intensive due to the high cost of the equipment, including the reactor, heater, pumps, distillation column, and computerized control system which ensures accurate metering of the reagents. Second, there are significant safety hazards associated with the production of pure PAA due to its explosive properties. Third, the equipment and synthesis process is very complex and requires knowledgeable and highly trained technicians to continuously operate and maintain the system in a safe and effective manner.

Other attempts to make non-equilibrium solutions of PAA at the point-of-use are based on electrolytic processes. U.S. Pat. Nos. 6,171,551 and 6,387,236 disclose processes that employ a cell divided by an ion-exchange membrane in which PAA (and other oxidants including hydrogen peroxide and ozone) are produced in the anode compartment which consists of an aqueous solution of acetic acid or acetate salt. In addition to the high costs of electricity and electrolysis equipment, these processes also result in a very low yield of PAA from the acetyl precursor. For example, the '551 patent reports that less than 14 ppm of PAA was produced after 90 minutes of electrolysis of a 490,000 ppm anolyte of aqueous potassium acetate. In addition, these processes are difficult to perform intermittently.

Other methods of generating non-equilibrium solutions of PAA on site, using electrolysis, are described in WIPO International Publication Nos. WO 2004/0245116 and WO 2008/140988, and U.S. Patent Application Publication No. 2009/0314652. These references disclose cation membrane-divided electrolysis cells and the use of gas diffusion electrodes to effect the cathodic reduction of oxygen gas to hydrogen peroxide under alkaline conditions. The hydrogen peroxide was then allowed to react with acetic acid or an acetyl precursor to form PAA in the bulk solution, whereupon the catholyte was directed to the acidic anode compartment of the cell to stabilize the PAA. This system suffers from several disadvantages. Due to the low solubility of oxygen in water (about 8 ppm maximum), the concentration of electroactive species is very low, which forces the cell to operate at low current density (amperage per surface area of electrode). In order to produce a meaningful amount of hydrogen peroxide, the cells must have a very large surface area. This requires high capital equipment costs and a very large footprint for the electrolysis equipment. Another disadvantage of this system is that it is very difficult to maintain steady-state conditions and simultaneously balance the feed of acetic acid or acetyl precursor to the cathode compartment with the concurrent withdrawal of acidified PAA solution from the anode compartment. This is because cations carrying the cell current through the cation exchange membrane are always hydrated so as the cations move through the membrane, they are accompanied by water molecules. As a result, the volume of the anolyte decreases and the volume of the catholyte increases, making the steady-state condition difficult to maintain. It is difficult to perform this process intermittently. Finally, this system can only be of economic value if the source of oxygen is air, which comprises 23% oxygen. However, the carbon dioxide contained in air causes carbonates to precipitate, which impedes the flow of electrical current, limiting or eliminating the production of hydrogen peroxide, and hence, PAA.

Another method of making a non-equilibrium solution of PAA at the point-of-use is disclosed in WIPO International Publication No. WO 2008/140988 and U.S. Patent Application Publication Nos. 2009/0005590 and 2007/0082832. These references disclose biosynthetic methods of producing peracids from carboxylic acids and carboxylic acid esters. These methods involve the use of perhydrolase enzymes to catalyze the perhydrolysis of the carboxylic acid or ester into the peracid using a solid or liquid source of hydrogen peroxide. Although these methods can produce compositions containing up to 20 parts of peracid to one part of hydrogen peroxide, they are limited by the amount of peracid that can be produced before the perhydrolase enzyme is oxidized by the reactant products and ceases to function as intended. The highest concentration of peracid disclosed by these references was 0.16% (1,600 mg/L). However, peracid or PAA solutions that are produced with enzymes have limited appeal because they are very expensive to produce, and for regulatory reasons, the enzyme must be removed from the solution before the solution can be applied to food or hard surfaces for disinfection purposes. Removing the enzyme from the solution is not an easy task; thus, it is typically not done. Therefore, PAA solutions prepared by enzymatic methods are not suitable for the more broad commercial uses in the food, dairy, beverage, meat, and poultry industries, which are regulated by the FDA and the Environmental Protection Agency (EPA).

Another method of generating non-equilibrium PAA at its point-of-use requires substituting the traditional mineral acid catalyst with sulfonic acid ion-exchange resins, as disclosed in U.S. Pat. No. 5,122,538. A solution containing a 1.5:1 mole ratio of AA to hydrogen peroxide was passed through a column packed with a sulfonic acid ion-exchange resin and produced a solution of 15% PAA within 30 minutes. The method described in the '538 patent suffers from the limitation that it requires a large volume of expensive resin bed in order to be effective. Moreover, all existing ion exchange resin systems are limited by the fact the resin is subject to oxidative degradation by PAA and have a short limited lifespan.

Other attempts to produce non-equilibrium PAA solutions on site, at the point-of-use, for bleaching cellulosic materials have reacted hydrogen peroxide with acetic anhydride. For example, U.S. Pat. No. 3,432,546 discloses a process where hydrogen peroxide, acetic anhydride, and an ammonium hydroxide catalyst were metered to a tubular reactor to continuously produce a solution containing 3.25% PAA with a conversion of 78% hydrogen peroxide. However, the process generated measurable amounts of diacetyl peroxide (0.44%) which is an explosion hazard. Moreover, the reaction product would be unsuited for any application other than cellulosic bleaching purposes because there was no attempt to remove the ammonium hydroxide catalyst from the reaction medium. Ammonium) hydroxide is an undesirable contaminant in PAA products that are used as disinfectants and sanitizers in the dairy, food, and beverage processing industries, and in PAA products used in fruit and vegetable washing and in the treatment of meat, poultry, and seafood.

Another process for generating non-equilibrium solutions of PAA on site, at the point-of-use was disclosed in U.S. Patent Application Publication No. 2009/0043132. This process utilized introduction of hydrogen peroxide into a sidestream of the water requiring treatment. This was followed by introducing acetic anhydride, whereupon PAA was generated in-situ. It was found that acetic anhydride preferentially reacted with hydrogen peroxide rather than undergo undesirable hydrolysis with water. Within 20 minutes, up to 3000 ppm of PAA was generated in the sidestream which was then reconstituted with the main body of water and diluted further. All processes that employ acetic anhydride suffer the limitation that acetic anhydride is expensive, very corrosive, an irritant, and highly flammable.

Yet another process for generating non-equilibrium solutions of PAA on site at the point-of-use is disclosed in WIPO International Publication No. WO 01/46519 A1. This process utilized the metering of an aqueous solution of hydrogen peroxide into an agitated tank and co-metering a solid dry source of tetraacetylethylenediamine (TAED) from a storage hopper using a screw feeder. The agitator kept the solid TAED suspended in the hydrogen peroxide solution which was then fed to an in-line static mixer where aqueous sodium hydroxide was introduced. The mixture was then directed through 200 meters of coiled tubing immersed in a cooling tank so that the temperature rise accompanying the exothermic reaction was contained. Upon exiting the coiled tubing, the mixture containing PAA could be directed to the water requiring treatment. Disadvantages of this approach include the difficulty of accurately metering a solid and a liquid simultaneously, and the high capital equipment cost of the metering system, electronic controllers, agitation tank, coiled tubular reactor, and the cooling system.

Thus, there is a need for a method to make non-equilibrium PAA on site at the point-of-use that addresses the above problems.

B. Peracetic Acid Used in Poultry Chill Tanks

Poultry is typically processed by the following steps. Live birds packed in cages are delivered to a processing plant's holding area. The cages are transported by conveyor to a live hang area and are manually unloaded. The birds are hung by their feet to a shackle conveyor. The conveyor moves the birds through an electrified water tank or an electrified cabinet where they are stunned. The birds are then slaughtered and exsanguinated. They are then conveyed through a hot water scald tank at 123-140° F. for 30 to 90 seconds to loosen their feathers. A mechanical device then removes the feathers. The head and feet are removed and the birds are eviscerated. Each carcass and its internal organs are then inspected by United States Department of Agriculture (USDA) officials. If the carcass and internal organs are deemed healthy and free of fecal and digestive tract matter, the carcass is conveyed into a poultry chill tank.

If the carcass contains fecal or digestive tract matter, the carcass is further processed before being placed in the poultry chill tank. Depending on the size of the fecal or digestive tract matter, the carcass is directed to on-line reprocessing or off-line reprocessing, where it is sprayed with water containing a disinfectant or antimicrobial agent to remove the contamination. Following this reprocessing, the carcass is conveyed into the poultry chill tank.

The chill tank, sometimes referred to as the primary chill tank, is filled with near-freezing water and is used to cool the carcasses prior to further processing or packaging. The purpose of cooling the carcasses is to arrest the proliferation of pathogenic and spoilage microorganisms, such as *Salmonella, Campylobacter*, yeast, and molds. The carcasses move through the chill tank by means of flights on a large, slowly rotating auger. The residence time in the tank is typically about 45 minutes for chickens, but it can be up to three hours for larger birds such as turkeys. The water in the chill tank contains a disinfectant or antimicrobial agent to prevent cross-contamination of microorganisms between the carcasses, and to eradicate or reduce microorganisms still resident on the carcasses. A portion of the water in the chill tank is bled off or removed from the chill tank in order to keep the level of contaminants down. The bled off water may be discarded as waste or reused in an upstream (earlier) processing step. Additional water, referred to as make-up water, is added to the chill tank to maintain the volume of water in the chill tank.

Prior to the chill tank, some processing plants use a prechill tank to soak the carcasses in before placing them into the primary chill tank. One purpose of the prechill tank is to begin lowering the temperature of the carcasses early in the processing of the poultry. Typically, the water bled from the primary chill tank is used in the prechill tank. Thus, the disinfectant used in the primary chill tank also serves as a disinfectant in the prechilll tank.

Some processing plants use a finishing chill tank to soak the carcasses in after they are removed from the primary chill tank. The purpose of the finishing chill tank is to give the carcasses a final sanitization. Like the primary chill tank, the finishing chill tank also contains near-freezing water, but its smaller volume allows the plants to use a higher concentration of disinfectant than is used in the primary chill tank. The residence time is typically less than one minute. The water bled from the finishing chill tank may be used in the primary chill tank. Thus, the disinfectant used in the finishing chill tank also serves as a disinfectant in the primary chill tank.

The carcasses are removed from the primary chill tank, or from the finishing chill tank if one is used. They are then sent for packaging as whole birds. Or, if the carcasses are intended to be sold as pieces, they are placed on ice for about three hours and then cut up and sorted.

Poultry processors purchase the birds by weight, and also sell the processed products by weight. The typical poultry processing plant in the United States processes about 250,000 live birds per day and produces about 1,000,000 lbs of processed products per day. The weight of the processed products, however, is less than the weight of the live birds, for several reasons, including that various parts of the bird are discarded. Because the processors sell the processed products based on weight, it is important for the processors to maximize the weight of the processed products.

Poultry processors are regulated by the Food Safety Inspection Service (FSIS), a division of the USDA. The FSIS sets strict standards for microbiological control of the birds. Any disinfectant or antimicrobial agent that contacts the birds must be approved by the FSIS. The chill tank is the largest Hazard Analysis Critical Control Point (HACCP) exposure in the processing plant. Thus, the chill tank must perform as intended to cool the carcasses and must also maintain a high degree of microbiocidal efficacy to meet the standards of the FSIS.

The two most commonly used disinfectants or antimicrobial agents that are approved by the FSIS for use in poultry chill tanks are chlorine, in the form of sodium hypochlorite bleach, and equilibrium solutions of peracetic (peroxyacetic) acid. Chlorine has long been the primary disinfectant used in the United States; however, its use has declined dramatically over the past few years. As a result, the use of equilibrium solutions of peracetic acid has increased over recent years.

Equilibrium peracetic acid is typically used at concentrations of about 20 ppm to about 50 ppm in poultry chill tanks. At these concentrations, the peracetic acid causes the pH of the chill tank water to be about 4.5 to about 5.5. The poultry processing industry views this pH range as advantageous because it is accepted in the industry that bacteria and other microorganisms are more readily destroyed at lower pH values, and because equilibrium peracetic acid is more stable, and therefore more cost-effective, when used in an acid environment.

SUMMARY OF THE INVENTION

In one aspect, an embodiment of the invention provides a method of treating at least a portion of a poultry carcass for increasing the weight of the poultry utilizing either non-equilibrium peracetic acid or equilibrium peracetic acid at an elevated pH of 6-9. It was unexpected that treating poultry with non-equilibrium or equilibrium peracetic acid at an elevated pH of 6-9 would increase the weight of the processed products, resulting in an increase in the average percent yield of processed products from a poultry processing plant.

In another aspect, an embodiment of the invention provides a method of treating at least a portion of a poultry carcass for increasing the weight of the poultry, the method comprising combining water and an antimicrobial amount of a non-equilibrium solution of peracetic acid for forming a peracetic acid-containing water having a pH of about 6 to about 9; and bringing at least a portion of a poultry carcass into contact with the peracetic acid-containing water for increasing the weight of at least the portion of the poultry carcass from a first weight prior to contact with the peracetic acid-containing water to a second weight greater than the first weight after contact with the peracetic acid-containing water.

In another aspect, an embodiment of the invention provides a method of treating at least a portion of a poultry carcass for increasing the weight of the poultry, the method comprising providing, in a reservoir, a peracetic acid-containing water having a pH of about 6 to about 9, wherein the peracetic acid-containing water comprises water and an antimicrobial amount of a non-equilibrium solution of peracetic acid, and wherein the peracetic acid-containing water has a temperature; placing into the peracetic acid-containing water at least a portion of a poultry carcass having a first weight and having a first temperature greater than the temperature of the peracetic acid-containing water; allowing the peracetic acid-containing water having the pH of about 6 to about 9 to increase the first weight of at least the portion of the poultry carcass to a second weight greater than the first weight to provide an increased weight of at least the portion of the poultry carcass and to lower the first temperature of at least the portion of the poultry carcass to a second temperature less than the first temperature for cooling at least the portion of the poultry carcass; and removing at least the portion of the poultry carcass having the increased weight from the peracetic acid-containing water.

In another aspect, an embodiment of the invention provides a method of treating at least a portion of a poultry carcass for increasing the weight of the poultry, the method comprising combining water and an antimicrobial amount of an equilibrium solution of peracetic acid for forming a peracetic acid-containing water; determining the pH of the peracetic acid-containing water, and, if the pH is determined to be lower than about 6 or higher than about 9, then altering the pH of the peracetic acid-containing water to a pH of about 6 to about 9; bringing at least a portion of a poultry carcass into contact with the peracetic acid-containing water; and determining the pH of the peracetic acid-containing water with at least the portion of the poultry carcass therein, and, if the pH is determined to be lower than about 6 or higher than about 9, then altering the pH of the peracetic acid-containing water to a pH of about 6 to about 9, for increasing the weight of at least the portion of the poultry carcass from a first weight prior to contact with the peracetic acid-containing water to a second weight greater than the first weight after contact with the peracetic acid-containing water.

In another aspect, an embodiment of the invention provides a method of treating at least a portion of a poultry carcass for increasing the weight of the poultry, the method comprising providing, in a reservoir, a peracetic acid-containing water, wherein the peracetic acid-containing water comprises water and an antimicrobial amount of a solution of peracetic acid, and wherein the peracetic acid-containing water has a temperature; determining the pH of the peracetic acid-containing water, and, if the pH is determined to be lower than about 6 or higher than about 9, then altering the pH of the peracetic acid-containing water to a pH of about 6 to about 9; placing into the peracetic acid-containing water at least a portion of a poultry carcass having a first weight and having a first temperature greater than the temperature of the peracetic acid-containing water; determining the pH of the peracetic acid-containing water in the reservoir with at least the portion of the poultry carcass therein, and, if the pH is determined to be lower than about 6 or higher than about 9, then altering the pH of the peracetic acid-containing water to a pH of about 6 to about 9; allowing the peracetic acid-containing water having the pH of about 6 to about 9 to increase the first weight of at least the portion of the poultry carcass to a second weight greater than the first weight to provide an increased weight of at least the portion of the poultry carcass and to lower the first temperature of at least the portion of the poultry carcass to a second temperature less than the first temperature for cooling at least the portion of the poultry carcass; and removing at least the portion of the poultry carcass having the increased weight from the peracetic acid-containing water.

DETAILED DESCRIPTION OF THE INVENTION

1. Definitions

Figure 1:
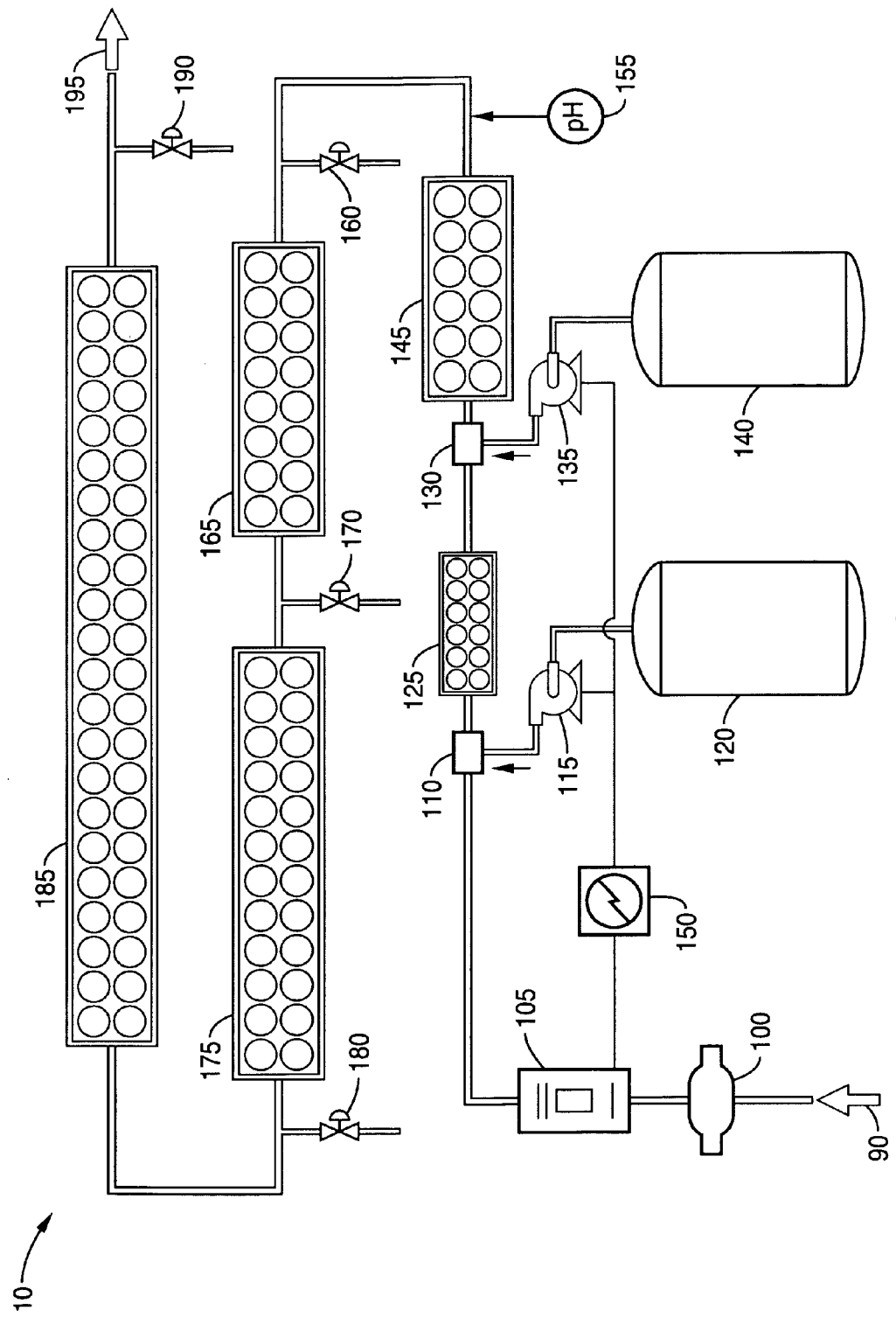
FIG. 1 is a schematic representation of an example of a system that may be used to continuously or intermittently generate PAA for on a site having a point-of-use of peracetic acid In another embodiment, a freely-flowable, solid peroxygen composition for use in laundry bleaching and stain removal is provided according to an embodiment.

The terms "PAA" and "peracetic acid" mean peroxyacetic acid or peracetic acid, and/or the conjugate base of peracetic acid (the peracetate ion).

The terms "percent" and "%" mean weight percent, except when referring to the percent converted.

The term "receiving water" means the water that is being treated.

The term "point-of-use" means the location where the peracetic acid enters the receiving water.

The term "poultry" means any bird, including chicken, turkey, duck, goose, ostrich, pheasant, squab, and other birds.

The term "carcass" means the dead body of a bird, after exsanguination and after removal of the feathers, viscera, head, and feet.

2. Experimental Methods

PAA and hydrogen peroxide in solution were determined using the ceric sulfate-sodium thiosulfate method. The method involves adding a known weight of sample containing the PAA and hydrogen peroxide (or dilution) to a beaker containing 50 ml of chilled 0.9 N sulfuric acid. Using a transfer pipette, 1-2 grams is accurately weighed to a sample cup and reverse osmosis (RO) or deionized water is added to provide a workable volume. Five drops of ferroin indicator is then added with stirring, and the sample is then titrated with 0.1N ceric sulfate until the sample turns from purple to blue. The volume of ceric sulfate required in mL is recorded. Then, one or two small scoops of potassium iodide are added to the sample cup, which turns the solution dark brown. The sample is then titrated with 0.1N sodium thiosulfate to discharge the brown coloration and form a pale straw coloration. Then, 10-15 drops of 0.5% starch indicator solution is introduced and the sample turns blue-black. The sodium thiosulfate is then added dropwise until the color transitions to a bright orange. The volume of sodium thiosulfate in mL was recorded. The percent hydrogen peroxide and the percent PAA are calculated as follows:

$$\% \text{ hydrogen peroxide} = \frac{\text{mL } 0.1N \text{ ceric sulfate} \times 0.17}{\text{wt. sample}}$$

$$\% \text{ PAA} = \frac{\text{mL } 0.1N \text{ sodium thiosulfate} \times 0.38}{\text{wt. sample}}$$

For kinetic runs which involved measuring the PAA and hydrogen peroxide in samples at one, three, and five minute intervals after adding the reactants together, the generation reaction was quenched by adding a sample of the reaction medium to the sulfuric acid. This halted the generation reaction and stabilized the PAA and hydrogen peroxide to elevated pH degradation reactions. This permitted the samples to be taken at the appropriate time interval (one, three, and five minutes), and analyzed later.

In circumstances where low concentrations of PAA were used, the modified DPD method (U.S. Pat. No. 7,651,724) was employed. This analytical technique is based on a modified DPD (N,N-diethyl-p-phenylenediamine) colorimetric method accepted by the EPA for measuring total chlorine in drinking water and wastewater. It relies on the ability of PAA to behave like chlorine in that it rapidly and quantitatively oxidizes iodide ion (I$^-$) into iodine (I$_2$) that reacts with a color indicator (DPD), which turns the solution a shade of pink, the intensity of which is proportional to the concentration of the PAA. A colorimeter is used that is programmed to measure the intensity (absorbance) of the pink coloration and display the result in terms of ppm as Cl$_2$. A calculation converts this number into the ppm as PAA, based on the weight ratio of PAA to Cl$_2$ (76/71=1.07).

Hydrogen peroxide does not interfere with the measurement for PAA provided the analysis is completed within 30 seconds of introducing the DPD reagent. In order for the hydrogen peroxide to be measured, it must be activated by addition of a sodium molybdate catalyst and then given time (six minutes) to react with the I$^-$ ion to liberate I$_2$. Upon addition of the DPD indicator, the intensity of the pink coloration measured by the colorimeter is now the sum of the PAA and hydrogen peroxide concentrations expressed as ppm Cl$_2$. After subtracting the ppm reading obtained earlier for the contribution due to PAA, a calculation is then used to convert this number into ppm as hydrogen peroxide, and is based on the weight ratio of hydrogen peroxide to Cl$_2$ (34/71=0.479).

3. Liquid Compositions for Generating Non-Equilibrium Solutions of PAA on a Site Having a Point-of-Use In an embodiment, liquid compositions for generating non-equilibrium solutions of PAA on a site having a point-of-use of peracetic acid are provided. These solutions are referred to as "hydrogen peroxide-acetyl precursor solutions." These solutions comprise aqueous hydrogen peroxide, a liquid acetyl precursor that is soluble in aqueous hydrogen peroxide, a trace amount of peracetic acid, and water.

The hydrogen peroxide-acetyl precursor solutions are prepared by the following steps.

(a) Introducing a liquid acetyl precursor that is soluble in aqueous hydrogen peroxide to a solution of aqueous hydrogen peroxide.

Triacetin is a preferable liquid acetyl precursor and 50% hydrogen peroxide is a preferable solution of aqueous hydrogen peroxide. The triacetin is preferably added to the 50% hydrogen peroxide at room temperature. Alternatively, 70% hydrogen peroxide can be used, but it is not widely available and requires special handling and transportation. Given that the solubility of triacetin in water is only 7% at 25° C., triacetin is unexpectedly highly soluble in 50% hydrogen peroxide. It solubilizes without an exotherm (temperature increase).

The mole ratio of hydrogen peroxide:triacetin is about 2.98:1 to about 12.84:1.

(b) Allowing the acetyl precursor and the aqueous hydrogen peroxide to mix to form a hydrogen peroxide-acetyl precursor solution.

The solution is mixed until a homogenous solution has been formed. The solution is allowed to mix by diffusion or by using a mixing device that is suitable for mixing liquids together. For example, 50% hydrogen peroxide can be introduced to a batch tank equipped with an overhead agitator blade. Triacetin can then be introduced to the 50% hydrogen peroxide when the agitator is in motion so that the components are thoroughly mixed.

The solution that is formed is a hydrogen peroxide-acetyl precursor solution, which also includes varying amounts of water, depending on the formulation used. When triacetin is used as the liquid acetyl precursor, the solution that is formed is a hydrogen peroxide-triacetin solution. One such hydrogen peroxide-triacetin solution comprises about 23% to about 40% hydrogen peroxide (from 50% aqueous hydrogen peroxide), about 20% to about 52% triacetin, water, and a trace amount of PAA that is formed within the first day of preparing the hydrogen peroxide-acetyl precursor solution. The pH is about 1.46 to about 2.2.

A preferable hydrogen peroxide-triacetin solution comprises about 27.15% hydrogen peroxide (from 50% aqueous hydrogen peroxide), about 45.67% triacetin, water, and a trace amount of PAA that is formed within the first day of preparing the hydrogen peroxide-acetyl precursor solution. The mole ratio of hydrogen peroxide:triacetin is about 3.8:1.

The hydrogen peroxide-acetyl precursor solutions prepared by this method may be used to generate non-equilibrium solutions of PAA on a site having a point-of-use of peracetic acid, in the methods described in section 4 below. The hydrogen peroxide-acetyl precursor solutions may be transported in any container suitable for transporting liquids, such as plastic tote bins of 275-330 gallons, drums of 15-55 gallons, five-gallon pails, one-gallon jugs, or other containers.

EXAMPLE 1

Triacetin (83.05 g) was added to 50% hydrogen peroxide solution (75 g) to form 158.05 g of a mixture. There was no evolution of gas indicating the hydrogen peroxide had decomposed to oxygen, nor was there any exotherm indicating that a chemical reaction had occurred. The solution did not turn oily or cloudy but remained clear. The solution was calculated to comprise 23.73% hydrogen peroxide and 52.55% triacetin, with the balance being water, and had a measured pH of 2.2. The mole ratio of hydrogen peroxide to triacetin was calculated to be 2.98:1. Titration of the solution immediately upon preparation yielded 24.1% hydrogen peroxide, which is within experimental error of the calculated amount of hydrogen peroxide.

This experiment showed that triacetin is remarkably soluble in 50% hydrogen peroxide. The solubility of triacetin was found to be at least 52.55%. This is surprising, given that the solubility of triacetin in water is only 7% at 25° C.

In order to test the stability of the mixture, the amount of hydrogen peroxide remaining and the amount of PAA generated was tracked for several months. The mixture was held at ambient temperature away from sources of light. Table I summarizes the data.

TABLE I

| Day # | % Hydrogen Peroxide Remaining | % PAA Generated |
| --- | --- | --- |
| 1 | 23.79 | 0.00 |
| 29 | 23.32 | 1.28 |
| 57 | 22.56 | 2.36 |
| 92 | 21.06 | 4.22 |

TABLE I-continued

| Day # | % Hydrogen Peroxide Remaining | % PAA Generated |
|---|---|---|
| 120 | 19.54 | 6.05 |
| 134 | 18.57 | 6.87 |

Table I shows that although there was a steady depletion in hydrogen peroxide, it was accompanied by an increase in PAA. By the end of the 134-day study, the composition had lost 5.22% hydrogen peroxide. Had all of the depleted hydrogen peroxide gone towards the generation of PAA, 11.67% PAA would have been generated. Because 6.87% PAA was generated, unaccounted losses of hydrogen peroxide amounted to 2.15%. This loss of hydrogen peroxide was surprisingly small given that hydrogen peroxide is often used to destroy organic compounds by oxidation and the composition originally contained 52.55% of triacetin, an organic compound.

EXAMPLE 2

A formulation containing hydrogen peroxide and triacetin in a mole ratio of 12.84:1 was prepared by adding triacetin (100.0 g) to 50% hydrogen peroxide (400.0 g) so that the mixture was 40% hydrogen peroxide and 20% triacetin, with the balance being water. The pH of the solution was 1.46 and the pH of a 1:100 dilution was 3.69. To accelerate storage characteristics, the sample was placed in an incubator set for 86-87° F. Table II shows the percent of hydrogen peroxide remaining and the percent of PAA generated over a period of more than six months.

TABLE II

| Days of Study | % Hydrogen Peroxide Remaining | % PAA Generated |
|---|---|---|
| 1 | 40.21 | 0.004 |
| 33 | 38.02 | 3.499 |
| 54 | 35.5 | 5.992 |
| 96 | 29.27 | 8.36 |
| 127 | 25.05 | 6.66 |
| 173 | 18.49 | 4.43 |
| 201 | 15.67 | 3.51 |

Table II indicates that after 96 days, the generation of PAA maximized at 8.36% and corresponded to a loss of 10.94% hydrogen peroxide. Had all of the depleted hydrogen peroxide gone toward the generation of PAA, 24.45% PAA would have been generated. Because only 8.36% PAA was generated, unaccounted losses of hydrogen peroxide amounted to 7.2%.

EXAMPLE 3

A formulation containing hydrogen peroxide and triacetin in a mole ratio of 5.8:1 was prepared by adding triacetin (37.5008 g) to 50% hydrogen peroxide (65.2504 g) so that the mixture was 31.75% hydrogen peroxide and 36.5% triacetin, with the balance being water. The pH of the solution was 1.57 and the pH of a 1:100 dilution was 5.17. To accelerate degradation, the sample was placed in an incubator set for 86-87° F. Table III shows the percent of hydrogen peroxide remaining and the percent of PAA generated over a period of six days.

TABLE III

| Days of Study | % Hydrogen Peroxide Remaining | % PAA Generated |
|---|---|---|
| 1 | 31.72 | 0.33 |
| 6 | 31.63 | 0.716 |

In this study, after six days, the mixture had lost only 0.09% hydrogen peroxide, yet had generated an additional 0.386% PAA. Had all the loss of hydrogen peroxide been due to the formation of PAA, only an additional 0.201% would have been generated. It is clear that the analytical methods employed for solutions that are high in hydrogen peroxide but low in PAA are subject to detection limit errors.

EXAMPLE 4

A formulation containing hydrogen peroxide and triacetin in a mole ratio of 3.2:1 was prepared by adding triacetin (35.0 g) to 50% hydrogen peroxide (35.0 g) so that the mixture was 25% hydrogen peroxide and 50% triacetin, with the balance being water. The pH of the solution was 1.66 and the pH of a 1:100 dilution was 4.09. To accelerate degradation, the sample was placed in an incubator set for 86-87° F. Table IV shows the percent of hydrogen peroxide remaining and the percent of PAA generated over a period of 22 days.

TABLE IV

| Days of Study | % Hydrogen Peroxide Remaining | % PAA Generated |
|---|---|---|
| 1 | 25 | 0.62 |
| 8 | 24.51 | 1 |
| 15 | 24.17 | 1.17 |
| 22 | 23.68 | 1.14 |

Table IV indicates that after 15 days, the generation of PAA maximized at 1.17% and corresponded to a loss of 0.83% hydrogen peroxide. Had all of the depleted hydrogen peroxide gone toward the generation of PAA, 1.86% PAA would have been generated. Because only 1.17% PAA was generated, unaccounted losses of hydrogen peroxide amounted to 0.31%.

EXAMPLE 5

A formulation containing hydrogen peroxide and triacetin in a mole ratio of 4.8:1 was prepared by adding triacetin (37.50 g) to 50% hydrogen peroxide (56.25 g) so that the mixture was 30% hydrogen peroxide and 40% triacetin, with the balance being water. The pH of the solution was 1.67 and the pH of a 1:100 dilution was 4.62. To accelerate degradation, the sample was placed in an incubator set for 86-87° F. Table V shows the percent of hydrogen peroxide remaining and the percent of PAA generated over a period of 43 days.

TABLE V

| Days of Study | % Hydrogen Peroxide Remaining | % PAA Generated |
|---|---|---|
| 1 | 30.08 | 0.38 |
| 8 | 29.85 | 0.784 |

TABLE V-continued

| Days of Study | % Hydrogen Peroxide Remaining | % PAA Generated |
|---|---|---|
| 15 | 29.63 | 1.22 |
| 22 | 29.37 | 1.71 |
| 29 | 28.76 | 2.26 |
| 36 | 28.67 | 2.78 |
| 43 | 28.31 | 3.41 |

Table V shows that although there was a steady depletion in hydrogen peroxide, it was accompanied by the associative increase of PAA. At the end of the 43-day study, the composition had lost 1.77% hydrogen peroxide. Had all of the depleted hydrogen peroxide gone toward the generation of PAA, 3.96% PAA would have been generated. Because only 3.41% PAA was generated, unaccounted losses of hydrogen peroxide amounted to 0.24%.

EXAMPLE 6

A formulation containing hydrogen peroxide and triacetin in a mole ratio of 6.42:1 was prepared by adding triacetin (25.0007 g) to 50% hydrogen peroxide (50.0007 g) so that the mixture was 33.33% hydrogen peroxide and 33.33% triacetin, with the balance being water. The pH of the solution was 1.56 and the pH of a 1:100 dilution was 5.15. To accelerate degradation, the sample was placed in an incubator set for 86-87° F. Table VI shows the percent of hydrogen peroxide remaining and the percent of PAA generated over a period of 36 days.

TABLE VI

| Days of Study | % Hydrogen Peroxide Remaining | % PAA Generated |
|---|---|---|
| 1 | 33.13 | 0.81 |
| 8 | 32.88 | 1.35 |
| 15 | 32.61 | 1.88 |
| 22 | 31.69 | 2.58 |
| 29 | 31.75 | 3.03 |
| 36 | 31.29 | 3.28 |

Table VI shows that although there was a steady depletion in hydrogen peroxide, it was accompanied by an associative increase of PAA. At the end of the 36-day study, the composition had lost 1.84% hydrogen peroxide. Had all of the depleted hydrogen peroxide gone toward the generation of PAA, 4.11% PAA would have been generated. Because only 3.28% PAA was generated, unaccounted losses of hydrogen peroxide amounted to 0.37%.

EXAMPLE 7

A 30-gallon batch of 50% hydrogen peroxide and triacetin was prepared by blending 137 lbs triacetin with 163 lbs 50% hydrogen peroxide so that the mixture was 27.15% hydrogen peroxide and 45.67% triacetin, with the balance being water. Thus, the mole ratio of hydrogen peroxide:triacetin was 3.8:1. The mixture was stored in an opaque drum in a non-climate controlled environment. On storage, the mixture slowly formed PAA in the container. Since this reaction of hydrogen peroxide to PAA does not represent a destructive loss of total peroxygen, to determine the true stability of the hydrogen peroxide, both the hydrogen peroxide and the peracetic acid generated must be quantified and reported as total peroxygen recovered.

After 295 days of storage, the mixture was analyzed for total peroxygen recovered (expressed as hydrogen peroxide) to determine the percent loss of peroxygen. Using the ceric sulfate-iodometric titration method, the PAA generated and the hydrogen peroxide remaining were measured. The total peroxygen recovered after 295 days and the theoretical initial concentrations are shown in Table VII. All peroxygen is expressed as % hydrogen peroxide.

TABLE VII

| | Initial Theoretical % | % (after 295 days) |
|---|---|---|
| Hydrogen Peroxide Recovered | 27.17 | 15.20 |
| PAA formed | 0 | 15.57 |
| Hydrogen Peroxide Reacted to form PAA | 0 | 6.97 |
| Total Recovered Hydrogen Peroxide | 27.17 | 22.17 |
| Total Hydrogen Peroxide Unproductive Loss | | 5.00 |

After 295 days, 22.17% of the total peroxygen was recovered as either titratable hydrogen peroxide or hydrogen peroxide reacted to form PAA. To determine the stability of the peroxygen in the mixture, the total recovered hydrogen peroxide after 295 days (22.17%) was subtracted from the total recovered hydrogen peroxide of the initial theoretical value (27.17%). The result, 5%, is the loss of peroxygen (expressed as hydrogen peroxide) after 295 days of storage in a non-climate controlled environment.

4. Methods of Generating Non-Equilibrium PAA on Site at the Point-of-Use

Methods of continuously or intermittently generating non-equilibrium solutions of PAA on a site having a point-of-use of PAA for use as a disinfectant or sanitizer, using a source of water that is an aqueous stream or by a batch process using water in a container, are provided.

In one embodiment, a method of continuously or intermittently generating non-equilibrium solutions of PAA on a site having a point-of-use, using a source of water that is an aqueous stream, comprises the following steps.

(a) Providing water.

Flowing water is provided on a site having a point-of-use of peracetic acid.

The water may be flowing in, for example, a pipe, a flume, a canal, or other types of aqueous streams. The water pressure should be regulated and the flow rate should be monitored or measured. Any suitable flow meter may be used, such as a rotameter, a magnetic flow meter, an ultrasonic flow meter, a Doppler flow meter, a differential-pressure flow meter, a turbine flow meter, or a Coriolis flow meter.

The water should be softened, deionized, or of sufficient low hardness that it will not precipitate calcium salts when the alkali metal or earth alkali metal hydroxide is introduced in step (d).

(b) Introducing a hydrogen peroxide-acetyl precursor solution to the water.

A hydrogen peroxide-acetyl precursor solution is provided on the site having the point-of-use of the PAA. The hydrogen peroxide-acetyl precursor solution may be prepared by the steps set forth in section 3 above. The hydrogen peroxide-acetyl precursor solution may be prepared off site and then transported to the site having the point-of-use, or the acetyl precursor and the aqueous hydrogen peroxide may be transported to the site having the point-of-use and used to prepare the hydrogen peroxide-acetyl precursor solution on the site.

A preferable liquid acetyl precursor is triacetin. When triacetin is used, a hydrogen peroxide-triacetin solution is introduced.

The hydrogen peroxide-acetyl precursor solution is introduced to the flowing water in an amount such that the hydrogen peroxide-acetyl precursor solution is about 5.6% to about 22.5% of the total.

The hydrogen peroxide-acetyl precursor solution is pumped from its container into the aqueous water stream, for example, through an injection quill mounted on the pipe. Any suitable pump capable of overcoming the pressure of the water flowing in the pipe may be used. Examples include a solenoid-driven or air-driven diaphragm pump or a peristaltic pump. The rate at which the hydrogen peroxide-acetyl precursor solution is pumped into the flowing water is governed by a controller that is interfaced to a flow meter that is measuring the flow of the water. In this way, the rate at which the hydrogen peroxide-acetyl precursor solution is pumped may be matched to the flow of the water in the aqueous stream. If the flow of the water slows, the rate at which the hydrogen peroxide-acetyl precursor solution is pumped should slow accordingly. If the flow of the water stops, the hydrogen peroxide-acetyl precursor pump should stop.

As an alternative to step (b), the liquid acetyl precursor and the solution of aqueous hydrogen peroxide may be introduced to the water separately, either simultaneously or sequentially. If they are introduced sequentially, either one may be added first. If the liquid acetyl precursor and the aqueous hydrogen peroxide are introduced separately, rather than as an hydrogen peroxide-acetyl precursor solution, then in step (c) the liquid acetyl precursor and the aqueous hydrogen peroxide are mixed with the water to form a mixture.

(c) Mixing the hydrogen peroxide-acetyl precursor solution and the water to form a mixture.

Any mixing device suitable for mixing liquids may be used. An example is a static mixer located just after the point that the hydrogen peroxide-acetyl precursor solution is introduced to the flowing water. One type of static mixer utilizes a non-moving element such as a series of baffles. As the mixture flows through the static mixer under the motive force of the flowing water, the non-moving element divides the flow several times to provide radial mixing. Another type of static mixer utilizes a series of obstructions, such as column packing or glass beads, provided there is a low differential pressure drop across the mixer. The obstructions provide for turbulent mixing of the hydrogen peroxide-acetyl precursor solution and the flowing water. The mixing should yield a homogeneous solution with no concentration gradients before the next step is performed. The velocity of the water will determine the time it takes to complete the mixing and the efficiency of the mixing. For example, with ¾" pipe, a static mixer of ¾" diameter and 6" long, and a velocity of about 1 gal/min., mixing should be accomplished in less than about one second.

(d) Adding an aqueous source of an alkali metal or earth alkali metal hydroxide to the mixture.

An aqueous source of an alkali metal or earth alkali metal hydroxide is provided on the site having the point-of-use. A preferable aqueous source of an alkali metal hydroxide is sodium hydroxide, and 50% sodium hydroxide is most preferable. Other suitable alkali metal hydroxides include 45% potassium hydroxide.

Sufficient 50% NaOH is added to the flowing mixture such that the amount of sodium hydroxide is about 1.82% to about 7.28% of the total amount. When the acetyl precursor is triacetin, a preferred mole ratio of NaOH:hydrogen peroxide:triacetin is about 4.2:3.8:1.

The 50% NaOH solution is added to the mixture by pumping it from its container with a suitable pumping device and into the mixture through an injection quill mounted on the pipe. Any suitable pump capable of overcoming the hydraulic pressure of the pipe may be used. Examples include a solenoid-driven or air-driven diaphragm pump or a peristaltic pump.

The rate at which the 50% NaOH solution is pumped into the pipe is governed by the same controller that is interfaced to both the flow meter that is measuring the flow of the mixture and the pump controlling the rate of introduction of the hydrogen peroxide-acetyl precursor solution. In this way, the rate at which the 50% NaOH solution is introduced may be matched to both the flow of the mixture and the rate of introducing the hydrogen peroxide-acetyl precursor solution. If the flow of the mixture slows for any reason, the rate at which the 50% NaOH solution is pumped should slow accordingly. If the flow of the mixture stops, the 50% NaOH pump should stop as well.

Step (d) may be performed after step (c), or it may be performed simultaneously with step (b).

(e) Forming a reaction medium comprising a non-equilibrium solution of peracetic acid.

The reaction medium that is formed in this step almost instantaneously forms a non-equilibrium solution of PAA. The hydrogen peroxide reacts with the acetyl precursor to form peracetic acid. Depending upon the temperature of the water, the efficiency of mixing, and the mole ratio of NaOH:hydrogen peroxide:acetyl precursor employed, the amount of hydrogen peroxide and acetyl precursor that are converted into PAA is maximized within about 30 seconds to about five minutes.

The non-equilibrium solutions of PAA prepared by this method comprise PAA, unreacted hydrogen peroxide, unreacted acetyl precursor, the product of the perhydrolysis reaction of the acetyl precursor, the aqueous source of alkali metal or earth alkali metal hydroxide, and water. When the acetyl precursors is triacetin, the product of the perhydrolysis reaction is 1,2,3-propanetriol (glycerine).

This method may also include an optional step after step (e) of sampling the reaction medium at various times after the addition of the aqueous source of alkali metal or earth alkali metal hydroxide to determine the time required under the existing conditions to maximize the amount of hydrogen peroxide and acetyl precursor that are converted into PAA. This may be accomplished by directing the flow of the reaction medium through a series of residence chambers equipped with sampling ports. The residence chambers are designed to be of sufficient volume such that a certain amount of time has elapsed since the introduction of the 50% NaOH. Thus, at any given flow rate in the pipe, the first residence chamber is of a volume such that 30 seconds have elapsed since the introduction of 50% NaOH, one minute has elapsed by the time the flow reaches the sampling port immediately after the second residence chamber, and additional time elapses by the time the flow reaches the remaining sampling ports. Up to four residence chambers and sampling ports may be placed in series such as this to provide the user with about 30 seconds to five minutes of residence time after the introduction of the 50% NaOH. Once the flow of the reaction medium has been established, samples are drawn from all four sampling ports associated with the residence chambers and analyzed for peracetic acid. The sample which registers the highest amount of peracetic acid is deemed to be drawn from the sampling port associated with the residence chamber corresponding to the time of maximum conversion of the acetyl precursor into peracetic acid. At this point, the entire flow of reaction medium is directed through the sampling point of maximum conversion of acetyl precursor and to the point-of-use.

In another embodiment, a method of continuously or intermittently generating a non-equilibrium solution of PAA on a site having a point-of-use in a batch process comprises the following steps:

(a) Providing water.

A container of water, such as a mixing tank or other vessel, is provided on a site having a point-of-use of peracetic acid. The water should be softened, deionized, or of sufficient low hardness that it will not precipitate calcium salts when the alkali metal or earth alkali metal hydroxide is introduced in step (d).

(b) Introducing a hydrogen peroxide-acetyl precursor solution to the water.

A hydrogen peroxide-acetyl precursor solution is provided on the site having the point-of-use of the PAA. The hydrogen peroxide-acetyl precursor solution may be prepared by the steps set forth in section 3 above. The hydrogen peroxide-acetyl precursor solution may be prepared off site and then transported to the site having the point-of-use, or the acetyl precursor and the aqueous hydrogen peroxide may be transported to the site having the point-of-use and used to prepare the hydrogen peroxide-acetyl precursor solution on the site.

A preferable liquid acetyl precursor is triacetin. When triacetin is used, a hydrogen peroxide-triacetin solution is introduced.

The hydrogen peroxide-acetyl precursor solution is introduced to the water in an amount such that the hydrogen peroxide-acetyl precursor solution is about 5.6% to about 22.5% of the total.

The hydrogen peroxide-acetyl precursor solution is pumped from its container into the container of water through an injection quill mounted on the side of the container of water. Any suitable pump may be used. Examples include a solenoid-driven or air-driven diaphragm pump or a peristaltic pump.

As an alternative to step (b), the liquid acetyl precursor and the solution of aqueous hydrogen peroxide may be introduced to the water separately, either simultaneously or sequentially. If they are introduced sequentially, either one may be added first. If the liquid acetyl precursor and the aqueous hydrogen peroxide are introduced separately, rather than as an hydrogen peroxide-acetyl precursor solution, then in step (c) the liquid acetyl precursor and the aqueous hydrogen peroxide are mixed with the water to form a mixture.

(c) Mixing the hydrogen peroxide-acetyl precursor solution and the water to form a mixture.

Any mixing device suitable for mixing liquids may be used. An example is an overhead stirrer, such as an agitator blade. The container of water is equipped with a baffle to assist the process of mixing. The mixing should yield a homogeneous solution with no concentration gradients before the next step is performed.

(d) Adding an aqueous source of an alkali metal or earth alkali metal hydroxide to the mixture.

An aqueous source of an alkali metal or earth alkali metal hydroxide is provided on the site having the point-of-use. A preferable aqueous source of an alkali metal hydroxide is sodium hydroxide, and 50% sodium hydroxide is most preferable. Other suitable alkali metal hydroxides include 45% potassium hydroxide.

Sufficient 50% NaOH is added to the mixture such that the amount of sodium hydroxide is about 1.82% to about 7.28% of the total amount. When the acetyl precursor is triacetin, a preferred mole ratio of NaOH: hydrogen peroxide:triacetin is about 4.2:3.8:1.

The 50% NaOH solution is added to the mixture by pumping it from its container with a suitable pumping device and into the mixture through an injection quill mounted on the side of the container of water. Any suitable pump may be used. Examples include a solenoid-driven or air-driven diaphragm pump or a peristaltic pump.

Step (d) may be performed after step (c), or it may be performed simultaneously with step (b).

(e) Forming a reaction medium comprising a non-equilibrium solution of peracetic acid.

The reaction medium that is formed in this step almost instantaneously forms a non-equilibrium solution of PAA. The hydrogen peroxide reacts with the acetyl precursor to form peracetic acid. Depending upon the temperature of the water, the efficiency of mixing, and the mole ratio of NaOH:hydrogen peroxide:acetyl precursor employed, the amount of hydrogen peroxide and acetyl precursor that are converted into PAA is maximized within about 30 seconds to about five minutes.

The non-equilibrium solutions of PAA prepared by this method comprise PAA, unreacted hydrogen peroxide, unreacted acetyl precursor, the product of the perhydrolysis reaction of the acetyl precursor, the aqueous source of alkali metal or earth alkali metal hydroxide, and water. When the acetyl precursor is triacetin, the product of the perhydrolysis reaction is 1,2,3-propanetriol (glycerine).

While not wishing to be bound by theory, it is believed that under elevated pH conditions created by the addition of a source of alkali metal hydroxide or earth alkali metal hydroxide, hydrogen peroxide dissociates according to the following equation:

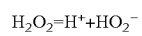

$$H_2O_2 = H^+ + HO_2^-$$

The perhydroxyl anion ($HO_2^-$) then affects nucleophilic substitution reactions on the carbonyl groups of the acetyl precursor in a perhydrolysis reaction to form peracetic acid and the product of the perhydroloysis reaction of the acetyl precursor. When the acetyl precursor is triacetin and all three acetyl groups are reacted, then the product of the perhydrolysis reaction is 1,2,3-propanetriol (glycerine).

In these methods, the perhydrolysis reaction is rapid and the maximum amount of PAA is generated within about 30 seconds to about five minutes at ambient temperature. The methods efficiently utilize the acetyl precursor and the source of hydrogen peroxide. When triacetin is used, assuming all three acetyl groups are reacted, about 40.9% to about 85.7% of the triacetin is converted into PAA. The percent of hydrogen peroxide remaining is about 0.078% to about 1.88%.

The non-equilibrium solutions of PAA prepared by these methods have several unique characteristics. The PAA solutions have high levels of PAA, from about 1% to about 7.1%. In addition, the PAA solutions are alkaline, having a pH of about 11.2 to about 13.37.

The non-equilibrium solutions of PAA may be immediately introduced to the receiving water at the point-of-use. Alternatively, the solutions may be stabilized by halting the decomposition of the PAA by adding a source of acid to lower the elevated pH of the reaction medium caused by the addition of an alkali metal or earth alkali metal hydroxide, and to provide neutral to mildly acid pH conditions to stabilize the PAA to elevated pH degradation. The acid-stabilized PAA solutions can then be stored and used at the point-of-use as required throughout a working day.

The non-equilibrium PAA solutions produced by these methods can be advantageously used wherever traditional equilibrium solutions of PAA are used. Thus, the PAA solutions may be used as a disinfectant and sanitizer in the dairy, food, and beverage processing industries for clean-in-place pipeline and equipment cleaning; for fruit and vegetable washing; and in the treatment of meat, poultry, and seafood products. These PAA solutions may also be used in the treatment of cooling water, oil and gas process water, and municipal wastewater. Other uses include slime and biofilm removal in papermaking processes.

For both of the above methods, steps (a) through (e) may be performed on a continuous or intermittent basis. In a continuous basis, the steps are performed under conditions of steady state, and the PAA solution is produced at the same rate as a function of time. However, intermittent performing of steps (a) through (e) is possible if the demand for the PAA solution drops for any reason (e.g., change in working shift or the target level of PAA in the receiving water has been achieved), in which case, steps (a) through (e) may be discontinued and resumed when the demand increases.

EXAMPLE 8

Tests were performed using about one liter of reverse osmosis (RO) or softened water which was buffered to an alkaline pH. The buffering media included 0.1 and 0.2 M $Na_2CO_3$ solutions, in addition to 0.1 and 0.2 M NaOH solutions. Sufficient buffering media was added to the water in order to achieve the desired pH. The amount of hydrogen peroxide (introduced as 50% hydrogen peroxide) and tri-acetin used in the tests is summarized in Table VIII. The reactants were introduced to the solution in one of three ways: simultaneously (referred to in Table VIII as "double"), sequentially (triacetin followed shortly by hydrogen peroxide), or by mixing the hydrogen peroxide and triacetin together and adding them in a single charge (referred to in Table VIII as "mixed"). All testing was performed at ambient temperature as the one-liter beaker was stirred with a magnetic stir bar. Using the ceric sulfate-iodometric titration method, the percent of PAA generated and the percent of hydrogen peroxide remaining were measured five minutes after introduction of the reactants to the buffer. The percent of the triacetin acetyl donor converted to PAA was calculated, assuming all three acetyl groups were available for perhydrolysis.

TABLE VIII

| Test # | Moles Hydrogen Peroxide/ Mole Triacetin | Type of Addition (Double, Sequential or Mixed) | pH of Buffer | Hydrogen Peroxide Used (Wt., g) | Triacetin Used (Wt., g) | % PAA Generated | % Hydrogen Peroxide Remaining | % Triacetin Converted to PAA |
|---|---|---|---|---|---|---|---|---|
| 1 | 4.99 | Double | 10.50 | 8.60 | 5.53 | 0.170 | 0.329 | 29.6% |
| 2 | 5.47 | Double | 10.50 | 8.60 | 5.04 | 0.178 | 0.333 | 33.9% |
| 3 | 5.45 | Double | 10.80 | 8.61 | 5.07 | 0.192 | 0.329 | 36.4% |
| 4 | 5.68 | Double | 11.00 | 8.87 | 5.01 | 0.201 | 0.322 | 38.6% |
| 5 | 5.72 | Double | 11.00 | 9.13 | 5.12 | 0.068 | 0.416 | 12.8% |
| 6 | 5.49 | Double | 12.42 | 8.60 | 5.02 | 0.169 | 0.306 | 32.4% |
| 7 | 5.59 | Double | 12.91 | 8.60 | 4.93 | 0.320 | 0.265 | 62.4% |
| 8 | 5.53 | Double | 12.80 | 8.69 | 5.04 | 0.335 | 0.273 | 63.9% |
| 9 | 25.0 | Double | 12.65 | 9.03 | 1.16 | 0.104 | 0.413 | 85.9% |
| 10 | 5.26 | Double | 12.60 | 8.70 | 5.30 | 0.298 | 0.247 | 54.1% |
| 11 | 5.52 | Sequential | 12.83 | 8.68 | 5.04 | 0.276 | 0.248 | 52.4% |
| 12 | 5.47 | Sequential | 12.81 | 17.11 | 10.03 | 0.120 | 0.371 | 11.4% |
| 13 | 28.8 | Mixed | 11.12 | 8.74 | 0.973 | 0.039 | 0.398 | 38.9% |
| 14 | 28.8 | Mixed | 11.99 | 8.75 | 0.974 | 0.038 | 0.374 | 37.9% |
| 15 | 28.8 | Mixed | 13.02 | 8.69 | 0.967 | 0.055 | 0.367 | 55.2% |
| 16 | 28.8 | Mixed | 7.91 | 8.70 | 0.968 | 0.024 | 0.435 | 23.7% |
| 17 | 28.8 | Mixed | 11.22 | 8.76 | 0.975 | 0.029 | 0.309 | 28.4% |
| 18 | 28.8 | Mixed | 12.07 | 8.68 | 0.966 | 0.028 | 0.311 | 27.7% |
| 19 | 28.8 | Mixed | 13.22 | 8.72 | 0.971 | 0.026 | 0.321 | 25.6% |
| 19 dup | 25.2 | Mixed | 12.97 | 8.77 | 1.12 | 0.031 | 0.249 | 26.5% |
| 20 | 25.2 | Mixed | 12.98 | 9.08 | 1.16 | 0.066 | 0.393 | 54.5% |
| 20 dup | 25.2 | Mixed | 13.00 | 9.10 | 1.16 | 0.074 | 0.409 | 61.0% |
| 21 | 25.2 | Mixed | 13.02 | 9.10 | 1.16 | 0.02 | 0.261 | 16.5% |
| 21 dup | 25.2 | Mixed | 12.99 | 9.12 | 1.16 | 0.017 | 0.376 | 14.0% |
| 22 | 16.0 | Mixed | 12.99 | 5.80 | 1.16 | 0.070 | 0.246 | 57.7% |
| 23 | 16.0 | Mixed | 13.05 | 5.79 | 1.16 | 0.013 | 0.189 | 10.7% |
| 24 | 16.0 | Mixed | 12.55 | 5.78 | 1.16 | 0.031 | 0.234 | 25.6% |
| 25 | 16.0 | Mixed | 12.49 | 5.80 | 1.16 | 0.013 | 0.144 | 10.7% |
| 26 | 16.0 | Mixed | 12.01 | 5.85 | 1.17 | 0.016 | 0.259 | 13.1% |
| 27 | 16.0 | Mixed | 12.05 | 5.82 | 1.16 | 0.011 | 0.080 | 9.0% |
| 28 | 16.0 | Mixed | 10.50 | 0.601 | 0.120 | 0.00077 | 0.028 | 6.1% |
| 29 | 16.0 | Mixed | 10.97 | 0.595 | 0.119 | 0.00023 | 0.021 | 1.8% |
| 30 | 16.0 | Mixed | 10.50 | 0.614 | 0.123 | 0.00012 | 0.019 | 0.9% |
| 32 | 16.0 | Mixed | 10.97 | 0.595 | 0.119 | 0.00035 | 0.018 | 2.8% |

Table VIII shows that the amount of PAA generated was independent of the method of introducing the triacetin and hydrogen peroxide to the buffer solutions. It can be seen that the pH of the buffer had a significant effect on the percent of the triacetin that was converted into PAA. Only when the pH was above 12 was a meaningful percent of the triacetin converted into PAA.

EXAMPLE 9

A mixture of triacetin and hydrogen peroxide was prepared by blending 50% hydrogen peroxide (63.4%) and triacetin (36.6%). Thus, the mole ratio of hydrogen peroxide:triacetin was 5.57:1. The mixture (13.68 g) was added to soft water such that the final solution contained 5 g/L of triacetin and had a pH of 4.1. Then, in successive experiments, sufficient 50% NaOH was added to the beaker so that the mole ratio of NaOH:triacetin was varied from 3:1 (obtained by introducing 5.49 g of 50% NaOH) to 8:1 (obtained by introducing 14.68 g of 50% NaOH). Using the ceric sulfate-iodometric titration method, the percent of PAA generated and the percent of hydrogen peroxide remaining were measured over the next 20 minutes. The method was performed in duplicate for each sample point. The averages of the results for the 6:1 mole ratio of NaOH:triacetin are shown in Table IX.

TABLE IX

| Time (min) | % PAA Generated | % Hydrogen Peroxide Remaining | % Triacetin Converted to PAA (3 acetyls) |
|---|---|---|---|
| 0 | 0.015 | 0.437 | 2.9 |
| 1 | 0.275 | 0.298 | 53.1 |
| 3 | 0.312 | 0.274 | 60.2 |
| 5 | 0.326 | 0.258 | 62.9 |
| 11 | 0.302 | 0.233 | 58.3 |
| 21 | 0.246 | 0.199 | 47.5 |

It can be seen that even before the introduction of 50% NaOH, some PAA was present in solution as a result of being generated in the diluted mixture of the two components. Upon addition of the NaOH, PAA was immediately generated, with the maximum amount of 0.326% occurring at five minutes, corresponding to a yield of 62.9% assuming all three acetyl groups of triacetin were available for perhydrolysis.

This exercise was repeated for mole ratios of NaOH: triacetin ranging from 3:1 to 8:1. Table X summarizes the next set of data and shows the maximum percent of PAA generated, the time after the addition of NaOH that it took to reach the maximum percent of PAA generated, the pH after the addition of the NaOH, the percent of hydrogen peroxide remaining at the time of the maximum percent of PAA, and the calculated percent of triacetin converted to PAA assuming that all three acetyl groups were available for perhydrolysis.

TABLE X

| Mole ratio NaOH:triacetin | Time at Max. PAA (min) | Max % PAA Generated | % Hydrogen Peroxide Remaining | % Triacetin Converted to PAA (3 acetyls) | pH |
|---|---|---|---|---|---|
| 3:1 | 3 | 0.229 | 0.291 | 43.8 | 11.2 |
| 4:1 | 6 | 0.285 | 0.251 | 54.8 | 11.3 |
| 6:1 | 5 | 0.326 | 0.258 | 62.9 | 11.6 |
| 8:1 | 3 | 0.335 | 0.271 | 64.7 | 12.2 |

It can be seen that the amount of PAA generated, and hence the conversion of triacetin into PAA, increased with the increasing mole ratio of NaOH:triacetin. For all four mole ratios employed, the maximum amount of PAA was generated between three and six minutes. The optimum mole ratio of NaOH:triacetin was 6:1 as it resulted in an efficient utilization of triacetin converted into PAA, and because the pH of the resulting reaction medium would have less impact on the pH of the receiving water than the higher pH of the reaction medium resulting from the 8:1 mole ratio.

EXAMPLE 10

A series of experiments was then performed in which the mole ratio of NaOH:triacetin was fixed at 8:1 and the mole ratio of hydrogen peroxide:triacetin was varied from 2:1 to 8:1. Triacetin (5 g) was added to about 965 mL of softened water along with 50.7% hydrogen peroxide in successive tests (3.06 g for the 2:1 mole ratio; 6.19 g for the 4:1 mole ratio; 9.23 g for the 6:1 mole ratio; and 12.32 g for the 8:1 mole ratio) to yield a solution with a pH of about 4.8-5.5. The volume of the mixture was adjusted to 990 mL with softened water. With mixing, 50% NaOH (14.67 g) was introduced. Using the ceric sulfate-iodometric titration method, the percent of PAA generated and the percent of hydrogen peroxide remaining were measured over the next 20 minutes. The method was performed in duplicate for each sample point. The averages of the results for the kinetic run employing the mole ratio of 8:6:1 NaOH:hydrogen peroxide:triacetin are shown in Table XI.

TABLE XI

| Time (min) | % PAA Generated | % Hydrogen Peroxide Remaining | % Triacetin Converted to PAA (3 acetyls) |
|---|---|---|---|
| 1 | 0.331 | 0.317 | 63.8 |
| 3 | 0.330 | 0.303 | 63.6 |
| 5 | 0.319 | 0.303 | 61.5 |
| 10 | 0.300 | 0.295 | 57.8 |
| 20 | 0.256 | 0.274 | 49.3 |

Upon addition of the NaOH, PAA was immediately generated, with the maximum amount of 0.331% occurring after just one minute, corresponding to a calculated conversion of triacetin into PAA of 63.8%, assuming that all three acetyl groups of triacetin were available for perhydrolysis.

This exercise was repeated for mole ratios of hydrogen peroxide:triacetin ranging from 2:1 to 6:1. Table XII summarizes the data and shows the maximum percent of PAA generated, the time after the addition of NaOH that it took to reach the maximum percent of PAA generated, the pH after the addition of the NaOH, the percent of hydrogen peroxide remaining at the time of the maximum percent of PAA, and the calculated percent of triacetin converted to PAA assuming that all three acetyl groups were available for perhydrolysis.

TABLE XII

| Mole Ratio Hydrogen Peroxide:Triacetin | Time at Max. PAA (min) | Max % PAA Generated | % Hydrogen Peroxide Remaining | % Triacetin Converted to PAA (3 acetyls) | pH |
|---|---|---|---|---|---|
| 2:1 | 3 | 0.214 | 0.079 | 40.9 | 12.6 |
| 4:1 | 1 | 0.272 | 0.195 | 51.9 | 12.4 |

TABLE XII-continued

| Mole Ratio Hydrogen Peroxide:Triacetin | Time at Max. PAA (min) | Max % PAA Generated | % Hydrogen Peroxide Remaining | % Triacetin Converted to PAA (3 acetyls) | pH |
|---|---|---|---|---|---|
| 6:1 | 1 | 0.331 | 0.317 | 63.8 | 12.3 |
| 8:1 | 3 | 0.374 | 0.445 | 72.0 | 11.9 |

It can be seen that the amount of PAA generated, and hence the conversion of triacetin into PAA, increased with the increasing mole ratio of hydrogen peroxide:triacetin. For all four mole ratios employed, the maximum amount of PAA was generated between one and three minutes. The optimum mole ratio of hydrogen peroxide:triacetin was 8:1 as it resulted in the most efficient utilization of triacetin converted into PAA.

EXAMPLE 11

A further series of experiments was performed in which the mole ratio of hydrogen peroxide to triacetin was fixed at 4:1 and the mole ratio of NaOH to triacetin was varied from 3:1 to 8:1. Triacetin (5 g) was added to about 975 mL of softened water along with 50.7% hydrogen peroxide (6.18 g) to yield a solution with a pH of 4.8 to 5.3. With mixing, 50% NaOH was introduced in successive tests (5.51 g for the 3:1 mole ratio; 7.30 g for the 4:1 mole ratio; 11.03 g for the 6:1 mole ratio; and 14.67 g for the 8:1 mole ratio). The volume of the mixture was adjusted to 1000 mL with softened water. Using the ceric sulfate-iodometric titration method, the percent of PAA generated and the percent of hydrogen peroxide remaining were measured over the next 20 minutes. The method was performed in duplicate for each sample point. The averages of the results for the kinetic run employing the mole ratio of NaOH:hydrogen peroxide:triacetin of 4:4:1 are shown in Table XIII.

TABLE XIII

| Time (min) | % PAA Generated | % Hydrogen Peroxide Remaining | % Triacetin Converted to PAA (3 acetyls) |
|---|---|---|---|
| 1 | 0.247 | 0.207 | 47.3 |
| 3 | 0.280 | 0.178 | 53.6 |
| 5 | 0.292 | 0.167 | 55.9 |
| 10 | 0.267 | 0.142 | 51.1 |
| 20 | 0.229 | 0.111 | 43.8 |

Upon addition of the NaOH, PAA was immediately generated, with the maximum amount of 0.292% occurring after five minutes, corresponding, to a calculated conversion of 55.9% triacetin into PAA assuming that all three acetyl groups of triacetin were available for perhydrolysis.

This exercise was repeated for mole ratios of NaOH:triacetin ranging from 3:1 to 8:1. Table XIV summarizes the data and records the maximum percent of PAA generated, the time after the addition of NaOH that it took to reach the maximum percent of PAA generated, the pH after the addition of the NaOH, the percent of hydrogen peroxide remaining at the time of the maximum percent of PAA, and the calculated percent of triacetin converted to PAA assuming that all three acetyl groups were available for perhydrolysis.

TABLE XIV

| Mole Ratio NaOH:triacetin | Time at Max. PAA (min) | Max % PAA Generated | % Hydrogen Peroxide Remaining | % Triacetin Converted to PAA (3 acetyls) | pH |
|---|---|---|---|---|---|
| 3:1 | 3 | 0.246 | 0.202 | 47.2 | 11.3 |
| 4:1 | 5 | 0.292 | 0.167 | 55.9 | 11.6 |
| 6:1 | 3 | 0.290 | 0.181 | 55.6 | 12.2 |
| 8:1 | 3 | 0.272 | 0.195 | 51.9 | 12.4 |

It can be seen that the amount of PAA generated maximized when the mole ratio of NaOH:hydrogen peroxide:triacetin was 4:4:1. The optimum mole ratio of NaOH:hydrogen peroxide:triacetin was 4:4:1 as it resulted in an efficient utilization of triacetin converted into PAA, and because the pH of the resulting reaction medium would have less impact on the pH of the receiving water than the higher pH of the reaction medium resulting from the 4:6:1 mole ratio of NaOH:hydrogen peroxide:triacetin. For all four mole ratios employed, the maximum amount of PAA was generated between three and five minutes.

EXAMPLE 12

In the first test, a mixture of triacetin and hydrogen peroxide was prepared by blending 50% hydrogen peroxide (54.24%) and triacetin (45.76%). Thus, the mole ratio of hydrogen peroxide:triacetin was 3.65:1. The mixture (51.22 g) was dissolved in soft water (911.9 g) in a one-liter beaker to yield a solution with a pH of 6.47. Then, 50% NaOH (36.47 g) was introduced with stirring. Thus, the mole ratio of the combined mixture of NaOH:hydrogen peroxide:triacetin was 4.2:3.8:1. The pH of the resulting solution initially measured 12.1. Using the ceric sulfate-iodometric titration method, the PAA generated and the hydrogen peroxide remaining were measured over the next 10 minutes. It was noticed that the sample temperature rose immediately upon addition of the 50% NaOH.

In the second test, the first test was repeated, except that the water was chilled soft water.

In the third test, the first test was repeated using three times the original amount of hydrogen peroxide:triacetin mixture and three times the original amount of 50% NaOH. The mole ratio of the combined mixture of NaOH:hydrogen peroxide:triacetin remained the same as before, at 4.2:3.8:1. The hydrogen peroxide and triacetin mixture (153.96 g) was introduced to chilled soft water (735.6 g) in a one-liter beaker to yield a solution with an initial pH of 5.14. Then, 50% NaOH (111.21 g) was introduced. Using the ceric sulfate-iodometric titration method, the PAA generated and the hydrogen peroxide remaining were measured over the next 10 minutes.

In the fourth test, the first test was repeated using four times the original amount of hydrogen peroxide:triacetin mixture and four times the original amount of 50% NaOH. The mole ratio of the combined mixture of NaOH:hydrogen peroxide:triacetin remained the same as before, at 4.2:3.8:1. The hydrogen peroxide and triacetin mixture (204.7 g) was introduced to chilled soft water (647.5 g) in a one-liter beaker to yield a solution with an initial pH of 6.32. Then, 50% NaOH (155.4 g) was introduced. Using the ceric sulfate-iodometric titration method, the PAA generated and the hydrogen peroxide remaining were measured over the next 10 minutes.

Table XV summarizes the results obtained for the four tests and shows the initial and final solution temperatures, the pH of the solution after the addition of the 50% NaOH, the maximum percent of PAA generated, the time of maximum PAA generation, and the percent of hydrogen peroxide remaining.

TABLE XV

| Test # | Initial Temp. (° F.) | Final Temp. (° F.) | Final pH | Max. % PAA Generated (time, min) | % Hydrogen Peroxide Remaining |
|---|---|---|---|---|---|
| 1 | NM | NM | 12.14 | 1.71 (1) | 0.58 |
| 2 | 38 | 50 | 12.67 | 2.1 (4) | 0.43 |
| 3 | 44 | 88 | 12.77 | 6.3 (1) | 1.18 |
| 4 | 34 | 92 | 13.17 | 7.2 (1) | 1.88 |

NM = not measured

Table XVI shows the percent of hydrogen peroxide converted overall, the percent of hydrogen peroxide converted to PAA, and the percent of triacetin converted to PAA (assuming that all three acetyl groups on triacetin are available for conversion to PAA) for each of the tests in Table XV.

TABLE XVI

| Test # | % Hydrogen Peroxide Converted Overall | % Hydrogen Peroxide Converted to PAA (at maximum conversion time) | % Triacetin Converted to PAA (3 acetyls) |
|---|---|---|---|
| 1 | 67.8 | 88.1 | 69.7 |
| 2 | 68.8 | 94.4 | 85.8 |
| 3 | 71.6 | 94.3 | 85.7 |
| 4 | 66.1 | 88.1 | 73.8 |

The data in Tables XV and XVI indicate that far higher amounts of PAA are possible if the 50% sodium hydroxide solution is the last component of the mixture to be introduced. Further, up to 7.1% PAA was generated, although this solution got hot despite chilling the source water. Generation of the 6.3% PAA solution was very efficient because it represented a high 85.7% utilization of triacetin converted into PAA. There was clearly a linear relationship between Test 2, which generated 2.1% PAA, and Test 3, which utilized three times more of the reactants and generated 6.3% PAA. The data in Table XV indicate that the time of maximum conversion of triacetin was between one and four minutes. Thereafter, the amount of PAA in solution is reduced because it undergoes high pH degradation slowly over the following 10 minutes.

EXAMPLE 13

FIG. 1 is a schematic representation of an example of a system 10 that was used to perform an embodiment of one of the methods described above to prepare a non-equilibrium solution of PAA on a site having a point-of-use. Triacetin was used as the acetyl precursor and 50% sodium hydroxide was used as the aqueous source of an alkali metal hydroxide.

A container 120 of a hydrogen peroxide-acetyl precursor solution, which was a hydrogen peroxide-triacetin solution, and a container 140 of 50% sodium hydroxide were each equipped with chemical delivery diaphragm pumps 115 and 135, respectively. Inlet water 90, which was softened, was provided from a water source on the site having the point-of-use. Inlet water 90 was directed through a pressure regulator 100 and flow meter 105, then into a section of pipe where the hydrogen peroxide-triacetin solution was introduced through injection quill 110. Mixing was accomplished using static mixer 125. Then, the sodium hydroxide solution was added through injection quill 130 to form a reaction medium.

The hydrogen peroxide-triacetin solution and the sodium hydroxide solution may be added in a sequential manner as described, where the hydrogen peroxide-triacetin solution was added first, or they may be added to the water simultaneously through a "T" fitting placed before static mixer 125. If a T fitting is used, the hydrogen peroxide-triacetin solution and the 50% sodium hydroxide solution are introduced to opposite ends of the T fitting and the mixture is injected into the pipe of water. In other embodiments, the hydrogen peroxide and triacetin may be added separately, or sequentially, with either one first, or simultaneously, with the sodium hydroxide added either simultaneously with, or after, the hydrogen peroxide and triacetin.

The reaction medium was introduced to a residence chamber 145 which provided reaction time and contained a packing material to promote mixing. Residence chamber 145 was designed to be of a volume such that at a total flow rate of one gallon per minute, by the time the reaction medium reached sampling port 160, 30 seconds had elapsed since the sodium hydroxide solution had been added. A pH probe 155 monitored the pH of the mixture.

A controller 150 was interfaced to the flow meter 105 of the inlet water 90, and also to the chemical delivery diaphragm pumps 115 and 135. The controller 150 monitored the rate of the inlet water 90 and governed the rate at which the hydrogen peroxide-triacetin solution and the NaOH solution were introduced. If the flow of inlet water 90 decreased because of lower PAA requirements at the point-of-use 195, the rates at which the hydrogen peroxide-triacetin solution and the NaOH solution were pumped decreased accordingly. If the flow of inlet water 90 increased because of higher PAA requirements at the point-of-use 195, the rates at which the hydrogen peroxide-triacetin solution and the NaOH solution were pumped increased accordingly. If the flow of inlet water 90 stopped, pumps 115 and 135 stopped. Thus, the generation of PAA was both continuous and intermittent, and was tailored to the PAA requirements at the point-of-use.

The rate of the reaction between the hydrogen peroxide and the triacetin to form PAA is dependent upon the temperature of inlet water 90. If the temperature of inlet water 90 is high (for example, about 70° F.), the maximum conversion of triacetin into PAA may occur after 30 seconds, in which case the entire reaction medium was directed to the point-of-use 195. However, if the temperature of inlet water 90 is low (for example, about 32° F.), longer reaction times may be necessary to maximize the conversion of triacetin into PAA. Then, the reaction medium was directed through one or more residence chambers 165, 175, and 185 which also contained a packing material to promote turbulence and cause thorough mixing. Residence chambers 165, 175, and 185 were designed to be of volumes such that at a total flow rate of one gallon per minute, the reaction medium reached sampling port 170 in one minute, sampling port 180 in two minutes, and sampling port 190 in five minutes, to permit sampling at different time intervals.

Thus, depending on the temperature of the inlet water, the time to achieve the maximum conversion of hydrogen peroxide and triacetin into PAA was determined by sampling and analyzing the solution at sample ports 160, 170, 180, and 190. The entire flow was then directed from the sampling port with the highest amount of PAA to the point-ofuse 195. In practice, the PAA generated from the reaction of hydrogen peroxide with triacetin is typically diluted at the point-of-use 195.

Point-of-use 195 may be recirculating cooling water; municipal wastewater; poultry chill tank water; water used to sanitize meat, poultry, or seafood products; fruit and vegetable rinse water; or water used to clean and sanitize equipment used in the dairy, food, or beverage processing industries.

EXAMPLE 14

Referring again to FIG. 1, a 55-gallon drum container 120 of a hydrogen peroxide-triacetin solution was prepared by mixing triacetin (251.5 lbs) with 50% hydrogen peroxide (298.4 lbs). The resulting 550 lbs of hydrogen peroxide-triacetin solution had a specific gravity of 1.19 g/mL (10 lbs/gal) and contained 54.3% hydrogen peroxide and 45.7% triacetin. Thus, the mole ratio of hydrogen peroxide:triacetin was 3.8:1. The apparatus depicted in FIG. 1 was used to continuously and intermittently prepare an approximately 1% PAA solution.

Softened local city water was directed through pressure regulator 100 at a flow rate of one gallon per minute as measured by flow meter 105. The container 120 of hydrogen peroxide-triacetin solution was equipped with a draw down tube so that the flow rate of the mixture could be measured. Diaphragm pump 115 injected the hydrogen peroxide-triacetin solution through injection quill 110. The hydrogen peroxide-triacetin solution was then mixed with the softened water using static mixer 125. A container 140 of 50% NaOH was also equipped with a draw down tube to measure the flow pumped by diaphragm pump 135 into injection quill 130.

The percent of PAA generated was measured by quenching samples drawn through the sampling ports in mineral acid, followed by use of the ceric sulfate-iodometric titration method. Table XVII summarizes the results of several trials where it was sought to maximize the conversion of triacetin into PAA and minimize the amount of 50% NaOH used.

TABLE XVII

| Trial # | Sample Port | % PAA Generated | % Triacetin Converted to PAA | Hydrogen Peroxide-Triacetin Mix Flow Rate (mL/min) | NaOH Flow Rate (mL/min) | pH (PAA solution) |
| --- | --- | --- | --- | --- | --- | --- |
| 1 | 160 | 1.083 | 65.42 | 115.73 | 112.11 | ~13 |
| 2 | 170 | 1.073 | 64.82 | 115.73 | 112.11 | 13.19 |
| 3 | 160 | 0.955 | 57.32 | 116.79 | 122.12 | 13.37 |
| 4 | 160 | 1.058 | 63.39 | 116.79 | 114.93 | 13.11 |
| 5 | 160 | 1.061 | 63.3 | 116.79 | 98.1 | 12.9 |
| 6 | 160 | 1.102 | 68.96 | 110.82 | 85.01 | 12.91 |
| 7 | 170 | 1.055 | 55.59 | 132.64 | 99.77 | 12.95 |
| 8 | 160 | 0.978 | 59.91 | 115.5 | 74 | 12.62 |
| 9 | 180 | 0.936 | 56.7 | 114.25 | 78 | 12.64 |

It can be seen that the amount of PAA generated, and hence the conversion of triacetin into PAA, increased with the increasing flow rate of NaOH. For this mole ratio of hydrogen peroxide:triacetin of 3.8:1, the maximum amount of PAA was generated between 30 seconds (sample port 160) and two minutes (sample port 180) from the time the NaOH was added at injection quill 130. The flow rate of 74-78 mL/min of 50% NaOH was the optimum flow rate as it resulted in an efficient utilization of triacetin converted into PAA, consumed only a moderate amount of 50% NaOH, and had a lower pH that would have less impact on the pH of the receiving water.

EXAMPLE 15

*E. coli* O157:H7 bacteria (ATCC 35150) was cultured in nutrient broth (Sigma, St. Louis, Mo.) by incubation for two days at 35° C. The bacteria were separated from the nutrient broth by centrifugation and carefully resuspended in two liters of sterile phosphate buffer, which was then split into two one-liter test solutions.

*Salmonella typhimurium* bacteria (ATCC 14028) was cultured in nutrient broth (Sigma, St. Louis, Mo.) by incubation for two days at 35° C. The bacteria were separated from the nutrient broth by centrifugation and carefully resuspended in two liters of sterile phosphate buffer, which was then split into two one-liter test solutions.

The amounts of *E. coli* O157:H7 and *Salmonella typhimurium* bacteria were measured by serial dilution and plating on 3M *E. coli* plates and 3M Enterobacteriaceae Petrifilms, respectively.

A 1000 ppm stock of PAA was made by weighing 0.6386 g of Perasan MP-2 (5.83% hydrogen peroxide and 15.66% PAA) and adding water up to 100 g. Perasan MP-2 is an equilibrium product of PAA (Enviro Tech Chemical Services, Inc., Modesto, Calif.). Side-by-side, one of the *E. coli* and one of the *Salmonella* test solutions were treated with a nominal dose of 1.0 ppm PAA by adding one mL of the 1000 ppm PAA stock solution to each sample. After one minute, approximately 100 mL of each test solution was removed, and sodium thiosulfate (0.5 g) was added to neutralize the PAA and hydrogen peroxide oxidants. After five minutes, sodium thiosulfate (0.5 g) was added to the remaining test solution to neutralize the PAA and hydrogen peroxide in the rest of the test solutions. The amount of viable *E. coli* 0157:117 and *Salmonella typhimurium* bacteria remaining in the test solutions at the one-minute and five-minute contact times were measured by serial dilution and plating on 3M *E. coli* Petrifilms and 3M Enterobacteriaceae Petrifilms, respectively.

A 1% solution of PAA was prepared by combining 30.90 g of a mixture of 50% hydrogen peroxide and triacetin (54.22% hydrogen peroxide and 45.78% triacetin) with 929.4 g of water, and then adding 50% NaOH (40.53 g). The PAA solution had a pH of 12.79. The mole ratio of this mixture was 3.8:7.8:1 NaOH:hydrogen peroxide:triacetin. One minute after preparation, the second one-liter *E. coli* solution and the second one-liter *Salmonella* solution were treated with a nominal dose of 1.0 ppm PAA by adding 0.10 g of the 1% PAA solution to each sample. The test solution contact times, neutralization, and plating procedures were replicated for those that employed PAA from Perasan MP-2.

All 3M *E. coli* Pertrifilms and 3M Enterobacteriaceae Petrifilms were incubated at 35° C. for 24 hours. After incubation, the plates were enumerated.

Table XVIII shows the microbiological results of the *E. coli* 0157:117 test solutions before treatment with PAA, one minute after the samples were dosed with a nominal 1.0 ppm PAA, and five minutes after being dosed with PAA. The *E. coli* test solution started with $\log_{10}$ 6.99 CFU/mL prior to being treated with 1.0 ppm of PAA from Perasan MP-2 or with 1 ppm of PAA from the 1% PAA solution.

The *E. coli* test solution treated with 1.0 ppm PAA from Perasan MP-2 contained a $\log_{10}$ 6.74 CFU/mL after one minute. This corresponds to 43.48% reduction. After five minutes, $\log_{10}$ 6.34 CFU/mL remained (77.50% reduction). The *E. coli* solution treated with a nominal 1.0 ppm PAA from the 1% PAA solution contained a $\log_{10}$ 6.78 CFU/mL after one minute and 6.63 CFU/mL after five minutes, respectively, corresponding to 38.02% and 56.12% reductions, respectively.

TABLE XVIII

*E. coli* O157:H7

| Description | $\log_{10}$ CFU/mL remaining | $\log_{10}$ reduction | % reduction |
|---|---|---|---|
| Control | 6.99 | N/A | N/A |
| Perasan MP-2 (1 min) | 6.74 | 0.25 | 43.48 |
| Perasan MP-2 (5 min) | 6.34 | 0.65 | 77.50 |
| 1% PAA solution (1 min) | 6.78 | 0.21 | 38.02 |
| 1% PAA solution (5 min) | 6.63 | 0.36 | 56.12 |

Table XIX shows the microbiological results of the *Salmonella typhimurium* test solutions before treatment with PAA, one minute after the samples were dosed with a nominal 1.0 ppm PAA, and five minutes after being dosed with PAA. The *Salmonella* test solution started with $\log_{10}$ 7.07 CFU/mL prior to being treated with PAA from Perasan MP-2 or with the 1% PAA solution.

The *Salmonella* solution treated with a nominal 1.0 ppm PAA from Perasan MP-2 contained a $\log_{10}$ 1.76 CFU/mL after one minute and 0.70 CFU/mL after five minutes, corresponding to >99.999% reduction at both contact times. The *Salmonella* test solution treated with 1.0 ppm PAA from the 1% PAA solution contained a $\log_{10}$ 6.69 CFU/mL after one minute. This corresponds to 58.31% reduction. After five minutes, $\log_{10}$ 4.95 CFU/mL remained (99.24% reduction).

TABLE XIX

*Salmonella typhimurium*

| Description | $\log_{10}$ CFU/ml remaining | $\log_{10}$ reduction | % reduction |
|---|---|---|---|
| Control | 7.07 | N/A | N/A |
| Perasan MP-2 (1 min) | 1.76 | 5.31 | 99.9995 |
| Perasan MP-2 (5 min) | 0.70 | 6.37 | >99.9999 |
| 1% PAA solution (1 min) | 6.69 | 0.38 | 58.31 |
| 1% PAA solution (5 min) | 4.95 | 2.12 | 99.24 |

The data in tables XVIII and XIX demonstrate that the 1% PAA had antimicrobial efficacy. After five minutes, the efficacy of this PAA was 99.24%, about equal to that of the Perasan MP-2, which was >99.9999%. The difference in efficacy at one minute was likely not of statistical significance, given that the comparison was only at the one-minute interval.

5. Methods of Using Peracetic Acid to Treat Poultry During Processing for Increasing the Weight of the Poultry A. Methods Utilizing Non-Equilibrium Peracetic Acid In an embodiment, a method of treating at least a portion of a poultry carcass for increasing the weight of the poultry utilizes non-equilibrium PAA. The method comprises:

(a) Combining water and an antimicrobial amount of a non-equilibrium solution of peracetic acid for forming peracetic acid-containing water having a ph of about 6 to about 9.

The non-equilibrium solution of PAA may be made by mixing hydrogen peroxide and an acetyl-precursor, such as triacetin, according to the methods set forth in section 4 above. A preferable non-equilibrium solution of PAA comprises a mixture of peracetic acid, hydrogen peroxide, triacetin, and an aqueous source of an alkali metal or an earth alkali metal hydroxide. Most preferably, the aqueous source of the alkali metal or earth alkali metal hydroxide is sodium hydroxide. In a preferable non-equilibrium solution of PAA, the peracetic acid is about 1% to about 7.1%, and most preferably 2%.

The water and the PAA solution are combined to form PAA-containing water. An antimicrobial amount of PAA is used. The amount is sufficient to prevent cross-contamination of bacteria between the poultry carcasses and to eradicate or reduce any pathogenic or spoilage microorganisms still resident on the carcasses. The amount of PAA that is used depends on the microbiological condition of the carcasses, but is about 0.54 ppm to about 99 ppm. Any suitable method of analyzing the amount of PAA in the water can be used. These include test strips which change color depending on the amount of PAA present, a test kit based on the ceric IV sulfate-sodium thiosulfate titration reaction that employs a ferroin indicator, a modified DPD method (U.S. Pat. No. 7,651,124), and the use of an amperometric measuring device.

The pH of the PAA-containing water that is formed is about 6 to about 9.

(b) Bringing at least a portion of a poultry carcass into contact with the peracetic acid-containing water for increasing the weight of at least the portion of the poultry carcass from a first weight prior to contact with the peracetic acid-containing water to a second weight greater than the first weight after contact with the peracetic acid-containing water.

A portion of a poultry carcass is brought into contact with the PAA-containing water. This may be accomplished by placing the carcass in a reservoir with the peracetic acid-containing water, or by other methods, such as by passing the carcass through the peracetic acid-containing water. Before it is brought into contact with the PAA-containing water, the poultry carcass has a specific weight, referred to as a first weight. After contact with the PAA-containing water, the poultry carcass has a specific weight, referred to as a second weight, which is greater than the first weight.

In another embodiment, a method of treating at least a portion of a poultry carcass in a reservoir during processing for increasing the weight of the poultry utilizes non-equilibrium PAA. The method comprises:

(a) Providing, in a reservoir, a peracetic acid-containing water having a pH of about 6 to about 9, wherein the peracetic acid-containing water comprises water and an antimicrobial amount of a non-equilibrium solution of peracetic acid, and wherein the peracetic acid-containing water has a temperature.

The non-equilibrium solution of PAA may be made by mixing hydrogen peroxide and an acetyl-precursor, such as triacetin, according to the methods set forth in section 4 above. A preferable non-equilibrium solution of PAA comprises a mixture of peracetic acid, hydrogen peroxide, triacetin, and an aqueous source of an alkali metal or an earth alkali metal hydroxide. Most preferably, the aqueous source of the alkali metal or earth alkali metal hydroxide is sodium hydroxide. In a preferable non-equilibrium solution of PAA, the peracetic acid is about 1% to about 7.1%, and most preferably 2%.

The PAA-containing water is provided in a reservoir. The reservoir may be any type of container suitable for cooling poultry during processing, such as a chill tank or other vessel. This may be accomplished in several ways. One way is to separately introduce the water and the non-equilibrium solution of PAA into the reservoir. The PAA solution may be added to the reservoir simultaneously with the water or it may be added after the reservoir is filled with the water. Any means of introducing a liquid product to water can be used, such as a diaphragm pump, peristaltic pump, or a vacuum eductor to introduce the PAA into the reservoir water. Another way is to combine the water and the non-equilibrium solution of PAA outside the reservoir to form PAA-containing water and then introduce the PAA-containing water into the reservoir.

The water is dosed with PAA in an amount that is antimicrobial. The amount is sufficient to prevent cross-contamination of bacteria between the birds and to eradicate or reduce any pathogenic or spoilage microorganisms still resident on the birds. The amount of PAA that is used depends on the microbiological condition of the birds, but is about 0.54 ppm to about 99 ppm. Any suitable method of analyzing the amount of PAA in the water can be used. These include test strips which change color depending on the amount of PAA present, a test kit based on the ceric IV sulfate-sodium thiosulfate titration reaction that employs a ferroin indicator, a modified DPD method (U.S. Pat. No. 7,651,124), and the use of an amperometric measuring device.

The pH of the PAA-containing water is about 6 to about 9.

The PAA-containing water is preferably recirculated. A pump is used to recirculate the water through the reservoir, then through an external refrigeration unit where it is chilled, and then back to the reservoir. To maximize the efficiency of cooling the carcasses, the flow of chilled water should be opposite to the direction of movement of the carcasses through the reservoir.

The PAA-containing water is chilled to a temperature that is lower than the temperature of the carcasses just before they are placed into the reservoir and is maintained at this temperature. A preferable temperature is about 33-34° F. This may be accomplished by chilling the PAA-containing water in an external refrigeration unit during recirculation, chilling the water before the PAA solution is added to the water, or other methods.

(b) Placing into the peracetic acid-containing water at least a portion of a poultry carcass having a first weight and having a first temperature greater than the temperature of the peracetic acid-containing water.

A poultry carcass is placed into the PAA-containing water in the reservoir. Before it is placed into the reservoir, the poultry carcass has a specific weight referred to as a first weight, and has a specific temperature referred to as a first temperature. The first temperature is greater than the temperature of the peracetic acid-containing water in the reservoir.

The carcasses may be rotated in the reservoir on an auger or may be turned or stirred by any other suitable method that will allow at least a portion of a carcass to come into contact with the PAA-containing water.

At any time after the poultry carcasses are placed into the PAA-containing water, up to about ½ gallon of the PAA-containing water may be removed or bled off from the reservoir for each poultry carcass that enters the reservoir in order to keep the level of contaminants, such as blood, fecal matter, and ingesta, in the PAA-containing water at an acceptable level. Additional water (make-up water) is introduced into the reservoir to maintain the volume of water in the reservoir, and additional non-equilibrium solution of PAA is introduced into the reservoir as needed to keep the amount of PAA at about 0.54 ppm to about 99 ppm to continue to provide sufficient antimicrobial efficacy. The make-up water and the PAA may be introduced separately into the reservoir or they may be combined outside the reservoir to form PAA-containing water which is then introduced into the reservoir. The amount of PAA that will need to be added and the frequency of addition depend on the number of carcasses in the reservoir and the microbial condition of the carcasses. Any suitable method of analyzing the amount of PAA in the water can be used, including the methods described in step (a) above. The bleeding off of the PAA-containing water may be repeated or may be performed continuously. The PAA-containing water that is bled off may be reused in any processing step that is upstream from (earlier than) the reservoir from which it is removed.

(c) Allowing the peracetic acid-containing water having the pH of about 6 to about 9 to increase the first weight of at least the portion of the poultry carcass to a second weight greater than the first weight to provide an increased weight of at least the portion of the poultry carcass and to lower the first temperature of at least the portion of the poultry carcass to a second temperature less than the first temperature for cooling at least the portion of the poultry carcass.

The poultry carcasses are left in the PAA-containing water in the reservoir until they are cooled to a second temperature, preferably about 33-34° F. The amount of time required for cooling depends on the number of carcasses in the reservoir, the size of the carcasses, and other factors. Typically, chickens are left in a chill tank for about 30-45 minutes, while turkeys are left longer, for up to about three hours. While the poultry carcasses are in the PAA-containing water in the reservoir, the weight of the poultry carcasses increases to a second weight which is greater than the first weight.

(d) Removing the at least the portion of the poultry carcass having the increased weight from the PAA-containing water.

The poultry carcasses are removed from the PAA-containing water. Each poultry carcass has an increased weight because the second weight, which is the weight of a carcass after removal from the PAA-containing water, is greater than the first weight, which is the weight of a carcass before being placed into the PAA-containing water.

Optionally, after the step of providing a PAA-containing water having a pH of about 6 to about 9, a step of determining the pH of the PAA-containing water and a subsequent step of altering the pH may be performed. The pH of the PAA-containing water is determined by any method, including the use of a glass electrode, indicator solutions, and pH test strips. If the pH is determined to be about 6 to about 9, then no pH-altering step is performed and the step of placing at least the portion of the poultry carcass into the PAA-containing water is performed next. If the pH is determined to be lower than about 6 or higher than about 9, then a subsequent pH-altering step is performed. If the pH is determined to be lower than about 6, then a source of alkali is added to the PAA-containing water to raise the pH of the PAA-containing water to about 6 to about 9. Any suitable source of alkali may be used. Examples include, but are not limited to, alkali metal or earth alkali metal carbonates, bicarbonates, oxides, and hydroxides. When solutions are preferred, sodium hydroxide or potassium hydroxide solutions are convenient to use, alone or in combination with each other. A preferred alkaline source is 50% NaOH solution. To prevent crystallization problems upon storage in cold climates, the 50% NaOH solution may be diluted with water and then used. If the pH is determined to be higher than about 9, then a source of acid is added to the PAA-containing water to lower the pH of the PAA-containing water to about 6 to about 9. Any suitable source of acid may be used. Inorganic acids are preferred because they are less expensive than organic acids and possess higher pH-lowering properties. Suitable inorganic acids include solutions of sulfuric acid, hydrochloric acid, phosphoric acid, nitric acid, and sodium hydrogen sulfate. Preferable inorganic acids are phosphoric acid and sodium hydrogen sulfate because they are FDA-approved for food contact purposes. Organic acids may be used, and include citric acid and lactic acid, which are FDA-approved. In the pH-altering step, it is most preferable to alter the pH to about 8.0 to about 9.0. After altering the pH, the step of placing at least a portion of a poultry carcass into the PAA-containing water is performed next.

B. Methods Utilizing Equilibrium Peracetic Acid

In an embodiment, a method of treating poultry for increasing the weight of the poultry utilizes equilibrium PAA. The method comprises:

(a) Combining water and an antimicrobial amount of an equilibrium solution of peracetic acid for forming peracetic acid-containing water.

The equilibrium solution of PAA preferably comprises a mixture of peracetic acid, hydrogen peroxide, acetic acid, and water. A suitable solution is a 15% PAA solution having a either a molar excess of hydrogen peroxide or a molar excess of acetic acid. One example is Perasan MP-2 (Enviro Tech Chemical Services, Inc., Modesto, Calif.).

The water and the PAA solution are combined to form PAA-containing water. An antimicrobial amount of PAA is used. The amount is sufficient to prevent cross-contamination of bacteria between the poultry carcasses and to eradicate or reduce any pathogenic or spoilage microorganisms still resident on the carcasses. The amount of PAA that is used depends on the microbiological condition of the carcasses, but is about 1 ppm to about 99 ppm. Any suitable method of analyzing the amount of PAA in the water can be used. These include test strips which change color depending on the amount of PAA present, a test kit based on the ceric IV sulfate-sodium thiosulfate titration reaction that employs a ferroin indicator, a modified DPD method (U.S. Pat. No. 7,651,124), and the use of an amperometric measuring device.

(b) Determining the pH of the peracetic acid-containing water, and, if the pH is determined to be lower than about 6 or higher than about 9, then altering the pH of the peracetic acid-containing water to a pH of about 6 to about 9.

The pH of the PAA-containing water is determined by any method, including the use of a glass electrode, indicator solutions, and pH test strips. If the pH is determined to be about 6 to about 9, then no pH-altering step is performed and the step of bringing at least a portion of a poultry carcass into contact with the PAA-containing water is performed next. If the pH is determined to be lower than about 6 or higher than about 9, then a subsequent pH-altering step is performed. If the pH is determined to be lower than about 6, then a source of alkali is added to the PAA-containing water to raise the pH of the PAA-containing water to about 6 to about 9. Any suitable source of alkali may be used. Examples include, but are not limited to, alkali metal or earth alkali metal carbonates, bicarbonates, oxides, and hydroxides. When solutions are preferred, sodium hydroxide or potassium hydroxide solutions are convenient to use, alone or in combination with each other. A preferred alkaline source is 50% NaOH solution. To prevent crystallization problems upon storage in cold climates, the 50% NaOH solution may be diluted with water and then used. If the pH is determined to be higher than about 9, then a source of acid is added to the PAA-containing water to lower the pH of the PAA-containing water to about 6 to about 9. Any suitable source of acid may be used. Inorganic acids are preferred because they are less expensive than organic acids and possess higher pH-lowering properties. Suitable inorganic acids include solutions of sulfuric acid, hydrochloric acid, phosphoric acid, nitric acid, and sodium hydrogen sulfate. Preferable inorganic acids are phosphoric acid and sodium hydrogen sulfate because they are FDA-approved for food contact purposes. Organic acids may be used, and include citric acid and lactic acid, which are FDA-approved. In the pH-altering step, it is most preferable to alter the pH to about 8.0 to about 9.0.

(c) Bringing at least a portion of a poultry carcass into contact with the PAA-containing water.

A poultry carcass is brought into contact with the PAA-containing water. This may be accomplished by placing the carcass in a reservoir with the peracetic acid-containing water, or by other methods, such as by passing the carcass through the peracetic acid-containing water.

(d) Determining the pH of the peracetic acid-containing water with at least the portion of the poultry carcass therein, and, if the pH is determined to be lower than about 6 or higher than about 9, then altering the pH of the peracetic acid-containing water to a pH of about 6 to about 9, for increasing the weight of at least the portion of the poultry carcass from a first weight prior to contact with the peracetic acid-containing water to a second weight greater than the first weight after contact with the peracetic acid-containing water.

The pH of the PAA-containing water is determined by any method, including the use of a glass electrode, indicator solutions, and pH test strips. If the pH is determined to be about 6 to about 9, then no pH-altering step is performed. If the pH is determined to be lower than about 6 or higher than about 9, then a subsequent pH-altering step is performed. If the pH is determined to be lower than about 6, then a source of alkali is added to the PAA-containing water to raise the pH of the PAA-containing water to about 6 to about 9. Any suitable source of alkali may be used. Examples include, but are not limited to, alkali metal or earth alkali metal carbonates, bicarbonates, oxides, and hydroxides. When solutions are preferred, sodium hydroxide or potassium hydroxide solutions are convenient to use, alone or in combination with each other. A preferred alkaline source is 50% NaOH solution. To prevent crystallization problems upon storage in cold climates, the 50% NaOH solution may be diluted with water and then used. If the pH is determined to be higher than about 9, then a source of acid is added to the PAA-containing water to lower the pH of the PAA-containing water to about 6 to about 9. Any suitable source of acid may be used. Inorganic acids are preferred because they are less expensive than organic acids and possess higher pH-lowering properties. Suitable inorganic acids include solutions of sulfuric acid, hydrochloric acid, phosphoric acid, nitric acid, and sodium hydrogen sulfate. Preferable inorganic acids are phosphoric acid and sodium hydrogen sulfate because they are FDA-approved for food contact purposes. Organic acids may be used, and include citric acid and lactic acid, which are FDA-approved. In the pH-altering step, it is most preferable to alter the pH to about 8.0 to about 9.0.

Before it is brought into contact with the PAA-containing water, the poultry carcass has a specific weight, referred to as a first weight. After contact with the PAA-containing water, the poultry carcass has a specific weight, referred to as a second weight, which is greater than the first weight.

C. Methods Utilizing Either Non-Equilibrium or Equilibrium Peracetic Acid

In an embodiment, a method of treating poultry in a reservoir during processing for increasing the weight of the poultry utilizes either non-equilibrium PAA or equilibrium PAA. The method comprises:

(a) Providing, in a reservoir, a peracetic acid-containing water, wherein the peracetic acid-containing water comprises water and an antimicrobial amount of a solution of peracetic acid, and wherein the peracetic acid-containing water has a temperature.

The solution of PAA may be a non-equilibrium solution or an equilibrium solution. If a non-equilibrium solution is used, it may be made by mixing hydrogen peroxide and an acetyl-precursor, such as triacetin, according to the methods set forth in section 4 above. A preferable non-equilibrium solution of PAA comprises a mixture of peracetic acid, hydrogen peroxide, triacetin, and an aqueous source of an alkali metal or an earth alkali metal hydroxide. Most preferably, the aqueous source of the alkali metal or earth alkali metal hydroxide is sodium hydroxide. In a preferable non-equilibrium solution of PAA, the peracetic acid is about 1% to about 7.1%, and most preferably 2%. If an equilibrium solution of PAA is used, the equilibrium solution of PAA preferably comprises a mixture of peracetic acid, hydrogen peroxide, acetic acid, and water. A suitable solution is a 15% PAA solution having either a molar excess of hydrogen peroxide or a molar excess of acetic acid. One example is Perasan MP-2 (Enviro Tech Chemical Services, Inc., Modesto, Calif.).

The PAA-containing water is provided in a reservoir. The reservoir may be any type of container suitable for cooling poultry during processing, such as a chill tank or other vessel. This may be accomplished in several ways. One way is to separately introduce the water and the solution of PAA into the reservoir. The PAA solution may be added to the reservoir simultaneously with the water or it may be added after the reservoir is filled with the water. Any means of introducing a liquid product to water can be used, such as a diaphragm pump, peristaltic pump, or a vacuum eductor to introduce the PAA into the reservoir water. Another way is to combine the water and the solution of PAA outside the reservoir to form PAA-containing water and then introduce the PAA-containing water into the reservoir.

The water is dosed with PAA in an amount that is antimicrobial. The amount is sufficient to prevent cross-contamination of bacteria between the poultry carcasses and to eradicate or reduce any pathogenic or spoilage microorganisms still resident on the carcasses. The amount of PAA that is used depends on the microbiological condition of the carcasses, but is about 0.54 ppm to about 99 ppm for non-equilibrium PAA and about 1 ppm to about 99 ppm for equilibrium PAA. Any suitable method of analyzing the amount of PAA in the water can be used. These include test strips which change color depending on the amount of PAA present, a test kit based on the ceric IV sulfate-sodium thiosulfate titration reaction that employs a ferroin indicator, a modified DPD method (U.S. Pat. No. 7,651,724), and the use of an amperometric measuring device.

The PAA-containing water is preferably recirculated. A pump is used to recirculate the water through the reservoir, then through an external refrigeration unit where it is chilled, and then back to the reservoir. To maximize the efficiency of cooling the carcasses, the flow of chilled water should be opposite to the direction of movement of the carcasses through the reservoir.

The PAA-containing water is chilled to a temperature that is lower than the temperature of the carcasses just before they are placed into the reservoir and is maintained at this temperature. A preferable temperature is about 33-34° F. This may be accomplished by chilling the PAA-containing water in an external refrigeration unit during recirculation, chilling the water before the PAA solution is added to the water, or other methods.

(b) Determining the pH of the peracetic acid-containing water, and, if the pH is determined to be lower than about 6 or higher than about 9, then altering the pH of the peracetic acid-containing water to a pH of about 6 to about 9.

The pH of the PAA-containing water is determined by any method, including the use of a glass electrode, indicator solutions, and pH test strips. If the pH is determined to be about 6 to about 9, then no pH-altering step is performed and the step of placing at least a portion of a poultry carcass into the PAA-containing water is performed next. If the pH is determined to be lower than about 6 or higher than about 9, then a subsequent pH-altering step is performed. If the pH is determined to be lower than about 6, as may occur if an equilibrium solution of PAA is used, then a source of alkali is added to the PAA-containing water to raise the pH of the PAA-containing water to about 6 to about 9. Any suitable source of alkali may be used. Examples include, but are not limited to, alkali metal or earth alkali metal carbonates, bicarbonates, oxides, and hydroxides. When solutions are preferred, sodium hydroxide or potassium hydroxide solutions are convenient to use, alone or in combination with each other. A preferred alkaline source is 50% NaOH solution. To prevent crystallization problems upon storage in cold climates, the 50% NaOH solution may be diluted with water and then used. If the pH is determined to be higher than about 9, as may occur if a non-equilibrium solution of PAA is used, then a source of acid is added to the PAA-containing water to lower the pH of the PAA-containing water to about 6 to about 9. Any suitable source of acid may be used. Inorganic acids are preferred because they are less expensive than organic acids and possess higher pH-lowering properties. Suitable inorganic acids include solutions of sulfuric acid, hydrochloric acid, phosphoric acid, nitric acid, and sodium hydrogen sulfate. Preferable inorganic acids are phosphoric acid and sodium hydrogen sulfate because they are FDA-approved for food contact purposes. Organic acids may be used, including citric acid and lactic acid, which are FDA-approved. In the pH-altering step, it is most preferable to alter the pH to about 8.0 to about 9.0.

(c) Placing into the peracetic acid-containing water at least a portion of a poultry carcass having a first weight and having a first temperature greater than the temperature of the peracetic acid-containing water.

A poultry carcass is placed into the PAA-containing water in the reservoir. Before it is placed into the reservoir, the poultry carcass has a specific weight referred to as a first weight, and has a specific temperature referred to as a first temperature. The first temperature is greater than the temperature of the peracetic acid-containing water in the reservoir.

The carcasses may be rotated in the reservoir on an auger or may be turned or stirred by any other suitable method that will allow at least a portion of a carcass to come into contact with the PAA-containing water.

At any time after the poultry carcasses are placed into the PAA-containing water, up to about ½ gallon of the PAA-containing water may be removed or bled off from the reservoir for each poultry carcass that enters the reservoir in order to keep the level of contaminants, such as blood, fecal matter, and ingesta, in the PAA-containing water at an acceptable level. Additional water (make-up water) is introduced into the reservoir to maintain the volume of water in the reservoir, and additional solution of PAA is introduced into the reservoir as needed to keep the amount of PAA at about 0.54 ppm to about 99 ppm for non-equilibrium PAA or about 1 to about 99 ppm for equilibrium PAA to continue to provide sufficient antimicrobial efficacy. The make-up water and the PAA may be introduced separately into the reservoir or they may be combined outside the reservoir to form PAA-containing water which is then introduced into the reservoir. The amount of PAA that will need to be added and the frequency of addition depend on the number of carcasses in the reservoir and the microbial condition of the carcasses. Any suitable method of analyzing the amount of PAA in the water can be used, including the methods described in step (a) above. The bleeding off of the PAA-containing water may be repeated or may be performed continuously. The PAA-containing water that is bled off may be reused in any processing step that is upstream from (earlier than) the reservoir from which it is removed.

(d) Determining the pH of the peracetic acid-containing water in the reservoir with at least the portion of the poultry carcass therein, and, if the pH is determined to be lower than about 6 or higher than about 9, then altering the pH of the peracetic acid-containing water to a pH of about 6 to about 9.

The pH is determined by any method, including the use of a glass electrode, indicator solutions, and pH test strips. If the pH is determined to be about 6 to about 9, then no pH-altering step is performed. If the pH is determined to be lower than about 6 or higher than about 9, then a subsequent pH-altering step is performed. If the pH is determined to be lower than about 6, as may occur if an equilibrium solution of PAA is used, then a source of alkali is added to the peracetic acid-containing water to raise the pH of the peracetic acid-containing water to about 6 to about 9. Any suitable source of alkali may be used. Examples include, but are not limited to, alkali metal or earth alkali metal carbonates, bicarbonates, oxides, and hydroxides. When solutions are preferred, sodium hydroxide or potassium hydroxide solutions are convenient to use, alone or in combination with each other. A preferred alkaline source is 50% NaOH solution. To prevent crystallization problems upon storage in cold climates, the 50% NaOH solution may be diluted with water and then used. If the pH is determined to be higher than about 9, as may occur if a non-equilibrium solution of PAA is used, then a source of acid is added to the peracetic acid-containing water to lower the pH of the peracetic acid-containing water to about 6 to about 9. Any suitable source of acid may be used. Inorganic acids are preferred because they are less expensive than organic acids and possess higher pH-lowering properties. Suitable inorganic acids include solutions of sulfuric acid, hydrochloric acid, phosphoric acid, nitric acid, and sodium hydrogen sulfate. Preferable inorganic acids are phosphoric acid and sodium hydrogen sulfate because they are FDA-approved for food contact purposes. Organic acids may be used, including citric acid and lactic acid, which are FDA-approved. In the pH-altering step, it is most preferable to alter the pH to about 8.0 to about 9.0.

It is preferable to perform this step more than once, and most preferable to perform it continuously. This step may be performed manually or, if it is to be performed continuously, it may be automated. In this embodiment and in the other embodiments that include a pH-determining step and a pH-altering step, it is preferable to perform the pH-determining and the pH-altering continuously and in an automated fashion. A suitable system for automating includes a glass electrode, a pH meter, a controller, and a pump. The glass electrode is used to read the pH and is connected to the pH meter which is interfaced to the controller. The controller's set point is pre-programmed to a specific desired pH. The controller is also interfaced to a pump which is connected to either a source of acid or a source of alkali. The controller receives the input from the pH meter (the actual pH of the PAA-containing water). If the pH input is different from the set point pH, then the controller directs the pump to deliver the appropriate amount of a source of acid or a source of akali to the PAA-containing water in the reservoir in order to alter the pH to the set point pH.

(e) Allowing the peracetic acid-containing water having the pH of about 6 to about 9 to increase the first weight of at least the portion of the poultry carcass to a second weight greater than the first weight to provide an increased weight of at least the portion of the poultry carcass and to lower the first temperature of at least the portion of the poultry carcass to a second temperature less than the first temperature for cooling at least the portion of the poultry carcass.

The poultry carcasses are left in the PAA-containing water in the reservoir until they are cooled to a second temperature, preferably about 33-34° F. The amount of time required for cooling depends on the number of carcasses in the reservoir, the size of the carcasses, and other factors. Typically, chickens are left in a chill tank for about 30-45 minutes, while turkeys are left longer, for up to about three hours. While the poultry carcasses are in the PAA-containing water in the reservoir, the weight of the poultry carcasses increases to a second weight which is greater than the first weight.

(f) Removing at least the portion of the poultry carcass having the increased weight from the peracetic acid-containing water.

The poultry carcasses are removed from the PAA-containing water. Each poultry carcass has an increased weight because the second weight, which is the weight of the carcass after removal from the PAA-containing water, is greater than the first weight, which is the weight of the carcass before being placed into the PAA-containing water.

D. Examples

1. Examples Utilizing Non-Equilibrium PAA

EXAMPLE 16

This example demonstrates the surprising result that 5 ppm of a non-equilibrium solution of PAA generated from a mixture of hydrogen peroxide and triacetin is effective against planktonic *Salmonella* bacteria at pHs of 5 to 9. At pH 10, the efficacy of the PAA declines. Also surprisingly, and in contrast to the methods of using equilibrium PAA, total eradication of a culture of *Salmonella* bacteria was achieved at pH 8 with five minutes of contact time and at pH 9 with 10 minutes of contact time.

*Salmonella typhimurium* bacteria (ATCC 14028) were cultured in nutrient broth (Sigma, St. Louis, Mo.) by incubation for two days at 35° C. The bacteria were separated from the nutrient broth by centrifugation and carefully resuspended in one liter of sterile phosphate buffer. The amount of *Salmonella typhimurium* bacteria was measured by serial dilution and plating 3M onto Enterobacteriaceae Petrifilms prior to being dosed with PAA.

A 1% non-equilibrium solution of PAA was prepared by combining 30.71 g of a mixture of 50% hydrogen peroxide and triacetin (54.22% hydrogen peroxide and 45.78% triacetin) with 948.3 g of chilled, soft water and adding 50% NaOH (19.78 g). The mole ratio of NaOH:hydrogen peroxide:triacetin was 4.0:3.8:1. This 1% non-equilibrium PAA solution had a pH of about 12.7. One minute after preparation, the one-liter *Salmonella* suspension was treated with a nominal dose of 5.0 ppm PAA by adding 0.50 g of the 1% PAA solution. Immediately thereafter, the pH of the treated *Salmonella* suspension was altered to the target pH of 5 by adding 0.97 N HCl. This process of preparing the *Salmonella typhimurium* culture and adding 5.0 ppm PAA from the 1% PAA solution was repeated four times to test the efficacy of the target pHs of 7, 8, 9, and 10 by using either 0.97 N HCl or 5% NaOH to alter the pH to achieve the target pH. The pH of the untreated *Salmonella* suspension, the pH of the 1% PAA solution, the pH of the treated *Salmonella* suspension prior to altering the pH, and the pH of the treated *Salmonella* suspension after altering the pH with either HCl or NaOH are reported in Table XX.

TABLE XX

| Target pH | pH of Untreated *Salmonella* Suspension | pH of 1% PAA Solution | pH of Treated *Salmonella* Suspension Before Altering pH | Weight of 0.97N HCl or 5% NaOH (g) used to alter pH | pH of Treated *Salmonella* Suspension After Altering pH |
|---|---|---|---|---|---|
| pH 5 | 7.60 | 12.69 | 7.98 | 0.97N HCl (1.02 g) | 5.09 |
| pH 7 | 7.28 | 12.74 | 7.90 | 0.97N HCl (0.025 g) | 6.88 |
| pH 8 | 7.55 | 12.55 | 7.98 | No alteration | 7.98 |
| pH 9 | 7.24 | 12.69 | 7.86 | 5% NaOH (0.230 g) | 8.96 |
| pH 10 | 7.42 | 12.70 | 7.84 | 5% NaOH (0.515 g) | 10.04 |

During the challenge testing, the pH and the amounts of hydrogen peroxide and PAA were measured at 1, 5, 10, and 20 minutes. This data is reported in Table XXI.

TABLE XXI

| Target pH (time) | measured pH | ppm PAA | ppm $H_2O_2$ |
|---|---|---|---|
| 5 (1 min) | 5.11 | 4.92 | 1.43 |
| 5 (5 min) | 5.20 | 4.07 | 4.40 |
| 5 (10 min) | 5.26 | 3.96 | 0.62 |
| 5 (20 min) | 5.32 | 3.85 | 0.38 |
| 7 (1 min) | 6.83 | 4.28 | 0.67 |
| 7 (5 min) | 6.87 | 3.21 | 1.48 |
| 7 (10 min) | 6.90 | 3.75 | 0.91 |
| 7 (20 min) | 6.93 | 3.21 | 0.81 |
| 8 (1 min) | 7.94 | 5.89 | 1.43 |
| 8 (5 min) | 7.88 | 5.14 | 1.10 |
| 8 (10 min) | 7.85 | 4.82 | 1.10 |
| 8 (20 min) | 7.78 | 4.82 | 0.86 |
| 9 (1 min) | 8.92 | 6.10 | 1.67 |
| 9 (5 min) | 8.89 | 5.35 | 2.06 |
| 9 (10 min) | 8.84 | 4.92 | 1.2 |
| 9 (20 min) | 8.77 | 4.49 | 0.86 |
| 10 (1 min) | 8.77 | 4.60 | 1.10 |
| 10 (5 min) | 10.06 | 5.14 | 0.48 |
| 10 (10 min) | 10.07 | 4.49 | 0.43 |
| 10 (20 min) | 10.05 | 3.96 | 0.38 |

The data shows that over the course of the 20-minute contact time, the pH remained relatively stable. However, it was surprising that the amount of PAA did not decline more rapidly at the higher pHs than at the lower pHs, as existing methods of using equilibrium PAA would suggest, demonstrating that the PAA from the non-equilibrium solution was relatively stable.

After 1, 5, 10, and 20 minutes, approximately 100 mL of the *Salmonella* suspension was removed from the beaker and sodium thiosulfate (0.5 g) was added to neutralize the PAA and hydrogen peroxide. The amount of viable *Salmonella typhimurium* bacteria remaining in the suspension at the 1, 5, 10, and 20 minute contact times was measured by serial dilution and plating on 3M Enterobacteriaceae Petrifilms. All 3M Enterobacteriaceae Petrifilms were incubated at 35° C. for 24 hours before enumeration.

Table XXII shows the microbiological results of the *Salmonella typhimurium* suspension before treatment with PAA, and at 1, 5, 10, and 20 minutes after the samples were treated with a nominal dose of 5.0 ppm PAA.

TABLE XXII

| pH (time) | $Log_{10}$ CFU/mL Remaining | $Log_{10}$ CFU/mL Reduction |
|---|---|---|
| 5 (Before treatment) | 7.34 | N/A |
| 5 (1 min) | 6.51 | 0.83 |
| 5 (5 min) | 2.09 | 5.25 |
| 5 (10 min) | 1.59 | 5.75 |
| 5 (20 min) | 1.23 | 6.11 |
| 7 (Before treatment) | 6.95 | N/A |
| 7 (1 min) | 5.59 | 1.36 |
| 7 (5 min) | 2.21 | 4.74 |
| 7 (10 min) | 1.56 | 5.39 |
| 7 (20 min) | 1.74 | 5.21 |
| 8 (Before treatment) | 6.95 | N/A |
| 8 (1 min) | 6.77 | 0.18 |
| 8 (5 min) | 0.00 | >6.95 |
| 8 (10 min) | 0.00 | >6.95 |
| 8 (20 min) | 0.00 | >6.95 |
| 9 (Before treatment) | 6.95 | N/A |
| 9 (1 min) | 6.74 | 0.21 |
| 9 (5 min) | 5.85 | 1.10 |
| 9 (10 min) | 0.00 | >6.95 |
| 9 (20 min) | 0.00 | >6.95 |
| 10 (Before treatment) | 6.95 | N/A |
| 10 (1 min) | 7.10 | 0 |
| 10 (5 min) | 7.00 | 0 |
| 10 (10 min) | 6.85 | 0.1 |
| 10 (20 min) | 6.65 | 0.3 |

The data demonstrates that a non-equilibrium solution of PAA generated from hydrogen peroxide and triacetin is effective from pH 5 to pH 9. Poor efficacy was evident at pH 10. At the shorter contact times, less bacteria were eradicated than at longer contact times. Surprisingly, however, treating the bacteria with PAA at pH 8 or 9 resulted in greater efficacy than treating with PAA at pH 5 or 7. Treatment with PAA at pH 8 totally eradicated the *Salmonella* at five minutes, whereas at pHs 5 and 7, the *Salmonella* was not eradicated at 5, 10, or 20 minutes. It was also unexpectedly found that treatment with PAA at pH 9 totally eradicated the *Salmonella* at 10 minutes.

EXAMPLE 17

This example shows the efficacy of non-equilibrium PAA (1 ppm PAA and 99 ppm PAA), prepared from a mixture of hydrogen peroxide and triacetin against planktonic *Salmonella typhimurium* bacteria at pHs of 4.8, 6 and 9.

*Salmonella typhimurium* bacteria (ATCC 14028) were cultured in nutrient broth (Sigma, St. Louis, Mo.) by incubation for two days at 35° C. The bacteria were separated from the nutrient broth by centrifugation, and carefully resuspended in approximately 3000 mL of sterile phosphate buffer. The concentration of the *Salmonella typhimurium* was measured in the *Salmonella* inoculum solution by plating using 3M Petrifilm Enterobacteriaceae plates and incubated at 35° C. for 24 hours, upon which the plates were enumerated. The concentration of *Salmonella typhimurium* in the inoculum solution was 2.57×10$^7$ CFU/mL (log$_{10}$ 7.41).

The *Salmonella* inoculum was separated into six beakers of 500 mL each. Three solutions were dosed to a nominal 1 ppm PAA and three were dosed to a nominal 99 ppm PAA using a 2% PAA solution from a sodium hydroxide activated solution of a mixture of triacetin and hydrogen peroxide prepared using the methods described in section 4. The inoculums treated to 1 ppm PAA were labeled 1 ppm (pH 4.8), 1 ppm (pH 6), and 1 ppm (pH 9). The inoculums treated to 99 ppm PAA were labeled 99 ppm (pH 4.8), 99 ppm (pH 6), and 99 ppm (pH 9).

For the 1 ppm PAA treatment, the 2% PAA solution was introduced to each 500 mL *Salmonella* inoculum solution and mixed using a magnetic stirrer. A 0.025 mL aliquot of the 2% PAA solution was introduced to each of the three solutions of *Salmonella* inoculum. The PAA concentrations were found to be 1.56 ppm, 1.33 ppm, and 1.56 ppm for solutions, 1 ppm (pH 4.8), 1 ppm (pH 6), and 1 ppm (pH 9), respectively. The pHs of the PAA-containing inoculum before altering were measured to be 7.39, 7.39, and 7.36 for solutions 1 ppm (pH 4.8), 1 ppm (pH 6), and 1 ppm (pH 9), respectively. The target pHs were 4.8, 6.0, and 9.0 for the 1 ppm (pH 4.8), 1 ppm (pH 6), and 1 ppm (pH 9), respectively. The pHs of solutions 1 ppm (pH 4.8), 1 ppm (pH 6), and 1 ppm (pH 9) were altered to 4.80 (with 0.05 g 32% hydrochloric acid), 5.91 (with 0.19 g 0.97N hydrochloric acid), and 8.88 (with 0.12 g 50% sodium hydroxide), respectively. he pH was measured along with the PAA concentration at 1, 5, 30, and 60 minutes. The amount of viable *Salmonella typhimurium* bacteria remaining was measured at 1, 5, 30 and 60 minutes by removing an aliquot of the solution followed by serial dilution (except for the zero dilution) and plating onto 3M Petrifilm Enterobacteriaceae plates with incubation at 35° C. for 24 hours before enumeration.

For the 99 ppm PAA treatment, the 2% PAA solution was introduced to each 500 mL *Salmonella* inoculum solution and mixed using a magnetic stirrer. A 2.48 mL aliquot of the 2% PAA solution was introduced to each of the three solutions of *Salmonella* inoculum. The PAA concentrations were found to be 113.42 ppm, 97.37 ppm, and 113.42 ppm for solutions 99 ppm (pH 4.8), 99 ppm (pH 6), and 99 ppm (pH 9), respectively. The pHs of the PAA-containing inoculum before altering were measured to be 10.60, 10.17, and 10.50 for solution 99 ppm (pH 4.8), 99 ppm (pH 6), and 99 ppm (pH 9), respectively. The target pHs were 4.8, 6.0, and 9.0 for solutions 99 ppm (pH 4.8), 99 ppm (pH 6), and 99 ppm (pH 9), respectively. The pHs of the solutions 99 ppm (pH 4.8), 99 ppm (pH 6), and 99 ppm (pH 9) were altered to 4.85 (with 0.26 g 32% hydrochloric acid), 6.44 (with 0.15 g 32% hydrochloric acid), and 9.28 (with 0.33 g 0.97N hydrochloric acid), respectively. The pH was measured along with the PAA concentration at 1 and 5 minutes. The amount of viable *Salmonella typhimurium* remaining was measured at 1 and 5 minutes by removing an aliquot of the solution followed by serial dilution (except for the zero dilution) and plating onto 3M Petrifilm Enterobacteriaceae Plates with incubation at 35° C. for 24 hours before enumeration.

Table XXIII reports the efficacy data acquired 1, 5, 30, and 60 minutes after administering the 1 ppm of PAA from the 2% PAA solution.

TABLE XXIII

| Solution Label | Time (min) | log$_{10}$ Average | log$_{10}$ Reduction | % Reduction |
|---|---|---|---|---|
| 1 ppm (pH 4.8) | 1 | 6.94 | 0.47 | 66.12 |
| | 5 | 0 | >7.41 | >99.999 |
| | 30 | 0 | >7.41 | >99.999 |
| | 60 | 0 | >7.41 | >99.999 |
| 1 ppm (pH 6) | 1 | 6.80 | 0.61 | 75.45 |
| | 5 | 0 | >7.41 | >99.999 |
| | 30 | 0 | >7.41 | >99.999 |
| | 60 | 0 | >7.41 | >99.999 |
| 1 ppm (pH 9) | 1 | 7.01 | 0.40 | 60.19 |
| | 5 | 6.97 | 0.44 | 63.69 |
| | 30 | 0 | >7.41 | >99.999 |
| | 60 | 0 | >7.41 | >99.999 |

Table XXIII shows that despite the low level of approximately 1 ppm of PAA from the 2% PAA solution, 5 minutes after the initial dose, the PAA was effective at reducing the level of *Salmonella typhimurium* at pH 4.8 and 6. Thirty minutes after the initial dose, the PAA was effective at reducing the level of *Salmonella typhimurium* at pH 9. Further, the data shows that when the approximately 1 ppm dose of PAA from the 2% PAA solution was maintained for 30 minutes, there was total eradication of *Salmonella typhimurium* at pH 4.8, 6, and 9.

Table XXIV reports the efficacy results acquired 1 and 5 minutes after administering the 99 ppm of PAA from the 2% PAA solution.

TABLE XXIV

| Solution Label | Time (min) | log$_{10}$ Average | log$_{10}$ Reduction | % Reduction |
|---|---|---|---|---|
| 99 ppm (pH 4.8) | 1 | 0 | >7.41 | >99.999 |
| | 5 | 0 | >7.41 | >99.999 |
| 99 ppm (pH 6) | 1 | 0 | >7.41 | >99.999 |
| | 5 | 0 | >7.41 | >99.999 |
| 99 ppm (pH 9) | 1 | 3.37 | 4.04 | 99.991 |
| | 5 | 0 | >7.41 | >99.999 |

Table XXIV shows that 1 minute after the initial dose, there was total eradication of *Salmonella typhimurium* at pH 4.8 and 6. One minute after the initial dose at pH 9, the PAA was effective at reducing the level of *Salmonella typhimurium* by log$_{10}$ 4.04. Further, the data shows that when the approximately 99 ppm dose of PAA from the 2% PAA solution was maintained for 5 minutes at pH 9, there was total eradication of *Salmonella typhimurium* bacteria.

EXAMPLE 18

This example shows that treating poultry carcasses in chilled PAA-containing water (90 ppm PAA) having a pH of 6 or a pH of 9, prepared from a solution of non-equilibrium PAA, increased the weight of the poultry carcasses, and that the poultry carcasses treated at pH 9 gained significantly more weight than those treated at pH 6.

Twenty freshly killed chickens that had been picked (defeathered) and eviscerated were removed from a processing line at a poultry processing plant before they entered the plant's chicken chill tank. The chickens, which were still warm from body temperature, were cut on the median plane, separating the left and right side of the body. Any extraneous loose fat or tissue was manually removed. The chickens were randomly divided into two groups of 20 halves each. The chicken halves were tagged with waterproof labels. The first group of halves was marked 1-20 and the second group of halves was marked A-T. Each chicken half was submerged in chilled soft water for 10 seconds, shaken 10 times to remove excess water, and then weighed.

Two 30-gallon bins, labeled Bin 1 (pH 6) and Bin 2 (pH 9), were filled with a combination of ice and soft water (42.4 L) which was enough volume to submerge 20 chicken halves. The temperature of the water in the bins was 41.6° F., simulating a poultry chill tank. The temperature of the water was monitored and kept constant using frozen bottles of water as ice packs.

Both bins were dosed to a nominal 90 ppm PAA. The PAA was prepared using the methods described in section 4. A hydrogen peroxide-acetyl precursor solution was prepared by mixing triacetin (183.03 g) into 50% hydrogen peroxide (216.94 g). The hydrogen peroxide-triacetin solution (51.3 g) was mixed with chilled soft water (911.9 g). Then, a sufficient amount of 50% sodium hydroxide (37.00 g) was added to form a reaction medium comprising a non-equilibrium solution of PAA. The pH of the solution was measured to be 12.9. After one minute, a 2% PAA solution was generated. This solution was used to dose the chilled water in the bins.

For Bin 1 (pH 6), the 2% PAA solution (181.02 g) was introduced to the chilled water in Bin 1 and manually mixed with a plastic rod to form PAA-containing water. The concentration of PAA was measured using the modified DPD method (U.S. Pat. No. 7,651,724) and found to be 90.95 ppm. The pH of the PAA-containing water was measured to be 9.3. The pH was altered to 5.85, using 32% hydrochloric acid (18.88 g) and 50% sodium hydroxide (1.03 g). The target pH for this bin was pH 6. The first group of 20 chicken halves, labeled 1-20, was placed into the PAA-containing water. After adding the chicken halves, the pH was measured to be 5.94. The chicken halves were soaked for three hours and periodically manually turned over in the water. The pH was periodically measured. The pH was altered at 60 minutes from 6.7 to 6.2, using 32% hydrochloric acid (0.79 g). The study was terminated at three hours. Each chicken half was removed from the bin, shaken 10 times, and then weighed.

For Bin 2 (pH 9), for a side-by-side comparison, the 2% PAA solution (180.9 g) was introduced to the chilled water in Bin 2 and manually mixed with a plastic rod to form PAA-containing water. The concentration of PAA was measured using the modified DPD method and found to be 88.28 ppm. The pH of the PAA-containing water was measured to be 9.3. The target pH for this bin was pH 9. The second group of 20 chicken halves, labeled A-T, was placed into the PAA-containing water. After adding the chicken halves, the pH was measured to be 9.22. The chicken halves were soaked for three hours and periodically manually turned over in the water. The pH was periodically measured. The pH was altered at 150 minutes from 8.6 to 9.2, using sodium hydroxide 50% (3.64 g). The study was terminated at three hours. Each chicken half was removed from the bins, shaken 10 times, and then weighed.

Table XXV summarizes the results. Although 20 chicken halves were placed in Bin 1 (pH 6), the integrity of one chicken half was compromised due to the detachment of a section of fat from the body during the soak. Therefore, only 19 chicken halves were reported for Bin 1.

TABLE XXV

|  | Bin 1 (pH 6) | Bin 2 (pH 9) |
| --- | --- | --- |
| # Chicken Halves | 19 | 20 |
| Avg. Weight of Chicken Half Before Chill (g) | 801.8 | 863.0 |
| Avg. Weight of Chicken Half After Chill (g) | 825.0 | 906.0 |
| Avg. Weight Gain (g) | 23.2 | 43.0 |
| Average % Weight Gain | 2.90 | 4.98 |
| Standard Error (±%) | 0.1474 | 0.5427 |

Table XXV shows that the average weight of the chicken halves before soaking in the chilled PAA-containing water was 801.8 g for Bin 1 and 863.0 g for Bin 2. The average weight of the chicken halves after soaking in the chilled PAA-containing water was 825.0 g for Bin 1 and 906.0 g for Bin 2. The average weight gain of the chicken halves treated with PAA-containing water at pH 6 was 23.2 g, corresponding to an average percent weight gain of 2.90%. The average weight gain of the chicken halves treated with PAA-containing water at pH 9 was 43.0 g, corresponding to an average percent weight gain of 4.98%. The standard errors for each set of data are also shown.

Figure 2:
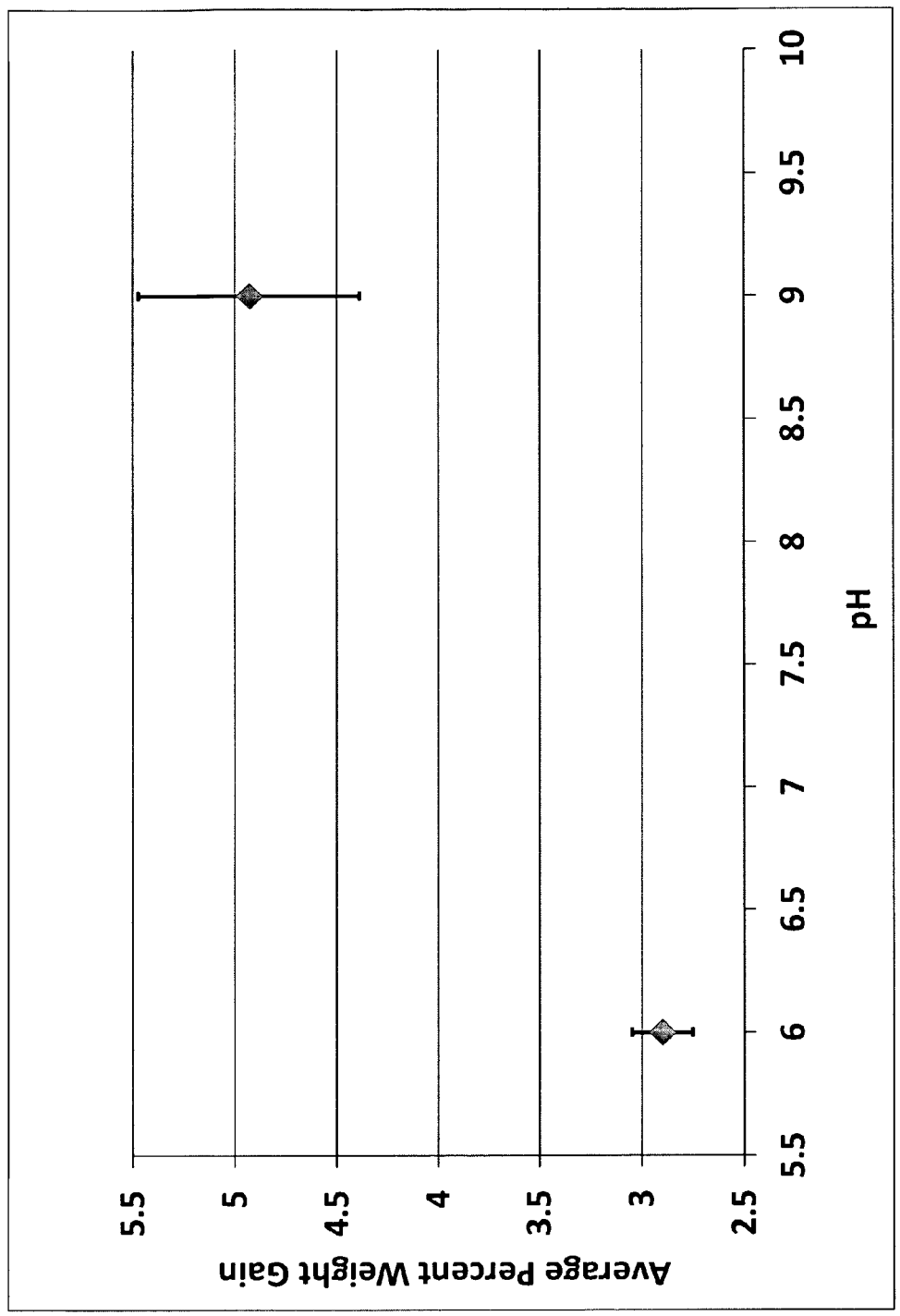
FIG. 2 is a graph showing the average percent weight gain of poultry carcasses treated with a solution of non-equilibrium PAA (90 ppm) in a chill tank at pHs of 6 and 9.

FIG. 2 shows the average percent weight gain versus pH. The diamonds represent the average percent weight gain. The error bars represent the standard error, also referred to as the standard deviation of the average. In the present case, it can be stated that with 98.85% confidence, the average falls within the region bound by the error bars.

The Student's two-tailed t-test was used to determine whether the difference in the average percent weight gains of the chicken halves soaked in Bin 1 and those soaked in Bin 2 was significant. The statistical analysis was performed using the "Two Sample Assuming Un-Equal Variances" t-test (Analysis ToolPak, Microsoft Excel, 2007). The average percent weight gain of the chicken halves treated in Bin 1 (pH 6) and the average percent weight gain of the chicken halves treated in Bin 2 (pH 9) were compared.

The t-test results are displayed in Table XXVI. The t-test calculated the average percent weight gained by the chicken halves for each data set, the variance, number of replicates, degrees of freedom (df), t-stat value, the P two-tail value, and the t critical value. The average was calculated by dividing the sum of the percent weight gained by each chicken half by the number of samples in the data set. The variance describes how far the data values are away from the average of the set of data. Variance is calculated by first finding the distance between each data value and the average of the data, then squaring each value, followed by calculating the sum of the squared values and dividing the sum by the number of replicates minus one. Equation 1 displays the variance formula, where x represents each individual data value, $\bar{x}$ is the calculated average for the data set, and n represents the number of replicates in the data set.

$$\text{Variance} = \frac{\sum (x - \bar{x})^2}{n - 1} \quad \text{Equation 1}$$

The number of degrees of freedom (d.f.) is 22, based on the Welch-Satterthwaite equation, Equation 1, where $n_1$ and $n_2$ represent the number of replicates evaluated for the percent weight gain of the chicken halves in Bin 1 (pH 6) and the chicken halves in Bin 2 (pH 9), respectively; and $s_1$ and $s_2$ represent the standard deviation (square root of the variance) of the percent weight gain of the chicken halves in Bin 1 (pH 6) and the chicken halves in Bin 2 (pH 9), respectively.

$$d.f. = \frac{(s_1^2/n_1 + s_2^2/n_2)^2}{(s_1^2/n_1)^2/(n_1 - 1) + (s_2^2/n_2)^2/(n_2 - 1)} \quad \text{Equation 2}$$

The t-stat value is calculated using the difference in averages of the data sets and the square root of the sum of variances divided by the number of replicates. This value is positive if the first average is greater than the second average or negative if the first average is less than the second average. In this study, the t-stat value is negative, indicating that the average of the percent weight gain of chicken halves in Bin 1 (pH 6) was smaller than the average of the percent weight gain of chicken halves in Bin 2 (pH 9. Equation 3 displays the formula for the t-stat value, where var represents variance and n represents the number of replicates in each data set.

$$t\ stat = \frac{\bar{x}_{pH6} - \bar{x}_{pH9}}{\sqrt{\frac{var_{pH6}}{n_{pH6}} + \frac{var_{pH9}}{n_{pH9}}}} \quad \text{Equation 3}$$

The P(two-tail)-value refers to the confidence level calculated by the t-test. It provides the level of confidence that the averages of the percent weight gains of chicken halves soaked in PAA-containing water at pH 6 and at pH 9 are statistically different.

TABLE XXVI t-Test: Two-Sample Assuming Unequal Variances

|  | Bin 1 (pH 6) | Bin 2 (pH 9) |
| --- | --- | --- |
| Average | 2.90 | 4.98 |
| Variance | 0.41 | 5.89 |
| Observations | 19 | 20 |
| df | 22 |  |
| t stat | −3.61 |  |
| P(T <= t) | 0.0015 |  |

Using a t-table, the confidence level was determined. The t-value (3.61) was bracketed between confidence levels 99.8% with a t-stat value of 3.505 and 99.9% with a t-stat value of 3.792. Thus, the confidence level is established at 99.85% that the average percent weight gains of chicken halves soaked in peracetic acid-containing water at pH 6 and pH 9 are statistically different.

EXAMPLE 19

This example shows that treating poultry carcasses in chilled PAA-containing water (1 one ppm PAA), having a pH of 6 or a pH of 9, prepared from a solution of non-equilibrium PAA increased the weight of the poultry carcasses when compared to a pH of 4.8.

Thirty freshly killed chickens that had been picked (defeathered) and eviscerated were removed from a processing line at a poultry processing plant before they entered the plant's chicken chill tank. The chickens, which were still warm from body temperature, were prepared and weighed as described in Example 18.

Three 30-gallon bins, labeled Bin 1 (pH 4.8), Bin 2 (pH 6), and Bin 3 (pH 9), were filled with a combination of ice and soft water (42 L) which was enough volume to submerge 20 chicken halves. The temperature of the water in the bins was 42° F., simulating a poultry chill tank. The temperature of the water was monitored and kept constant using frozen bottles of water as ice packs.

The chicken halves were placed into the respective bins before the PAA addition. The three bins were then dosed to a nominal 1 ppm PAA using a 2% PAA solution from a sodium hydroxide activated solution of a mixture of triacetin and hydrogen peroxide prepared using the methods described in section 4.

The 2% PAA solution was introduced to the chilled water of each bin and manually mixed with a plastic rod to form PAA-containing water. The volume of 2% PAA solution introduced for each bin was 4.1 mL, 4.1 mL, and 4.1 mL for Bin 1, Bin 2, and Bin 3, respectively. The concentration of PAA was measured using the modified DPD method (U.S. Pat. No. 7,651,724) and was found to be 1.23 ppm, 1.26 ppm, and 1.25 ppm for Bin 1, Bin 2, and Bin 3, respectively. The pH of the PAA-containing water with the chickens before altering was measured to be 7.5, 7.2, and 7.3 for Bin 1, Bin 2, and Bin 3, respectively. The target pH for the bins was 4.8, 6, and 9 for Bin 1, Bin 2, and Bin 3, respectively. The pH of Bin 1, Bin 2, and Bin 3 was altered to 4.8 (with 5.07 g 32% hydrochloric acid), 6.3 (with 4.54 g 32% hydrochloric acid), and 8.94 (with 3.85 g 50% sodium hydroxide), respectively. The chicken halves were soaked for three hours and periodically manually turned over in the water to simulate their movement through a chicken chill tank.

After three hours, each chicken half was removed for weighing as described in Example 18.

Table XXVII summarizes the results. The standard errors for each set of data are also shown.

TABLE XXVII

|  | Bin 1 (pH 4.8) | Bin 2 (pH 6) | Bin 3 (pH 9) |
| --- | --- | --- | --- |
| # Chicken Halves | 20 | 20 | 20 |
| Avg. Weight of Chicken Half Before Chill (g) | 1049.1 | 998.6 | 972.4 |
| Avg. Weight of Chicken Half After Chill (g) | 1080.0 | 1035.5 | 1019.2 |
| Avg. Weight Gain (g) | 31.0 | 36.9 | 46.8 |
| Average % Weight Gain | 3.00 | 3.70 | 4.82 |
| Standard Error (±%) | 0.2049 | 0.2107 | 0.2321 |

Figure 3:
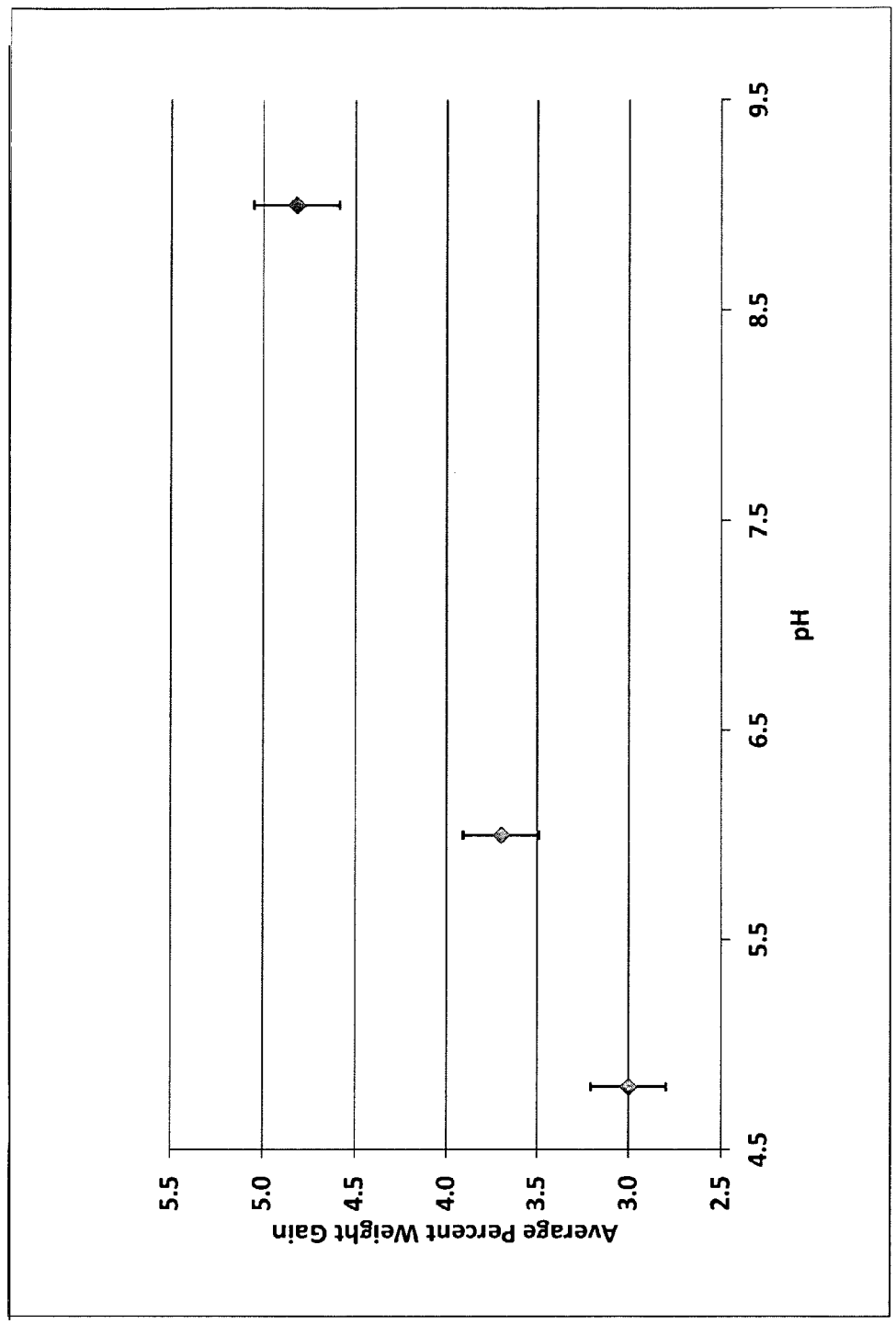
FIG. 3 is a graph showing the average percent weight gain of poultry carcasses treated with a solution of non-equilibrium PAA (1 ppm) in a chill tank at pHs of 4.8, 6, and 9.

FIG. 3 shows the average percent weight gain versus pH. The diamonds represent the average percent weight gain. The error bars represent the standard error, also referred to as the standard deviation of the average.

The statistical analysis was performed as in Example 18, using the "Two Sample Assuming Un-Equal Variances" t-test (Analysis ToolPak, Microsoft Excel, 2007).

The t-test results are displayed in Tables XXVIII, XXIX, and XXX. The t-test calculated the average percent weight gained by the chicken halves for each data set, the variance, number of replicates, degrees of freedom (df), t-stat value, and the P two-tail value.

Table XXVIII displays the t-test results when Bin 2 (pH 6) was compared to Bin 1 (pH 4.8).

TABLE XXVIII

| t-Test: Two-Sample Assuming Unequal Variances | | |
|---|---|---|
| | 1 ppm PAA (pH 6) | 1 ppm PAA (pH 4.8) |
| Mean | 3.70 | 3.00 |
| Variance | 0.89 | 0.84 |
| Observations | 20 | 20 |
| df | 38 | |
| t Stat | 2.3721 | |
| P(T <= t) two-tail | 0.0229 | |

Using a t-table, the confidence level was approximated. The t-value (2.37) was bracketed between confidence levels 95.0% with a t-stat value of 2.021 and 98.0% with a t-stat value of 2.423. To determine the exact confidence level, the P— value was used in the determination (100%-2.29%). Thus, the confidence level is established at 97.71% that the average percent weight gain of chicken halves soaked in peracetic acid-containing water at pH 6 and pH 4.8 are statistically different.

Table XXIX displays the t-test results when Bin 3 (pH 9) was compared to Bin 1 (4.8).

TABLE XXIX

| t-Test: Two-Sample Assuming Unequal Variances | | |
|---|---|---|
| | 1 ppm PAA (pH 9) | 1 ppm PAA (pH 4.8) |
| Mean | 4.82 | 3.00 |
| Variance | 1.08 | 0.84 |
| Observations | 20 | 20 |
| df | 37 | |
| t Stat | 5.8755 | |
| P(T <= t) two-tail | 0.000001 | |

Using a t-table, the confidence level was approximated. The t-value (5.88) exceeded the confidence level 99.9% with a t-stat value of 3.551. To determine the exact confidence level the P— value was used in the determination (100%-0.0001%). Thus, the confidence level is established at 99.9999% that the average percent weight gain of chicken halves soaked in peracetic acid-containing water at pH 9 and pH 4.8 are statistically different.

Table XXX displays the t-test results when Bin 3 (pH 9) was compared to Bin 2 (pH 6).

TABLE XXX

| t-Test: Two-Sample Assuming Unequal Variances | | |
|---|---|---|
| | 1 ppm PAA (pH 9) | 1 ppm PAA (pH 6) |
| Mean | 4.82 | 3.70 |
| Variance | 1.08 | 0.89 |

TABLE XXX-continued

| t-Test: Two-Sample Assuming Unequal Variances | | |
|---|---|---|
| | 1 ppm PAA (pH 9) | 1 ppm PAA (pH 6) |
| Observations | 20 | 20 |
| df | 38 | |
| t Stat | 3.5787 | |
| P(T <= t) two-tail | 0.0010 | |

Using a t-table, the confidence level was approximated. The t-value (3.58) exceeded the confidence levels 99.9% with a t-stat value of 3.551. To determine the exact confidence level, the P— value was used in the determination (100%-0.1%). Thus, the confidence level is established at 99.90% that the average percent weight gain of chicken halves soaked in peracetic acid-containing water at pH 6 and pH 9 are statistically different.

2. Examples Utilizing Equilibrium PAA

EXAMPLE 20

This example demonstrates that equilibrium solutions of PAA at 5 ppm and 10 ppm are effective against planktonic *Campylobacter* bacteria from pH 6 to 9.

*Campylobacter jejuni* bacteria (ATCC 33291) were cultured in Bolton Broth (Sigma Aldrich) containing 5% defibrinated sheep blood (Hardy Diagnostics) by microaerophilic incubation for two days at 37° C. The bacteria were separated from the nutrient broth by centrifugation and carefully resuspended in two liters of sterile phosphate buffer, which was then split into four 500-mL samples. The four 500-mL samples were used to demonstrate the efficacy of 5 ppm of an equilibrium solution of PAA (Perasan MP-2, Enviro Tech Chemical Services, Inc., Modesto, Calif.) against *Campylobacter jejuni* at pHs of 6, 7, 8, and 9. Perasan MP-2 is a product that contains 15% peroxyacetic acid, 5.5% hydrogen peroxide, and 0.7% HEDP (hydroxyethylidene diphosphonic acid). This procedure was then repeated with another set of four freshly prepared 500-mL samples that were used to demonstrate the efficacy of 10 ppm of an equilibrium solution of PAA (Perasan MP-2, Enviro Tech Chemical Services, Inc., Modesto, Calif.) against *Campylobacter jejuni* at pHs of 6, 7, 8, and 9.

The amount of *Campylobacter jejuni* bacteria was measured prior to being dosed with the PAA by serial dilution and plating on Campy Cefex Agar (Hardy Diagnostics). The plates were kept under a microaerophilic atmosphere (oxygen-free) and incubated for 72 hours at 37° C.

A 1000 ppm stock solution of PAA was prepared by combining 3.197 g of Perasan MP-2 (5.86% hydrogen peroxide and 15.64% PAA) with reverse osmosis water (500 g). One of the 500-mL *Campylobacter* suspension samples was treated with a nominal dose of 5 ppm PAA by adding 2.5 mL of the 1000 ppm PAA stock solution. Immediately thereafter, the amount of PAA was measured using the modified DPD method (U.S. Pat. No. 7,651,724). Another 2.5 mL of the 1000 ppm PAA stock solution was immediately added to the treated *Campylobacter* suspension sample because it was determined that the PAA had been consumed by the *Campylobacter* suspension. The pH of the *Campylobacter* suspension was altered to the target pH of 6 by adding 5% NaOH. Every 1.5 minutes, about 0.5 mL to 1.0 mL of the 1000 ppm PAA stock solution was added to replenish the PAA that had been consumed. This process was repeated to treat the other three 500-mL *Campylobacter* suspensions with 5 ppm PAA at the target pHs of 7, 8, and 9, altered with 5% NaOH.

During the challenge testing, the amounts of hydrogen peroxide and PAA were measured at 1, 5, 10, and 20 minutes. This data is reported in Table XXXI.

TABLE XXXI (5 ppm PAA)

| Target pH (time) | ppm PAA | ppm $H_2O_2$ |
|---|---|---|
| 6 (1 min) | 3.00 | 0.81 |
| 6 (5 min) | 5.46 | 0.00 |
| 6 (10 min) | 4.39 | 0.00 |
| 6 (20 min) | 4.17 | 0.00 |
| 7 (1 min) | 2.78 | 0.62 |
| 7 (5 min) | 4.71 | 0.48 |
| 7 (10 min) | 3.85 | 0.00 |
| 7 (20 min) | 3.64 | 0.00 |
| 8 (1 min) | 2.35 | 1.24 |
| 8 (5 min) | 3.64 | 1.10 |
| 8 (10 min) | 4.71 | 0.05 |
| 8 (20 min) | 3.96 | 0.00 |
| 9 (1 min) | 1.50 | 1.43 |
| 9 (5 min) | 4.82 | 2.01 |
| 9 (10 min) | 4.92 | 0.57 |
| 9 (20 min) | 5.24 | 0.00 |

The process was repeated for the four samples treated with 10 ppm PAA at the target pHs of 6, 7, 8, and 9. This data is reported in Table XXXII.

TABLE XXXII (10 ppm PAA)

| Target pH (time) | ppm PAA | ppm $H_2O_2$ |
|---|---|---|
| 6 (1 min) | 10.17 | 0.81 |
| 6 (5 min) | 11.45 | 0.00 |
| 6 (10 min) | 8.88 | 0.00 |
| 6 (20 min) | 6.31 | 0.00 |
| 7 (1 min) | 9.84 | 1.29 |
| 7 (5 min) | 11.02 | 0.05 |
| 7 (10 min) | 10.06 | 0.00 |
| 7 (20 min) | 8.99 | 0.00 |
| 8 (1 min) | 7.06 | 3.15 |
| 8 (5 min) | 10.17 | 1.48 |
| 8 (10 min) | 12.31 | 0.08 |
| 8 (20 min) | 11.66 | 0.00 |
| 9 (1 min) | 6.31 | 3.54 |
| 9 (5 min) | 10.06 | 3.20 |
| 9 (10 min) | 9.84 | 1.72 |
| 9 (20 min) | 10.38 | 0.00 |

After 1, 5, 10, and 20 minutes, approximately 100 mL of the *Campylobacter* suspension was removed from the beaker and sodium thiosulfate (0.5 g) was added to neutralize the PAA and hydrogen peroxide. The amount of viable *Campylobacter jejuni* bacteria remaining in the suspension at the 1, 5, 10 and 20 minute contact times was measured by serial dilution and plating on Campy Cefex Agar. All Campy Cefex Agar plates were kept under microaerophilic conditions (oxygen-free) and incubated for 72 hours at 37° C. before enumeration.

Table XXXIII shows the microbiological results of the *Campylobacter jejuni* suspension before treatment with PAA, and at 1, 5, 10, and 20 minutes after the samples were treated with 5 ppm PAA. Table XXXIV shows the microbiological results of the *Campylobacter jejuni* suspension before treatment with PAA, and at 1, 5, 10, and 20 minutes after the samples were treated with 10 ppm PAA.

TABLE XXXIII (5 ppm PAA)

| pH (time) | $Log_{10}$ CFU/mL Remaining | $Log_{10}$ CFU/mL Reduction |
|---|---|---|
| 6 (Before treatment) | 6.41 | N/A |
| 6 (1 min) | 4.69 | 1.72 |
| 6 (5 min) | 4.50 | 1.91 |
| 6 (10 min) | 4.36 | 2.05 |
| 6 (20 min) | 3.51 | 2.9 |
| 7 (Before treatment) | 6.41 | N/A |
| 7 (1 min) | 4.73 | 1.68 |
| 7 (5 min) | 4.76 | 1.65 |
| 7 (10 min) | 4.8 | 1.61 |
| 7 (20 min) | 3.69 | 2.72 |
| 8 (Before treatment) | 6.41 | N/A |
| 8 (1 min) | 4.73 | 1.68 |
| 8 (5 min) | 4.77 | 1.64 |
| 8 (10 min) | 4.69 | 1.72 |
| 8 (20 min) | 3.74 | 2.67 |
| 9 (Before treatment) | 6.41 | N/A |
| 9 (1 min) | 4.84 | 1.57 |
| 9 (5 min) | 4.76 | 1.65 |
| 9 (10 min) | 4.73 | 1.68 |
| 9 (20 min) | *NR | *NR |

*Not Reported. Agar plates were contaminated.

TABLE XXXIV (10 ppm PAA)

| pH (time) | $Log_{10}$ CFU/mL Remaining | $Log_{10}$ Reduction |
|---|---|---|
| 6 (Before treatment) | 6.98 | N/A |
| 6 (1 min) | 5.12 | 1.86 |
| 6 (5 min) | 4.93 | 2.05 |
| 6 (10 min) | 4.87 | 2.11 |
| 6 (20 min) | 3.93 | 3.05 |
| 7 (Before treatment) | 6.98 | N/A |
| 7 (1 min) | 5.09 | 1.89 |
| 7 (5 min) | 4.89 | 2.09 |
| 7 (10 min) | 4.86 | 2.12 |
| 7 (20 min) | 3.72 | 3.26 |
| 8 (Before treatment) | 6.98 | N/A |
| 8 (1 min) | 5.23 | 1.75 |
| 8 (5 min) | 4.9 | 2.08 |
| 8 (10 min) | 4.83 | 2.15 |
| 8 (20 min) | 4 | 2.98 |
| 9 (Before treatment) | 6.98 | N/A |
| 9 (1 min) | 5.2 | 1.78 |
| 9 (5 min) | 5.1 | 1.88 |
| 9 (10 min) | 5.01 | 1.97 |
| 9 (20 min) | 4.96 | 2.02 |

The data in Tables XXIII and XXXIV demonstrates that, at both 5 ppm and 10 ppm, equilibrium PAA is effective from pH 6 to pH 9. The higher concentration of 10 ppm PAA performed somewhat better than the lower concentration of 5 ppm. The $log_{10}$ reduction in bacteria increased with increasing contact time.

EXAMPLE 21

This example demonstrates that an equilibrium solution of PAA at 5 ppm is effective against planktonic *Campylobacter* bacteria from pH 8 to 9.

*Campylobacter jejuni* bacteria (ATCC 33291) were cultured in Bolton Broth (Sigma Aldrich) containing 5% defibrinated sheep blood (Hardy Diagnostics) by microaerophilic incubation for two days at 42° C. The bacteria were separated from the Bolton Broth by centrifugation and carefully resuspended in one liter of sterile phosphate buffer, which was then split into two 500-mL samples and dosed to 5 ppm PAA (Perasan MP-2, Enviro Tech Chemical Services, Inc., Modesto, Calif.). The PAA had immediately been consumed by the *Campylobacter* suspension, and only 1.74 and 0.54 ppm as PAA were detectable at the one-minute interval at pH 8 and pH 9, respectively.

The amount of *Campylobacter jejuni* bacteria was measured prior to being dosed with the PAA by serial dilution and plating on Campy Cefex Agar (Hardy Diagnostics). The plates were kept under microaerophilic conditions and incubated for 48 hours at 42° C.

A 1000 ppm stock solution of PAA was prepared by adding 0.6489 g of Perasan MP-2 (5.66% hydrogen peroxide and 15.41% PAA) to 100 g of reverse osmosis water. One of the 500-mL *Campylobacter* suspension samples was treated with a nominal dose of 5 ppm PAA by adding 2.5 mL of the 1000 ppm PAA stock solution. Immediately thereafter, the amount of PAA was measured by using the modified DPD method (U.S. Pat. No. 7,651,724). The *Campylobacter* buffer solutions contained an abnormally large amount of organic material due to the defibrinated sheep blood that had also been separated with the *Campylobacter* bacteria by centrifugation. The pH of the suspension containing the *Campylobacter* and the PAA was altered to the target pH of 8 or 9 by adding 5% NaOH after the addition of the PAA solution.

During the challenge testing, the amounts of hydrogen peroxide and PAA were measured at 1, 5, 10, and 20 minutes. The data is reported in Table XXXV.

TABLE XXXV

| pH (time) | Measured pH | ppm PAA | ppm $H_2O_2$ | $Log_{10}$ CFU/mL Remaining | $Log_{10}$ Reduction |
|---|---|---|---|---|---|
| 8 (0 min) | 7.96 | 5.14 | N/A | 6.58 | N/A |
| 8 (1 min) | N/A | 1.71 | 0.72 | 2.81 | 3.77 |
| 8 (5 min) | N/A | 0.64 | 0.00 | 2.90 | 3.68 |
| 8 (10 min) | N/A | 0.43 | 0.00 | 3.19 | 3.39 |
| 8 (20 min) | 7.60 | 0.00 | 0.00 | 3.43 | 3.15 |
| 9 (0 min) | 8.93 | 4.28 | 0.76 | 6.58 | N/A |
| 9 (1 min) | N/A | 0.54 | 0.00 | 3.76 | 2.82 |
| 9 (5 min) | N/A | 0.00 | 0.00 | 3.20 | 3.38 |
| 9 (10 min) | N/A | 0.00 | 0.00 | 4.50 | 2.08 |
| 9 (20 min) | 8.88 | 0.00 | 0.00 | *NR | *NR |

NR = Not Reported

After 1, 5, 10, and 20 minutes, approximately 100 mL of the *Campylobacter* suspension was removed from the beaker and sodium thiosulfate (0.5 g) was added to neutralize the PAA and HP. The amount of viable *Campylobacter jejuni* bacteria remaining in the suspension at the 1, 5, 10, and 20 minute contact times was measured by serial dilution and plating on Campy Cefex Agar. All Campy Cefex Agar plates were kept under microaerophilic conditions and incubated for 48 hours at 42° C. before enumeration.

The data in Table XXXV demonstrates that equilibrium PAA is effective from pH 8 to pH 9. Because the PAA was quickly consumed by the abundance of organic material in the *Campylobacter* suspension, and depleted within one minute, this data also demonstrates the strong efficacy of PAA at 1.71 ppm PAA (pH 8) and at 0.54 ppm PAA (pH 9).

EXAMPLE 22

This example shows that treating poultry carcasses in chilled PAA-containing water (99 ppm PAA) having a pH of 6 or a pH of 9, prepared from a solution of equilibrium PAA, provided an increase in weight of the poultry carcasses in addition to providing antibacterial benefits when compared to a pH of 4.8.

Forty-five freshly killed chickens that had been picked (defeathered) and eviscerated were removed from a processing line at a poultry processing plant before they entered the plant's chicken chill tank. The chickens, which were still warm from body temperature, were prepared and weighed as described in Example 18.

Three 30-gallon bins, labeled Bin 1 (pH 4.8), Bin 2 (pH 6), and Bin 3 (pH 9), were filled with a combination of ice and soft water (56 L) which was enough volume to submerge 30 chicken halves at each pH. The temperature of the water in the bins was 42° F., simulating a poultry chill tank. The temperature of the water was monitored and kept constant using frozen bottles of water as ice packs.

The *Salmonella typhimurium* inoculum was prepared as described in Example 17, but this time the concentrated bacteria was introduced to approximately 530 mL of sterile phosphate buffer, which was later used to inoculate the chilled water. The concentration of the *Salmonella typhimurium* was measured in the *Salmonella* inoculum by plating using 3M Petrifilm Enterobacteriaceae plates and incubated at 35° C. for 24 hours, upon which the plates were enumerated. The concentration of *Salmonella typhimurium* in the inoculum was $1.12 \times 10^9$ CFU/mL ($log_{10}$ 9.05).

The three bins were inoculated with *Salmonella typhimurium* inoculum (175.0 g) and mixed manually. The concentration of the *Salmonella typhimurium* was measured in the *Salmonella* inoculated water by plating and enumerating as described for the inoculum. The chicken halves were then placed into the three respective bins, pH 4.8, 6, and 9, before the PAA was introduced.

The three bins at pH 4.8, 6, and 9 were dosed to a nominal 99 ppm PAA using Perasan MP-2 (Enviro Tech Chemical Services, Modesto, Calif.). The 15% PAA solution was introduced to the chilled water of each bin and manually mixed with a plastic rod to form PAA-containing water. The weights of 15% PAA solution introduced for each bin were 37.4 g, 37.0 g, and 37.5 g for Bin 1, Bin 2, and Bin 3, respectively. The initial and final concentrations of PAA were measured using the modified DPD method (U.S. Pat. No. 7,651,724). The initial concentration of PAA was found to be 111.28 ppm, 96.3 ppm, and 99.51 ppm for Bin 1, Bin 2, and Bin 3, respectively. The pH of the PAA-containing water with the chickens before altering was measured to be 4.8, 4.9, and 5.1 for Bin 1, Bin 2, and Bin 3, respectively. The target pH for the bins were 4.8, 6, and 9 for Bin 1, Bin 2, and Bin 3, respectively. The pH of Bin 1 required no pH adjustment, but Bin 2 and Bin 3 were altered to 5.8 (with 50% sodium hydroxide) and 9.2 (with 50% sodium hydroxide), respectively. The chicken halves were soaked as described in Example 18. The concentration of the *Salmonella typhimurium* was measured at 5 minutes and 3 hours by removing an aliquot of the chilled water followed by serial dilution (except for the zero dilution) and plating and enumerating as previously described. The final concentrations of PAA were found to be 70.62 ppm, 59.92 ppm, and 65.27 ppm for Bin 1, Bin 2, and Bin 3, respectively.

After three hours, each chicken half was removed for weighing as described in Example 18.

Table XXXVI summarizes the results. The standard errors for each set of data are also shown.

TABLE XXXVI

|  | Bin 1 (pH 4.8) | Bin 2 (pH 6) | Bin 3 (pH 9) |
|---|---|---|---|
| # Chicken Halves | 30 | 30 | 30 |
| Avg. Weight of Chicken Half Before Chill (g) | 808.1 | 808.8 | 740.3 |
| Avg. Weight of Chicken Half After Chill (g) | 841.4 | 840.8 | 778.6 |
| Avg. Weight Gain (g) | 33.4 | 31.9 | 38.3 |
| Average % Weight Gain | 4.17 | 3.97 | 5.38 |
| Standard Error (± %) | 0.2179 | 0.2118 | 0.2810 |

Table XXXVII summarizes the efficacy data for the three bins, and shows the results for the pre-treated inoculated water, five minutes after administering the PAA, and three hours after administering the PAA (termination of the study).

TABLE XXXVII

| Bin | Theoretical pH | Description | $\log_{10}$ Remaining | $\log_{10}$ Reduction | % Reduction |
|---|---|---|---|---|---|
| Bin 1 | 4.8 | Pre-Treated | 5.84 | N/A | N/A |
|  |  | 5 min | 0.00 | >5.84 | >99.999 |
|  |  | 3 hr | 0.00 | >5.84 | >99.999 |
| Bin 2 | 6.0 | Pre-Treated | 5.93 | N/A | N/A |
|  |  | 5 min | 0.00 | >5.93 | >99.999 |
|  |  | 3 hr | 0.00 | >5.93 | >99.999 |
| Bin 3 | 9.0 | Pre-Treated | 5.38 | N/A | N/A |
|  |  | 5 min | 0.00 | >5.38 | >99.999 |
|  |  | 3 hr | 0.00 | >5.38 | >99.999 |

Table XXXVII shows that for the high level of approximately 99 ppm PAA from Perasan MP-2, five minutes after the initial dose, the PAA was effective at reducing the level of *Salmonella typhimurium* at pH 4.8, 6, and 9. Further, the data shows that a single dose of approximately 99 ppm PAA from Perasan MP-2 completely eradicated the *Salmonella typhimurium* at pH 4.8, 6, and 9 after only five minutes.

Figure 4:
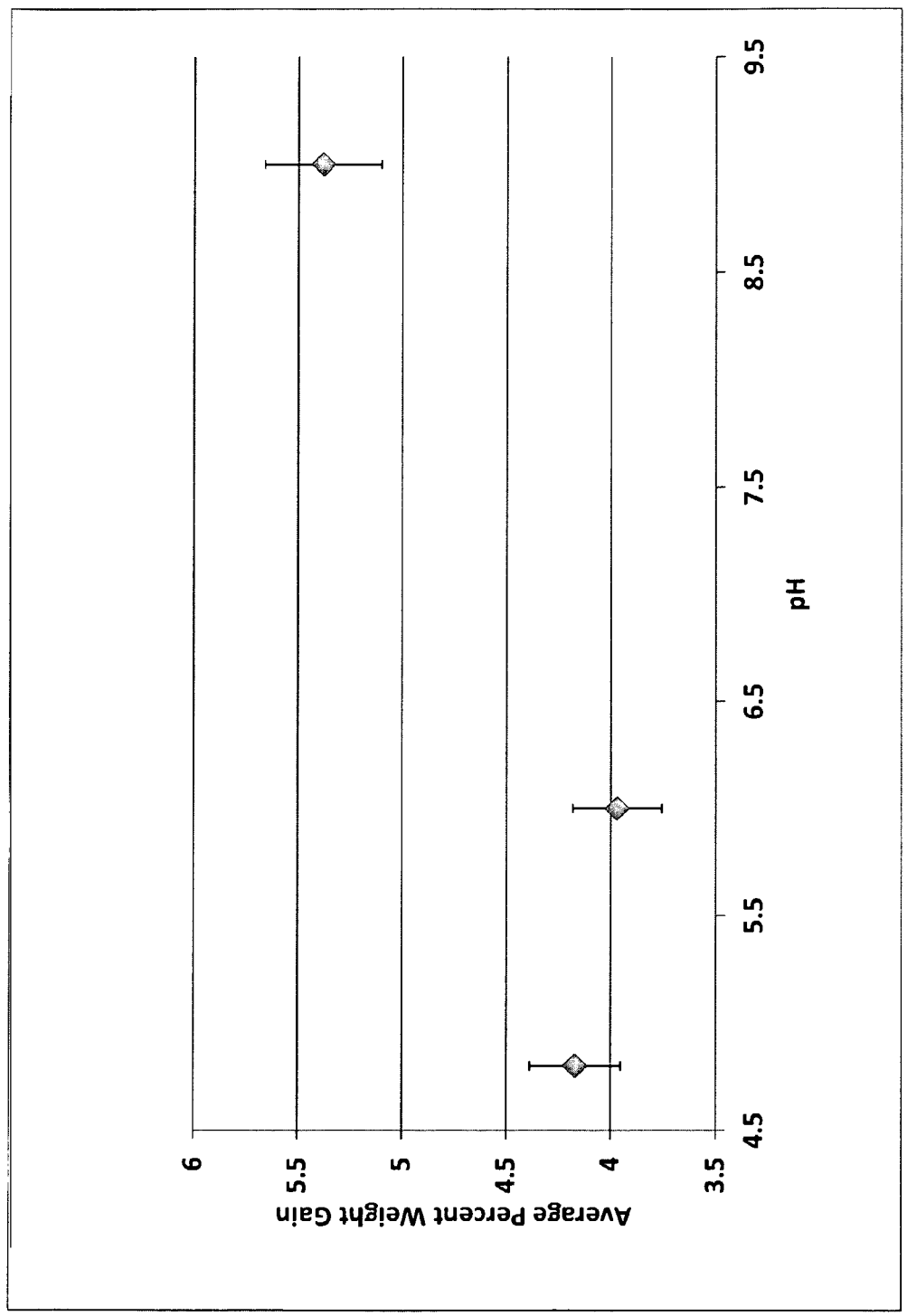
FIG. 4 is a graph showing the average percent weight gain of poultry carcasses treated with a solution of equilibrium PAA (99 ppm) in a chill tank at pHs of 4.8, 6, and 9.

FIG. 4 shows the average percent weight gain versus pH. The squares represent the average percent weight gain. The error bars represent the standard error, also referred to as the standard deviation of the average.

The statistical analysis was performed as in Example 18, using the "Two Sample Assuming Un-Equal Variances" t-test (Analysis ToolPak, Microsoft Excel, 2007).

The t-test results are displayed in Tables XXXVIII, XXXIX, and XXXX. The t-test calculated the average percent weight gained by the chicken halves for each data set, the variance, number of replicates, degrees of freedom (df), t-stat value, and the P two-tail value.

The P(two-tail)-value refers to the confidence level calculated by the t-test. It provides the level of confidence that the averages of the percent weight gain of chicken halves soaked in PAA-containing water at the different pHs are statistically different and not just chance findings.

Table XXXVIII displays the t-test results when Bin 2 (pH 6) was compared to Bin 1 (pH 4.8).

TABLE XXXVIII

| t-Test: Two-Sample Assuming Unequal Variances | | |
|---|---|---|
|  | 99 ppm PAA (pH 6) | 99 ppm PAA (pH 4.8) |
| Mean | 3.97 | 4.17 |
| Variance | 1.35 | 1.42 |
| Observations | 30 | 30 |
| df | 58 |  |
| t Stat | −0.6569 |  |
| P (T <= t) two-tail | 0.5138 |  |

Using a t-table, the confidence level was approximated. The absolute t-value (0.657) was approximately bracketed between confidence levels 0.0% with a t-stat value of 0.000 and 50.0% with a t-stat value of 0.679. To determine the exact confidence level the P-value was used in the determination (100%-51.38%), thus the confidence level is established at 48.62% that the average percent weight gain of chicken halves soaked in peracetic acid-containing water at pH 6 and pH 4.8 are statistically different.

Table XXXIX displays the t-test results when Bin 3 (pH 9) was compared to Bin 1 (4.8).

TABLE XXXIX

| t-Test: Two-Sample Assuming Unequal Variances | | |
|---|---|---|
|  | 99 ppm PAA (pH 9) | 99 ppm PAA (pH 4.8) |
| Mean | 5.38 | 4.17 |
| Variance | 2.37 | 1.42 |
| Observations | 30 | 30 |
| df | 55 |  |
| t Stat | 3.4114 |  |
| P (T <= t) two-tail | 0.0012 |  |

Using a t-table, the confidence level was approximated. The t-value (3.41) was approximately bracketed between confidence levels 99.8% with a t-stat value of 3.232 and 99.9% with a t-stat value of 3.460. To determine the exact confidence level, the P— value was used in the determination (100%-0.12%), thus, the confidence level is established at 99.88% that the average percent weight gain of chicken halves soaked in peracetic acid-containing water at pH 9 and pH 4.8 are statistically different.

Table XXXX displays the t-test results when Bin 3 (pH 9) was compared to Bin 2 (pH 6).

TABLE XXXX

| t-Test: Two-Sample Assuming Unequal Variances | | |
|---|---|---|
|  | 99 ppm PAA (pH 9) | 99 ppm PAA (pH 6) |
| Mean | 5.38 | 3.97 |
| Variance | 2.37 | 1.35 |
| Observations | 30 | 30 |
| df | 54 |  |
| t Stat | 4.0146 |  |
| P (T <= t) two-tail | 0.0002 |  |

Using a t-table, the confidence level was approximated. The t-value (4.01) exceeded the 99.9% confidence levels with a t-stat value of 3.551. To determine the exact confidence level, the P— value was used in the determination (100%-0.02%), thus, the confidence level is established at 99.98% that the average percent weight gain of chicken halves soaked in peracetic acid-containing water at pH 6 and pH 9 are statistically different.

Example 23

This example shows that treating poultry carcasses in chilled PAA-containing water (1 ppm PAA) having a pH of 6 or a pH of 9, prepared from a solution of equilibrium PAA, provided an increase in weight of the poultry carcasses in addition to providing antibacterial benefits when compared to a pH of 4.8.

Fifteen freshly killed chickens that had been picked (defeathered) and eviscerated were removed from a processing line at a poultry processing plant before they entered the plant's chicken chill tank. The chickens, which were still warm from body temperature, were prepared and weighed as described in Example 18.

Three 30-gallon bins, labeled Bin 1 (pH 4.8), Bin 2 (pH 6), and Bin 3 (pH 9), were filled with a combination of ice and soft water (21 L) which was enough volume to submerge 10 chicken halves. The temperature of the water in the bins was 42° F., simulating a poultry chill tank. The temperature of the water was monitored and kept constant using frozen bottles of water as ice packs.

*Salmonella typhimurium* bacteria (ATCC 14028) were cultured in nutrient broth (Sigma, St. Louis, Mo.) by incubation for two days at 35° C. The bacteria were separated from the nutrient broth by centrifugation, and carefully resuspended in approximately 200 mL of sterile phosphate buffer, which was later used to inoculate the chilled water. The concentration of the *Salmonella typhimurium* was measured in the *Salmonella* inoculum by plating using 3M Petrifilm Enterobacteriaceae plates and incubated at 35° C. for 24 hours, upon which the plates were enumerated. The concentration of *Salmonella typhimurium* in the inoculum was $1.12 \times 10^9$ CFU/mL ($\log_{10}$ 9.05).

The three bins were inoculated with *Salmonella typhimurium* inoculum (66.0 g) and mixed manually. The concentration of the *Salmonella typhimurium* was measured in the *Salmonella* inoculated water by plating using 3M Petrifilm Enterobacteriaceae Plates and incubated at 35° C. for 24 hours, upon which the plates were enumerated. The chicken halves were then placed into the respective bins before the PAA addition.

The three bins were dosed to a nominal 1 ppm PAA using Perasan MP-2 (Enviro Tech Chemical Services, Modesto, Calif.).

The 15% PAA solution was introduced to the chilled water of each bin and manually mixed with a plastic rod to form PAA-containing water. The weights of 15% PAA solution introduced for each bin were 0.27 g, 0.26 g, and 0.26 g for Bin 1, Bin 2, and Bin 3, respectively. The concentration of PAA was measured using the modified DPD method (U.S. Pat. No. 7,651,724) and was found to be 1.47 ppm, 1.41 ppm, and 1.12 ppm for Bin 1, Bin 2, and Bin 3, respectively. The pHs of the PAA-containing water with the chickens before altering were measured to be 7.6, 6.9, and 7.4 for Bin 1, Bin 2, and Bin 3, respectively. The target pHs for the bins were 4.8, 6, and 9 for Bin 1, Bin 2, and Bin 3, respectively. The pH of Bin 1, Bin 2, and Bin 3 were altered to 4.7 (with 32% hydrochloric acid), 5.6 (with 32% hydrochloric acid), and 9.1 (with 50% sodium hydroxide), respectively. The chicken halves were soaked for three hours and periodically manually turned over in the water to simulate their movement through a chicken chill tank. The pH was periodically measured along with the PAA concentration. The concentration of PAA was measured and replenished for each bin at one hour by the addition of 0.2 g Perasan MP-2 and at two hours by the addition of another 0.2 g Perasan MP-2 to maintain about 1 ppm PAA throughout the test. The concentration of the *Salmonella typhimurium* was measured at 5 minutes and at 3 hours by removing an aliquot of the chilled water followed by serial dilution (except for the zero dilution) and plating onto 3M Petrifilm Enterobacteriaceae plates with incubation at 35° C. for 24 hours before enumeration.

After the chicken halves had been in the chilled water for three hours, each chicken half was removed for weighing as described in Example 18.

Table XXXXI summarizes these results. The standard errors for each set of data are also shown.

TABLE XXXXI

|  | Bin 1 (pH 4.8) | Bin 2 (pH 6) | Bin 3 (pH 9) |
|---|---|---|---|
| # Chicken Halves | 10 | 10 | 10 |
| Avg. Weight of Chicken Half Before Chill (g) | 1031.6 | 881.9 | 919.6 |
| Avg. Weight of Chicken Half After Chill (g) | 1057.0 | 918.2 | 966.8 |
| Avg. Weight Gain (g) | 25.4 | 36.4 | 47.3 |
| Average % Weight Gain | 2.53 | 4.16 | 5.09 |
| Standard Error (± %) | 0.5375 | 0.4613 | 0.5452 |

Table XXXXII reports the efficacy data for the three bins, and shows the efficacy for the pre-treated inoculated water, five minutes after administering the PAA, and three hours after administering and maintaining the PAA (termination of the study).

TABLE XXXXII

| Bin | Theoretical pH | Description | $\log_{10}$ Remaining | $\log_{10}$ Reduction | % Reduction |
|---|---|---|---|---|---|
| Bin 1 | 4.8 | Pre-Treated | 4.33 | N/A | N/A |
|  |  | 5 min | 3.73 | 0.60 | 74.88 |
|  |  | 3 hr | 0.00 | >4.33 | >99.999 |
| Bin 2 | 6.0 | Pre-Treated | 4.06 | N/A | N/A |
|  |  | 5 min | 2.72 | 1.34 | 95.43 |
|  |  | 3 hr | 0.00 | >4.06 | >99.999 |
| Bin 3 | 9.0 | Pre-Treated | 4.40 | N/A | N/A |
|  |  | 5 min | 3.55 | 0.85 | 85.88 |
|  |  | 3 hr | 0.00 | >4.40 | >99.999 |

Table XXXXII shows that despite the low level of approximately 1 ppm of PAA from Perasan MP-2, 5 minutes after the initial dose, the PAA was effective at reducing the level of *Salmonella typhimurium* at pHs of 4.8, 6. and 9.0. Further, the data shows that when the approximately 1 ppm dose of PAA from Perasan MP-2 is maintained for 3 hours, there was total eradication of *Salmonella typhimurium* at pH 4.8, 6.0 and 9.0.

Figure 5:
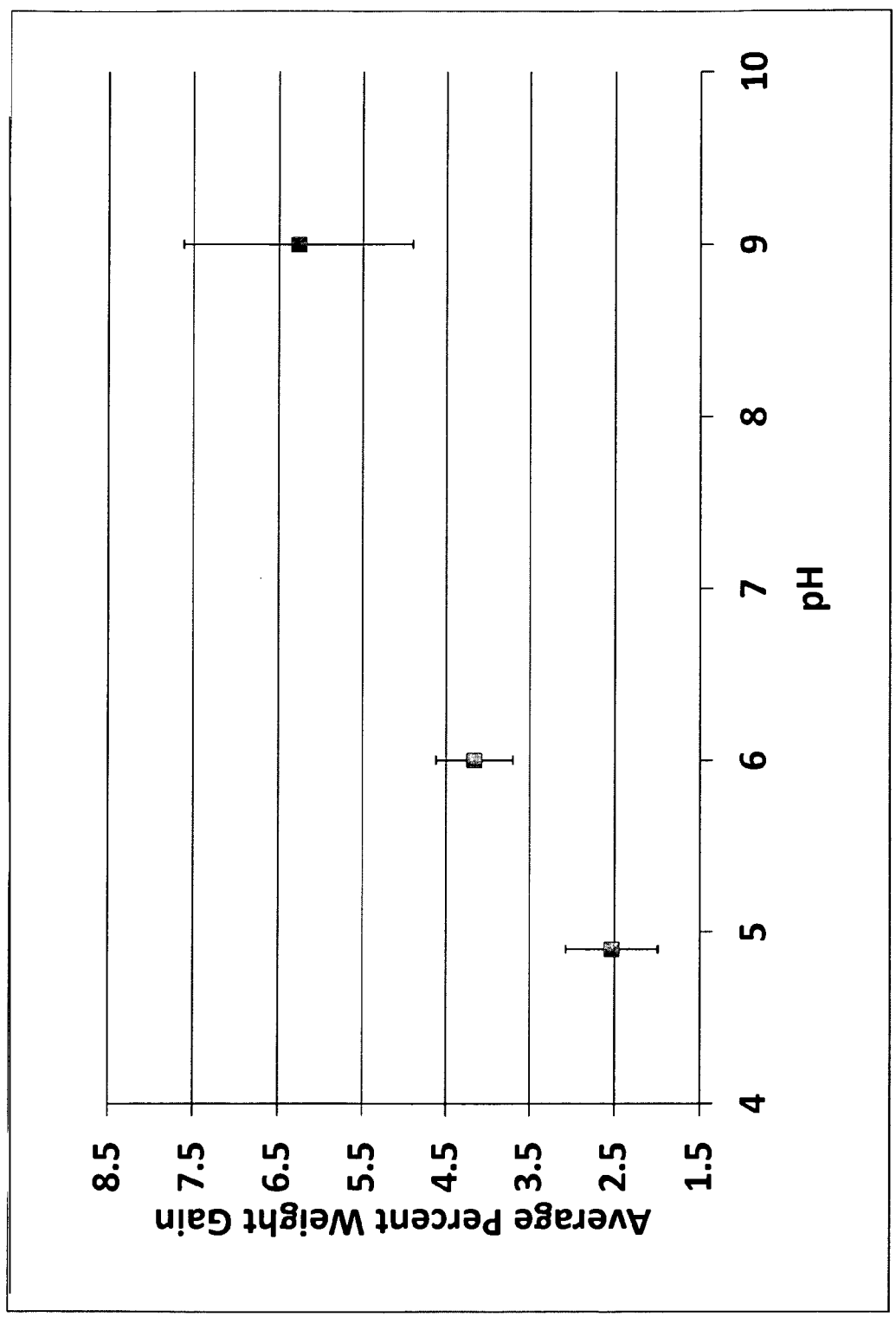
FIG. 5 is a graph showing the average percent weight gain of poultry carcasses treated with a solution of equilibrium PAA (1 ppm) in a chill tank at pHs of 4.8, 6, and 9.

FIG. 5 shows the average percent weight gain versus pH. The diamonds represent the average percent weight gain. The error bars represent the standard error, also referred to as the standard deviation of the average.

The statistical analysis was performed as in Example 18, using the "Two Sample Assuming Un-Equal Variances" t-test (Analysis ToolPak, Microsoft Excel, 2007).

The t-test results are displayed in Tables XXXXIII, XXXXIV, and XXXXV. The t-test calculated the average percent weight gained by the chicken halves for each data set, the variance, number of replicates, degrees of freedom (df), t-stat value, and the P two-tail value.

The P(two-tail)-value refers to the confidence level calculated by the t-test. It provides the level of confidence that the averages of the percent weight gain of chicken halves soaked in PAA-containing water at the different pHs are statistically different and not just chance findings.

Table XXXXIII displays the t-test results when Bin 2 (pH 6) was compared to Bin 1 (pH 4.8).

TABLE XXXXIII

| t-Test: Two-Sample Assuming Unequal Variances | | |
|---|---|---|
| | 1 ppm PAA (pH 6) | 1 ppm PAA (pH 4.8) |
| Mean | 4.16 | 2.53 |
| Variance | 2.13 | 2.89 |
| Observations | 10 | 10 |
| df | 18 | |
| t Stat | 2.2943 | |
| P (T <= t) two-tail | 0.0340 | |

Using a t-table, the confidence level was determined. The t-value (2.29) was bracketed between confidence levels 95.0% with a t-stat value of 2.101 and 98.0% with a t-stat value of 2.552. Thus, the confidence level is established at 96.6% that the average percent weight gain of chicken halves soaked in peracetic acid-containing water at pH 6 and pH 4.8 are statistically different.

Table XXXXIV displays the t-test results when Bin 3 (pH 9) was compared to Bin 1 (4.8).

TABLE XXXXIV

| t-Test: Two-Sample Assuming Unequal Variances | | |
|---|---|---|
| | 1 ppm PAA (pH 9) | 1 ppm PAA (pH 4.8) |
| Mean | 5.09 | 2.53 |
| Variance | 2.97 | 2.89 |
| Observations | 10 | 10 |
| df | 18 | |
| t Stat | 3.3360 | |
| P (T <= t) two-tail | 0.0037 | |

Using a t-table, the confidence level was determined. The t-value (3.34) was bracketed between confidence levels 99.0% with a t-stat value of 2.878 and 99.8% with a t-stat value of 3.610. Thus, the confidence level is established at 99.63% that the average percent weight gain of chicken halves soaked in peracetic acid-containing water at pH 9 and pH 4.8 are statistically different.

Table XXXXV displays the t-test results when Bin 3 (pH 9) was compared to Bin 2 (pH 6).

TABLE XXXXV

| t-Test: Two-Sample Assuming Unequal Variances | | |
|---|---|---|
| | 1 ppm PAA (pH 9) | 1 ppm PAA (pH 6) |
| Mean | 5.09 | 4.16 |
| Variance | 2.97 | 2.13 |
| Observations | 10 | 10 |
| df | 18 | |
| t Stat | 1.3009 | |
| P (T <= t) two-tail | 0.2097 | |

Using a t-table, the confidence level was determined. The t-value (1.30) was bracketed between confidence levels 70.0% with a t-stat value of 1.067 and 80.0% with a t-stat value of 1.330. Thus, the confidence level is established at 79.03% that the average percent weight gain of chicken halves soaked in peracetic acid-containing water at pH 6 and pH 9 are statistically different.

Example 24

This example demonstrates that when a poultry chill tank at a poultry processing plant is treated with an equilibrium solution of PAA and the pH is elevated from 5 to 6.81, the processing plant's percent yield of processed products increased by about 1% due to an increase in the weight of the processed products. This example also shows that the microbiological efficacy of the PAA is not compromised by the pH increase.

For several years, a major U.S. processor of poultry had been disinfecting its chicken chill tank water at a large processing plant with equilibrium peracetic acid (Perasan MP-2, Enviro Tech Chemical Services, Inc., Modesto, Calif.). Typically, the plant processed about 200,000 or more birds per day for five days a week.

The plant calculated its percent yield as follows:

$$\text{Percent Yield} = \frac{\text{Wt of processed product out of plant}}{\text{Wt of Live Birds into Plant} - (\text{Wt Dead on Arrivals} + \text{Wt Condemned})} \times 100$$

Over a recent two-year period, the plant's procedure was to treat the chill tank with a dose of 15 ppm PAA (minimum) for a contact time of 70 minutes. During this period, the plant averaged one positive test for *Salmonella* per 100 processed birds, and its average percent yield was 73.9%. The pH of the chill tank water averaged 5.0. The average chill tank characteristics and the average percent yield over the two-year period are shown in Table XXXXVI.

TABLE XXXXVI

| Chill Tank Volume (gal) | Bleed-off and Make-up Rate (gal/bird) | Water Temperature (° F.) | Bird Residence Time (min) | ppm PAA | Water pH | % Yield |
|---|---|---|---|---|---|---|
| 26,000 | ½ | 33 | 70 | 15.3 | 5.0 | 73.90 |

In order to determine whether maintaining an elevated pH in a chicken chill tank had an adverse effect on the shelf-life, yield, tenderness, flavor, texture, and color of the food product, Applicants directed a trial at this processing plant that was performed over 13 days. At the start of the trial, at Applicants' direction, the pH of the chicken chill tank water was elevated to a target pH of about 6.0 using 50% NaOH. The pH was measured daily for the 13 days and maintained at about 6 by the addition of 50% NaOH. Surprisingly, according to the processor, the elevated pH had no effect on the organoleptic characteristics of the processed product, such as tenderness, flavor, texture, and color of the chicken. Further, the shelf-life was unchanged. The antimicrobial efficacy of the PAA was maintained, averaging one positive test for *Salmonella* per 51 processed birds during routine FSIS *Salmonella* validation testing. Unexpectedly, it was also found that the plant's average percent yield was higher than what it had been at the lower pH of 5.0, indicating that the weight of the processed product was greater at the elevated average pH of 6.25 than it was at a pH of 5.0. Table XXXXVII reports the actual measured pH and the plant's percent yield obtained over the 13-day trial. Table XXXXVII demonstrates that the plant's average percent yield was 74.49% at an average pH of 6.25, a statistically significant increase over the plant's previous average percent yield of 73.90% at a pH of 5.0.

TABLE XXXXVII

| Day | pH | % Yield |
|---|---|---|
| 1 | 6.2 | 74.87 |
| 2 | 6.5 | 75.49 |
| 3 | 6.2 | 74.64 |
| 4 | 6.4 | 74.68 |
| 5 | 6.5 | 74.58 |
| 6 | 6.5 | 73.18 |
| 7 | 6.4 | 74.46 |
| 8 | 5.88 | 74.68 |
| 9 | 6.2 | 73.91 |
| 10 | 5.9 | 73.84 |
| 11 | 6 | 74.18 |
| 12 | 6.2 | 74.49 |
| 13 | 6.4 | 75.36 |
| Average | 6.25 | 74.49 |

In order to ascertain whether the increase in yield was a function of the pH of the poultry chill tank water, Applicants directed a second trial at the plant that was run over 16 days, in which the pH was further elevated by the introduction of additional 50% NaOH. The target pH was 6.9.

Table XXXXVIII reports the actual measured pH and the plant's percent yield obtained over the 16-day trial. Table XXXXVIII shows that the plant's average percent yield was 74.85% at an average pH of 6.81. This demonstrates that an increase in the pH of the chill tank water to an average of 6.81 resulted in yet a greater statistically significant increase in the plant's average percent yield, from 73.90% at a pH of 5.0 to 74.85% at a pH of 6.81.

TABLE XXXXVIII

| Day | pH | % Yield |
|---|---|---|
| 1 | 6.79 | 74.99 |
| 2 | 6.6 | 74.65 |
| 3 | 6.55 | 73.96 |
| 4 | 6.63 | 74.27 |
| 5 | 6.75 | 75.09 |
| 6 | 7.00 | 75.75 |
| 7 | 6.95 | 75.34 |
| 8 | 6.92 | 75.05 |
| 9 | 6.88 | 74.58 |
| 10 | 6.80 | 74.87 |
| 11 | 6.80 | 74.95 |
| 12 | 6.80 | 74.7 |
| 13 | 6.77 | 74.63 |
| 14 | 6.85 | 74.95 |
| 15 | 6.95 | 74.97 |
| 16 | 6.91 | 74.87 |
| Average | 6.81 | 74.85 |

Table XXXXIX summarizes the effect of the pH of the poultry chill tank water on the average percent yield. Table XXXXIX shows that elevating the pH from 5.0 to 6.25 resulted in an increase of 0.60% in the average percent yield, from 73.90% to 74.50%, and that elevating the pH from 5.0 to 6.81 resulted in an increase of 0.95% in the average percent yield, from 73.90% to 74.85%.

TABLE XXXXIX

| Chill tank water pH | % Yield | pH altered with 50% NaOH |
|---|---|---|
| 5.0 | 73.90 | No |
| 6.25 | 74.50 | Yes |
| 6.81 | 74.85 | Yes |

The two trials were conducted over a total period of 29 days during which 5,800,000 birds were processed in the chill tank at the tested pHs. No changes in the mechanical processing conditions or in the quality of the incoming poultry had occurred over the prior year at the plant. All measurement parameters in place before the trials were conducted were held constant during the trials. The only variable was the upward alteration of the pH of the chill tank water. It was quite surprising that this elevated pH resulted in an increase in the percent yield of the processed product over what it had been when the chill tank water had a pH of 5.0. This increase in the yield was attributed to an increase in the weight of the processed products. The increase in yield was significant in that it produced an additional $152,400 in net revenue to the processor over the 29-day period.

After the trials, the processor decided to utilize an embodiment of Applicants' method in the plant by altering the pH in the chill tank water to 7.0 and maintaining it at that pH. Over a period of several months, the average percent yield was 74.94%. At a later date, skeptical that the elevation of the pH had a positive effect on yield, the plant management decided to stop using Applicants' elevated pH method and return to the method used before the trials, in which the pH was not elevated. For two weeks, the plant processed poultry with the chill tank water at a pH of 4.9. Surprising to the skeptical plant management, but consistent with the results obtained in the trials, the average percent yield dropped to 73.73% for the two-week period, a significant decrease over the prior average percent yield of 74.94% at pH 7.0. This drop in yield correlated to lost revenue of approximately $100,000 for the two-week period. Accordingly, the plant management reinstated Applicants' elevated pH method, altering the pH of the chill tank water to a pH of 7.0 and maintaining it at that elevated pH. After four weeks, the resulting average percent yield was 74.86%, demonstrating the positive effect of the pH elevation on the yield. Table XXXXX shows the percent yield for each week and sets forth the disinfectant used and the pH.

TABLE XXXXX

| Week | % Yield | Comments |
|---|---|---|
| 1 | 76.53 | Treated with equilibrium PAA altered to pH 7. |
| 2 | 75.59 | |
| 3 | 75.92 | |
| 4 | 75.53 | |
| 5 | 74.81 | |
| 6 | 75.22 | |
| 7 | 75.71 | |
| 8 | 75.89 | |
| 9 | 75.83 | |
| 10 | 75.18 | |
| 11 | 74.18 | |
| 12 | 74.46 | |
| 13 | 74.43 | |
| 14 | 74.36 | |
| 15 | 74.56 | |
| 16 | 74.49 | |
| 17 | 73.99 | |
| 18 | 74.16 | |
| 19 | 74.01 | |

TABLE XXXXX-continued

| Week | % Yield | Comments |
|---|---|---|
| 20 | 74.95 | |
| 21 | 74.35 | |
| 22 | 74.97 | |
| 23 | 74.82 | |
| 24 | 74.50 | |
| 25 | 74.85 | |
| 26 | 74.90 | |
| 27 | 74.78 | |
| 28 | 74.61 | |
| 29 | 75.56 | |
| 30 | 75.55 | |
| 31 | 75.51 | |
| 32 | 75.11 | |
| 33 | 74.50 | |
| 34 | 74.83 | |
| 35 | 74.19 | Average % yield for weeks 1-35 = 74.94%. |
| 36 | 73.86 | Stopped pH alteration. Treated w. equilibrium PAA at pH 4.9. |
| 37 | 73.60 | Equilibrium PAA at pH 4.9. Average % yield for weeks 36-37 = 73.73%. |
| 38 | 74.62 | Reinstated pH alteration to pH 7.0. |
| 39 | 74.94 | |
| 40 | 74.90 | |
| 41 | 74.96 | Average % yield for weeks 38-41 = 74.86%. |

The invention has been described above with the reference to the preferred embodiments. Those skilled in the art may envision other embodiments and variations of the invention that fall within the scope of the claims.

We claim:

1. A method of treating at least a portion of a poultry carcass with peracetic acid, said method comprising the steps of:
   providing, in a reservoir, a peracetic acid-containing water, wherein the peracetic acid-containing water comprises water and an antimicrobial amount of a solution of peracetic acid;
   after the step of providing the peracetic acid-containing water,. determining the pH of the peracetic acid-containing water, and altering the pH of the peracetic acid-containing water to a pH of about 7.6 to about 10 by adding an alkaline source;
   after the step of determining the pH and altering the pH of the peracetic acid-containing water, placing into the peracetic acid-containing water at least a portion of a poultry carcass;
   after the step of placing at least the portion of the poultry carcass into the peracetic acid-containing water, determining the pH of the peracetic acid-containing water in the reservoir with at least the portion of the poultry carcass therein, and altering the pH of the peracetic acid-containing water to a pH of about 7.6 to about 10 by adding an alkaline source; and
   after the step of determining the pH and altering the pH of the peracetic acid-containing water having at least the portion of the poultry carcass therein, removing at least the portion of the poultry carcass from the peracetic acid-containing water.

2. The method of claim 1 wherein the providing step includes a step of separately introducing the water and the antimicrobial amount of the solution of peracetic acid into the reservoir to form the peracetic acid-containing water provided in the reservoir.

3. The method of claim 1 wherein the providing step includes a step of combining the water and the antimicrobial amount of the solution of peracetic acid to form the peracetic acid-containing water and a subsequent step of introducing the peracetic acid-containing water into the reservoir for providing, in the reservoir, the peracetic acid-containing water.

4. The method of claim 1 wherein the antimicrobial amount of the peracetic acid is about 1 ppm to about 99 ppm.

5. The method of claim 1 wherein the steps of determining the pH of the peracetic acid-containing water are performed continuously.

6. The method of claim 5 wherein the step of altering the pH after the step of placing at least the portion of the poultry carcass into the peracetic acid-containing water is performed continuously.

7. The method of claim 2 further comprising a step of removing a portion of the peracetic acid-containing water from the reservoir with at least the portion of the poultry carcass therein, and a further step of introducing additional water and additional solution of peracetic acid into the reservoir with at least the portion of the poultry carcass therein.

8. The method of claim 3 further comprising a step of removing a portion of the peracetic acid-containing water from the reservoir with at least the portion of the poultry carcass therein, and a further step of introducing additional peracetic acid-containing water into the reservoir with at least the portion of the poultry carcass therein.

9. The method of claim 1 wherein the step of determining the pH and altering the pH after the step of placing at least the portion of the poultry carcass into the peracetic acid—containing water is performed more than once.

10. A method of treating at least a portion of a poultry carcass with peracetic acid, said method comprising the steps of:
    providing, in a reservoir, a peracetic acid-containing water, wherein the peracetic acid-containing water comprises water and an antimicrobial amount of a solution of peracetic acid;
    after the step of providing the peracetic acid-containing water, determining the pH of the peracetic acid-containing water, and altering the pH of the peracetic acid-containing water to a pH of about 7.6 to about 9.3 by adding an alkaline source;
    after the step of determining the pH and altering the pH of the peracetic acid-containing water, placing into the peracetic acid-containing water at least a portion of a poultry carcass;
    after the step of placing at least the portion of the poultry carcass into the peracetic acid-containing water, determining the pH of the peracetic acid-containing water in the reservoir with at least the portion of the poultry carcass therein, and altering the pH of the peracetic acid-containing water to a pH of about 7.6 to about 9.3 by adding an alkaline source; and
    after the step of determining the pH and altering the pH of the peracetic acid-containing water having at least the portion of the poultry carcass therein, removing at least the portion of the poultry carcass from the peracetic acid-containing water.

11. The method of claim 9 wherein the providing step includes a step of separately introducing the water and the antimicrobial amount of the solution of peracetic acid into the reservoir to form the peracetic acid-containing water provided in the reservoir.

12. The method of claim 9 wherein the providing step includes a step of combining the water and the antimicrobial amount of the solution of peracetic acid to form the peracetic acid-containing water and a subsequent step of introducing the peracetic acid-containing water into the reservoir for providing, in the reservoir, the peracetic acid-containing water.

13. The method of claim 10 wherein the antimicrobial amount of the peracetic acid is about 1 ppm to about 99 ppm.

14. The method of claim 10 wherein the steps of determining the pH of the peracetic acid-containing water are performed continuously.

15. The method of claim 14 wherein the step of altering the pH after the step of placing at least the portion of the poultry carcass into the peracetic acid-containing water is performed continuously.

16. The method of claim 11 further comprising a step of removing a portion of the peracetic acid-containing water from the reservoir with at least the portion of the poultry carcass therein, and a further step of introducing additional water and additional solution of peracetic acid into the reservoir with at least the portion of the poultry carcass therein.

17. The method of claim 12 further comprising a step of removing a portion of the peracetic acid-containing water from the reservoir with at least the portion of the poultry carcass therein, and a further step of introducing additional peracetic acid-containing water into the reservoir with at least the portion of the poultry carcass therein.

18. The method of claim 10 wherein the step of determining the pH and altering the pH after the step of placing at least the portion of the poultry carcass into the peracetic acid-containing water is performed more than once.

19. A method of treating at least a portion of a poultry carcass with peracetic acid, said method comprising the steps of:
    providing, in a reservoir, a peracetic acid-containing water, wherein the peracetic acid-containing water comprises water and an antimicrobial amount of a solution of peracetic acid;
    after the step of providing the peracetic acid-containing water, determining the pH of the peracetic acid-containing water, and altering the pH of the peracetic acid-containing water to a pH of about 7.6 to about 9 by adding an alkaline source;
    after the step of determining the pH and altering the pH of the peracetic acid-containing water, placing into the peracetic acid-containing water at least a portion of a poultry carcass;
    after the step of placing at least the portion of the poultry carcass into the peracetic acid-containing water, determining the pH of the peracetic acid-containing water in the reservoir with at least the portion of the poultry carcass therein, and altering the pH of the peracetic acid-containing water to a pH of about 7.6 to about 9 by adding an alkaline source; and
    after the step of determining the pH and altering the pH of the peracetic acid-containing water having at least the portion of the poultry carcass therein, removing at least the portion of the poultry carcass from the peracetic acid-containing water.

20. The method of claim 19 wherein the antimicrobial amount of the peracetic acid is about 1 ppm to about 99 ppm.

21. The method of claim 19 wherein the steps of determining the pH of the peracetic acid-containing water are performed continuously.

22. The method of claim 21 wherein the step of altering the pH after the step of placing at least the portion of the poultry carcass into the peracetic acid-containing water is performed continuously.

23. The method of claim 19 wherein the step of determining the pH and altering the pH after the step of placing at least the portion of the poultry carcass into the peracetic acid-containing water is performed more than once.

24. A method of treating at least a portion of a poultry carcass with peracetic acid, said method comprising the steps of:
    providing, in a reservoir, a peracetic acid-containing water, wherein the peracetic acid-containing water comprises water and an antimicrobial amount of a solution of peracetic acid;
    after the step of providing the peracetic acid-containing water, determining the pH of the peracetic acid-containing water, and altering the pH of the peracetic acid-containing water to a pH of about 8 to about 9 by adding an alkaline source;
    after the step of determining the pH and altering the pH of the peracetic acid-containing water, placing into the peracetic acid-containing water at least a portion of a poultry carcass;
    after the step of placing at least the portion of the poultry carcass into the peracetic acid-containing water, determining the pH of the peracetic acid-containing water in the reservoir with at least the portion of the poultry carcass therein, and altering the pH of the peracetic acid-containing water to a pH of about 8 to about 9 by adding an alkaline source; and
    after the step of determining the pH and altering the pH of the peracetic acid-containing water having at least the portion of the poultry carcass therein, removing at least the portion of the poultry carcass from the peracetic acid-containing water.

25. The method of claim 24 wherein the antimicrobial amount of the peracetic acid is about 1 ppm to about 99 ppm.

26. The method of claim 24 wherein the steps of determining the pH of the peracetic acid-containing water are performed continuously.

27. The method of claim 26 wherein the step of altering the pH after the step of placing at least the portion of the poultry carcass into the peracetic acid-containing water is performed continuously.

28. The method of claim 24 wherein the step of determining the pH and altering the pH after the step of placing at least the portion of the poultry carcass into the peracetic acid-containing water is performed more than once.

29. A method of treating at least a portion of a poultry carcass with peracetic acid, said method comprising the steps of:
    providing, in a reservoir, a peracetic acid-containing water, wherein the peracetic acid-containing water comprises water and an antimicrobial amount of a solution of peracetic acid;
    after the step of providing the peracetic acid-containing water, determining the pH of the peracetic acid-containing water, and altering the pH of the peracetic acid-containing water to a pH of about 9 to about 10 by adding an alkaline source;
    after the step of determining the pH and altering the pH of the peracetic acid-containing water, placing into the peracetic acid-containing water at least a portion of a poultry carcass;
    after the step of placing at least the portion of the poultry carcass into the peracetic acid-containing water, determining the pH of the peracetic acid-containing water in the reservoir with at least the portion of the poultry carcass therein, and altering the pH of the peracetic acid-containing water to a pH of about 9 to about 10 by adding an alkaline source; and after the step of determining the pH and altering the pH of the peracetic acid-containing water having at least the portion of the poultry carcass therein, removing at least the portion of the poultry carcass from the peracetic acid-containing water.

30. The method of claim 29 wherein the antimicrobial amount of the peracetic acid is about 1 ppm to about 99 ppm.

31. The method of claim 29 wherein the steps of determining the pH of the peracetic acid-containing water are performed continuously.

32. The method of claim 31 wherein the step of altering the pH after the step of placing at least the portion of the poultry carcass into the peracetic acid-containing water is performed continuously.

33. The method of claim 29 wherein the step of determining the pH and altering the pH after the step of placing at least the portion of the poultry carcass into the peracetic acid-containing water is performed more than once.

* * * * *